US007777986B2

(12) United States Patent
Barkley et al.

(10) Patent No.: US 7,777,986 B2
(45) Date of Patent: Aug. 17, 2010

(54) MULTI-DIMENSIONAL TRANSPORT METHOD AND DRIVE SUBSYSTEMS IN A CARTRIDGE LIBRARY APPARATUS

(75) Inventors: John A. Barkley, Longmont, CO (US); Christopher M. White, Frederick, CO (US); Jeffrey P. Davies, Louisville, CO (US)

(73) Assignee: Tandberg Data Corporation, Boulder, CO (US)

( * ) Notice: Subject to any disclaimer, the term of this patent is extended or adjusted under 35 U.S.C. 154(b) by 642 days.

(21) Appl. No.: 11/747,321

(22) Filed: May 11, 2007

(65) Prior Publication Data
US 2008/0278839 A1 Nov. 13, 2008

(51) Int. Cl.
*G11B 15/68* (2006.01)
(52) U.S. Cl. ...................................... 360/92.1
(58) Field of Classification Search ................ 360/92.1; 369/30.45, 30.57, 30.7, 30.72, 30.85, 30.87
See application file for complete search history.

(56) References Cited

U.S. PATENT DOCUMENTS

| | | | |
|---|---|---|---|
| 3,833,807 | A | 9/1974 | Takeda |
| 4,754,397 | A | 6/1988 | Varaiya et al. |
| 4,869,591 | A | 9/1989 | MacGregor |
| 4,908,715 | A | 3/1990 | Krum et al. |
| 4,918,548 | A | 4/1990 | O'Connell et al. |
| 4,972,277 | A | 11/1990 | Sills et al. |
| 4,984,106 | A | 1/1991 | Herger et al. |
| 5,021,902 | A | 6/1991 | Ishikawa et al. |
| 5,034,833 | A | 7/1991 | Marlowe |

(Continued)

FOREIGN PATENT DOCUMENTS

JP 60-225002 A 11/1985

OTHER PUBLICATIONS

U.S. Office Action mailed Feb. 11, 2009 in related U.S. Appl. No. 11/747,311.

*Primary Examiner*—A. J. Heinz
(74) *Attorney, Agent, or Firm*—Nixon & Vanderhye, P.C.

(57) ABSTRACT

A cartridge library (30) comprises at least one drive (60); a cartridge magazine (52); and, a transport mechanism (54) configured to transport the cartridge between the magazine and the drive. The transport mechanism (54) is configured to transport the cartridge between, e.g., cells of the magazine (52) and/or between the magazine (52) and the drive (60). The transport mechanism (54) comprises a robot (300) and a robot motive system. The robot comprises a robot carriage (308) and a robot tray (302). The robot carriage (308) carries or comprises cartridge engagement elements (310) configured to selectively engage and release the cartridge. The robot tray (302) facilitates linear motion of the robot carriage, the robot carriage being situated on a first side of the robot tray. The robot motive system comprises three robot motive subsystems (312, 360, 450) and a (robot) carriage motive subsystem (380). At least one of the robot motive subsystems and the carriage motive subsystem comprise hardware situated on a second side of the robot tray (302), the hardware extending from the second side of the robot tray in the second direction to an extent not substantially greater than the plank height. Locating the hardware of plural subsystems on the second side of the robot tray and within a volume defined by the robot tray and the plank height facilitate not only a transport mechanism, but also a compact and efficient library.

9 Claims, 68 Drawing Sheets

U.S. PATENT DOCUMENTS

| | | | |
|---|---|---|---|
| 5,059,772 A | 10/1991 | Younglove | |
| 5,103,986 A | 4/1992 | Marlowe | |
| 5,184,260 A | 2/1993 | Pierrat | |
| 5,237,467 A | 8/1993 | Marlowe | |
| 5,369,385 A | 11/1994 | Schulte et al. | |
| 5,373,489 A | 12/1994 | Sato et al. | |
| D356,302 S | 3/1995 | Studebaker et al. | |
| 5,402,283 A | 3/1995 | Yamakawa et al. | |
| 5,414,519 A | 5/1995 | Han | |
| 5,416,653 A | 5/1995 | Marlowe | |
| 5,469,310 A | 11/1995 | Slocum et al. | |
| 5,487,579 A | 1/1996 | Woodruff et al. | |
| 5,488,538 A | 1/1996 | Wakita | |
| 5,498,116 A | 3/1996 | Woodruff et al. | |
| 5,502,697 A | 3/1996 | Taki | |
| 5,510,955 A | 4/1996 | Taesang | |
| 5,512,761 A | 4/1996 | Winkelmann | |
| 5,555,143 A | 9/1996 | Hinnen et al. | |
| 5,607,275 A | 3/1997 | Woodruff et al. | |
| 5,659,440 A | 8/1997 | Acosta et al. | |
| 5,661,287 A | 8/1997 | Schaefer et al. | |
| 5,691,859 A | 11/1997 | Ulrich et al. | |
| 5,718,339 A | 2/1998 | Woodruff et al. | |
| 5,739,978 A | 4/1998 | Ellis et al. | |
| 5,768,047 A | 6/1998 | Ulrich et al. | |
| 5,822,184 A | 10/1998 | Rabinovitz | |
| 5,867,344 A | 2/1999 | Ellis et al. | |
| 5,872,997 A | 2/1999 | Golson | |
| 5,892,633 A | 4/1999 | Ayres et al. | |
| 5,894,941 A | 4/1999 | Woodruff | |
| 5,914,831 A | 6/1999 | Lass et al. | |
| 5,920,709 A | 7/1999 | Hartung et al. | |
| 5,959,800 A | 9/1999 | Hartung et al. | |
| D415,126 S | 10/1999 | Egan | |
| 5,995,306 A | 11/1999 | Contreras et al. | |
| 6,005,745 A | 12/1999 | Filkins et al. | |
| 6,008,964 A | 12/1999 | Goodknight et al. | |
| 6,031,671 A | 2/2000 | Ayres | |
| 6,144,521 A | 11/2000 | Egan et al. | |
| 6,153,999 A | 11/2000 | Borrego | |
| 6,175,467 B1 | 1/2001 | Schneider et al. | |
| 6,229,666 B1 | 5/2001 | Schneider et al. | |
| 6,233,111 B1 | 5/2001 | Schneider et al. | |
| 6,236,530 B1 | 5/2001 | Schneider et al. | |
| 6,239,941 B1 | 5/2001 | Small | |
| 6,288,902 B1 | 9/2001 | Kim et al. | |
| D456,404 S | 4/2002 | Small et al. | |
| 6,385,003 B1 | 5/2002 | Ellis | |
| 6,388,875 B1 | 5/2002 | Chen | |
| D464,354 S | 10/2002 | Small | |
| 6,462,900 B1 | 10/2002 | Egan et al. | |
| 6,466,396 B1 | 10/2002 | Egan et al. | |
| 6,473,261 B1 | 10/2002 | Miller et al. | |
| 6,563,704 B2 | 5/2003 | Grouell et al. | |
| 6,612,499 B2 | 9/2003 | Ellis et al. | |
| 6,876,547 B2 | 4/2005 | McAlister | |
| 6,970,352 B2 | 11/2005 | Record et al. | |
| 7,012,805 B2 | 3/2006 | Shah et al. | |
| 7,180,702 B2 | 2/2007 | Ellis et al. | |
| 7,480,118 B2 * | 1/2009 | Ojima et al. | 360/92.1 |
| 2003/0235030 A1 | 12/2003 | Kwong et al. | |
| 2008/0013272 A1 | 1/2008 | Bailey et al. | |
| 2008/0112125 A1 | 5/2008 | Martin et al. | |

* cited by examiner

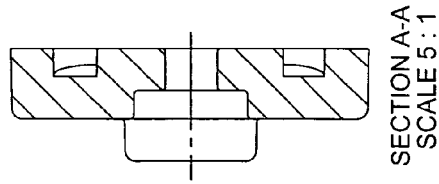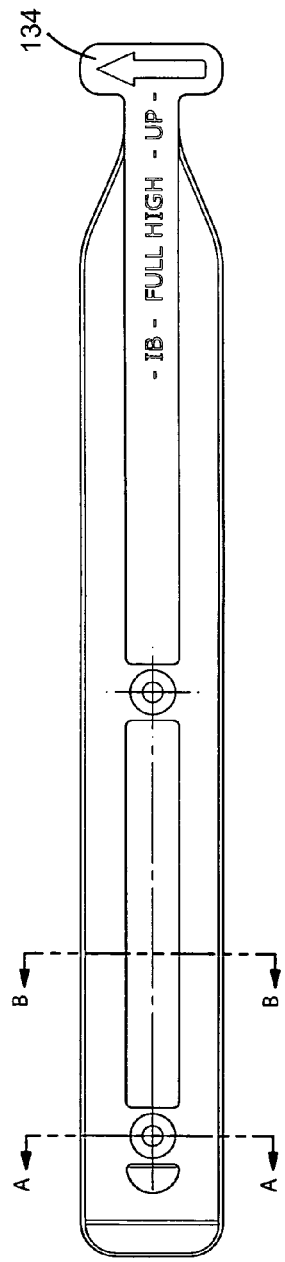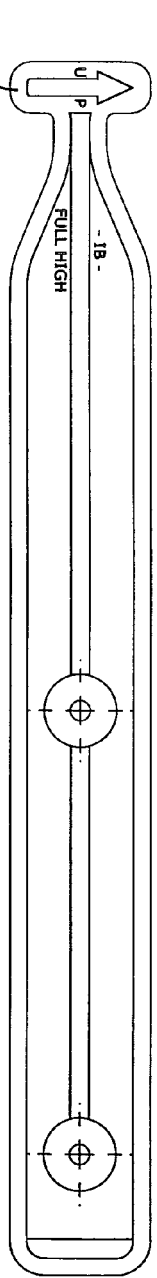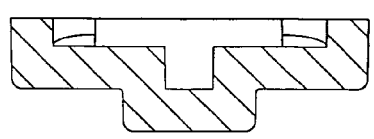

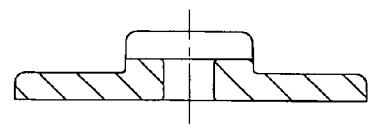
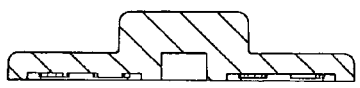
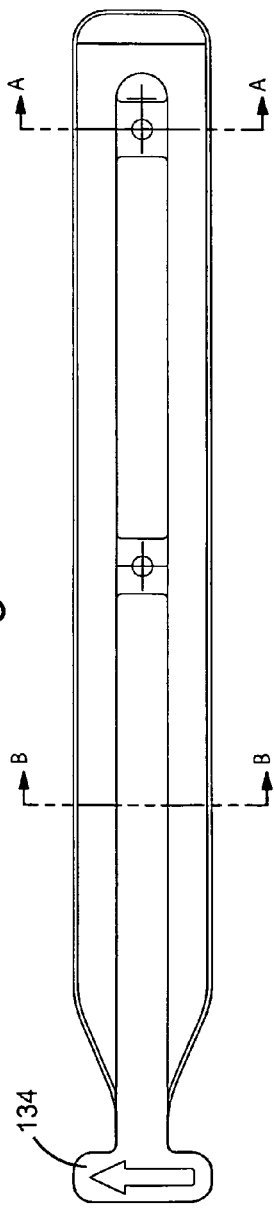
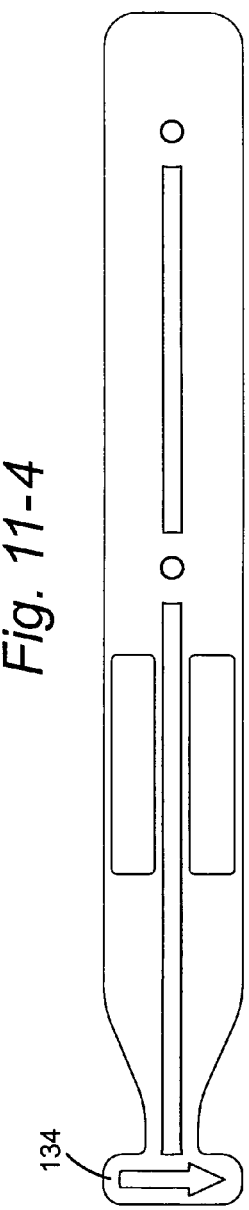
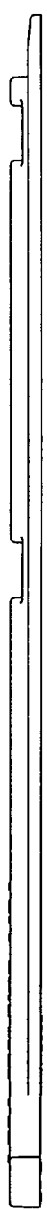

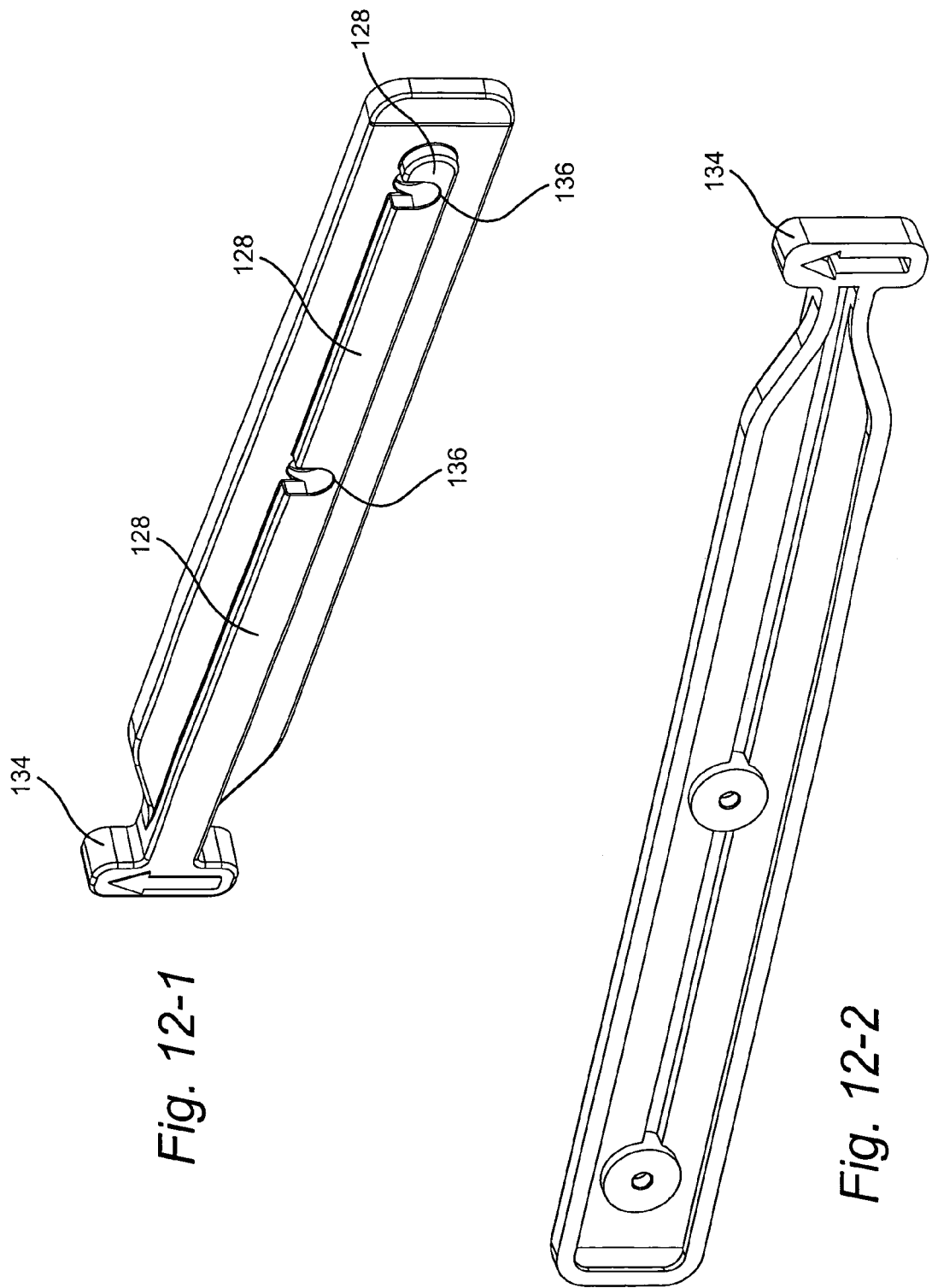

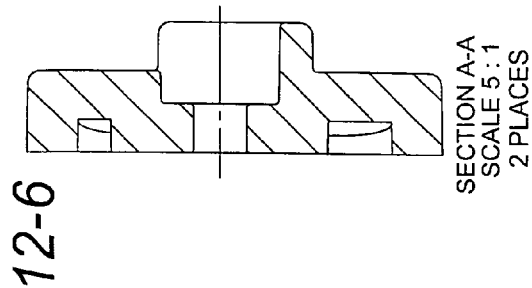
Fig. 12-6
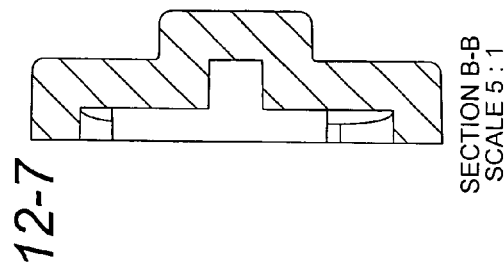
Fig. 12-7
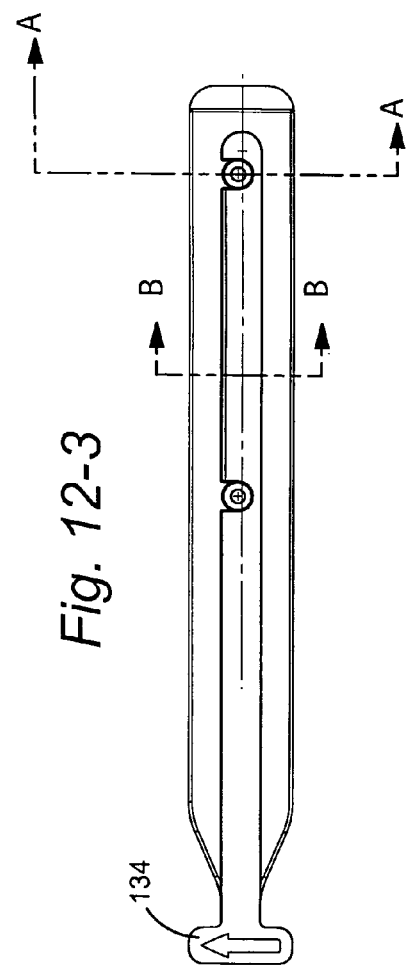
Fig. 12-3
Fig. 12-4
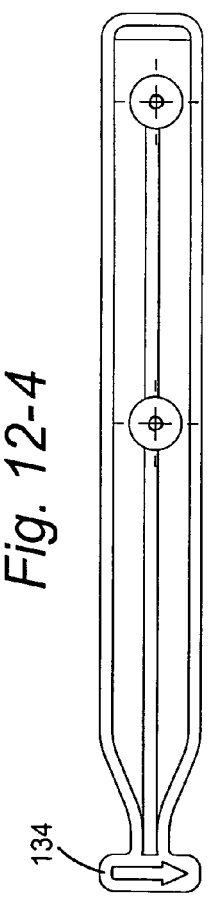
Fig. 12-5

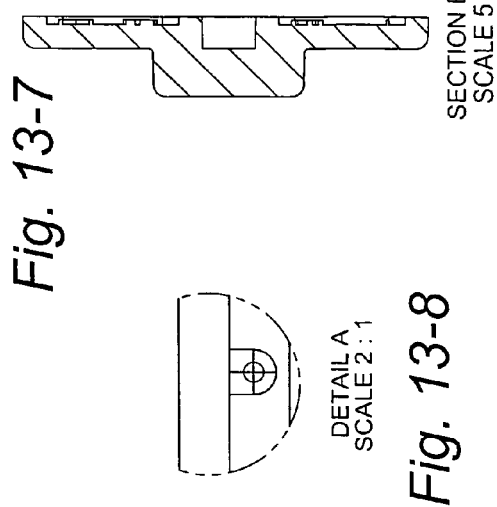
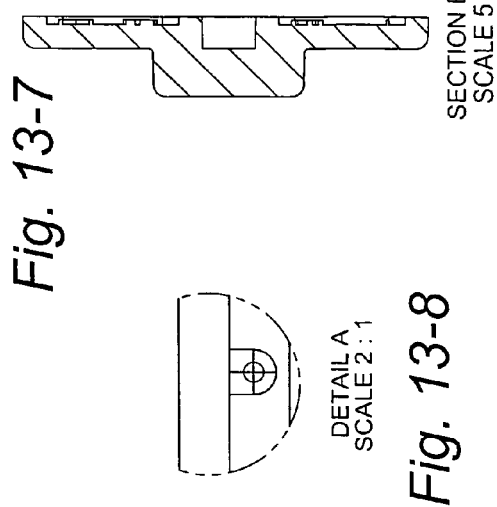
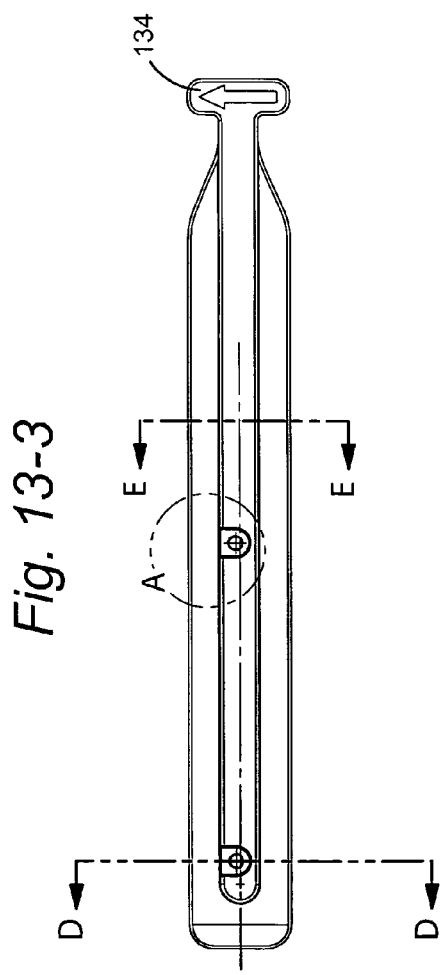
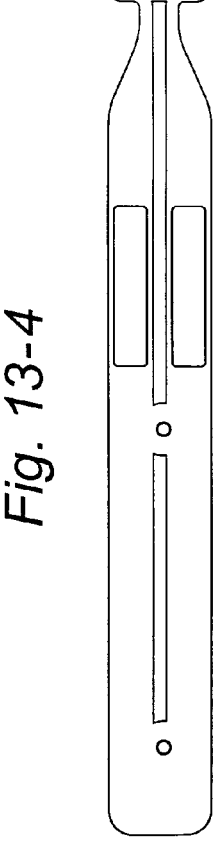

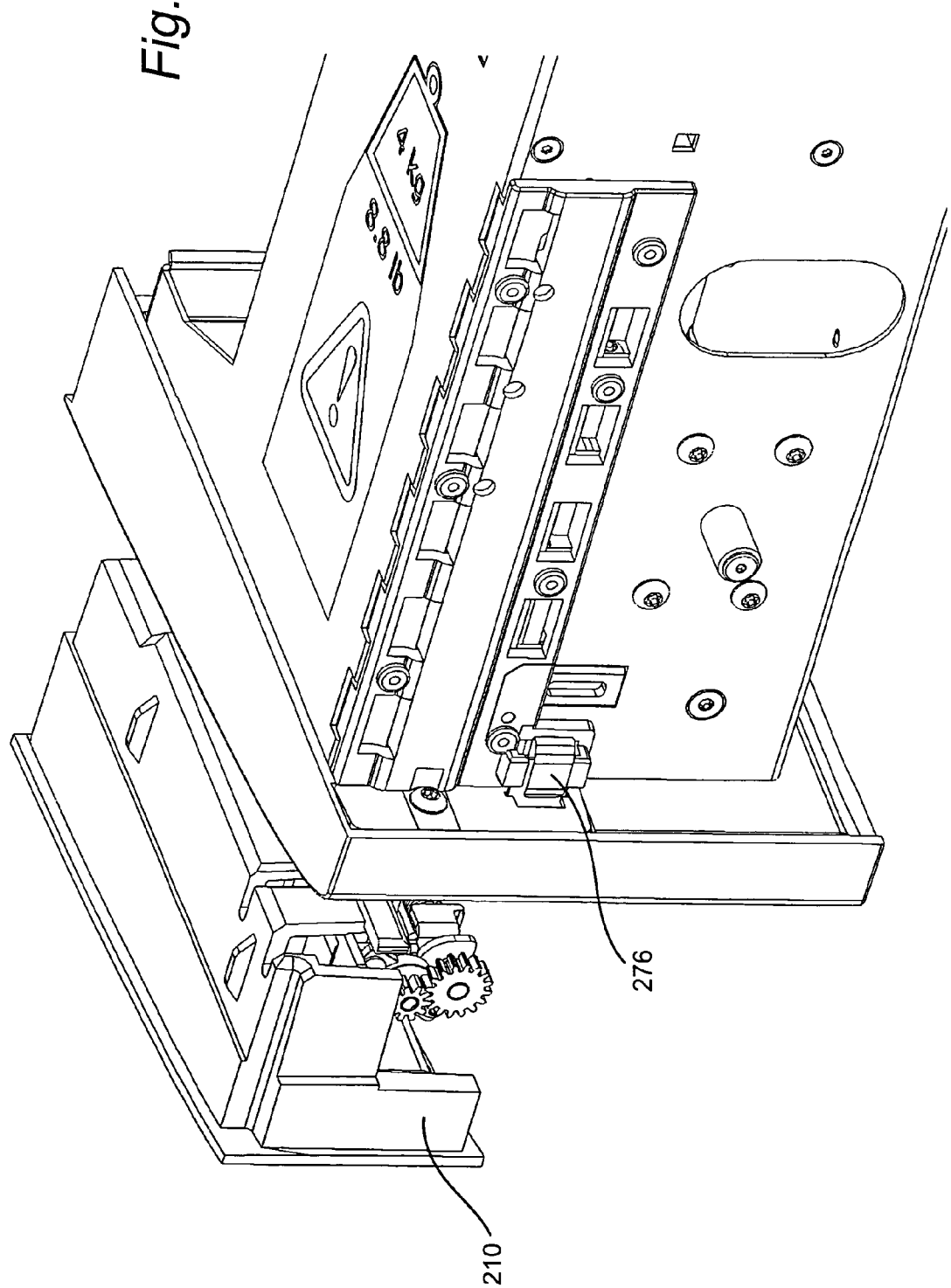

MULTI-DIMENSIONAL TRANSPORT METHOD AND DRIVE SUBSYSTEMS IN A CARTRIDGE LIBRARY APPARATUS

This application is related to the following simultaneously filed U.S. patent applications, each of which is incorporated herein by reference:

U.S. patent application Ser. No. 11/747,311, entitled "METHOD AND APPARATUS FOR POSITIONING DRIVES IN CARTRIDGE LIBRARY";

U.S. patent application Ser. No. 11/747,295, entitled "TRANSPORT METHOD AND APPARATUS FOR CARTRIDGE LIBRARY";

U.S. patent application Ser. No. 11/747,305, entitled "ENTRY/EXIT PORT METHOD AND APPARATUS FOR CARTRIDGE LIBRARY";

U.S. patent application Ser. No. 11/747,351, entitled "CARTRIDGE ENGAGEMENT APPARATUS AND METHOD FOR CARTRIDGE LIBRARY".

BACKGROUND

I. Technical Field

The present invention pertains to the storage of information, and particularly to automated cartridge handling systems such as cartridge autoloaders and cartridge libraries which store cartridges or cassettes of magnetic information storage media.

II. Related Art and Other Considerations

In the early days of computers, information requiring storage could be transmitted from a computer to a transducing drive. At the drive the information was magnetically recorded on or read from a large reel of media such as a tape. Upon completion of an operation of recording on media (such a magnetic media, for example), the reel would be removed manually from the drive and mounted in a rack. Another reel from the rack could then be manually mounted, if necessary, in the drive for transducing of information, e.g., for either an input (media reading) or output (recording to media) operation.

Eventually it became popular to enclose magnetic media in a cartridge, the cartridge being considerably smaller than the traditional reels. Initially such cartridges were employed for use in a "tape deck" for reproduction of audio information (e.g., music), but subsequently such cartridges, in differing sizes, were used to store such information as computer data. For years now magnetic media cartridges have proven to be an efficient and effective medium for data storage, including but not limited to computer back-up.

There are many different types of tape cartridges, the Linear Tape Open™ (LTO) cartridge being one example cartridge type according to an established standard in the tape drive industry. Other non-limiting examples include QIC, SLR, DLT and DAT/DDS, and eight millimeter cartridges.

Computer systems often need to access several cartridges. To this end, automated cartridge handling systems, often generally referred to as cartridge libraries, have been utilized for making the cartridges automatically available to the computer.

Typically, prior art automated cartridge handling systems have an array of storage positions for cartridges, one or more drives, and some type of automated changer or cartridge engagement/transport mechanism for picking or gripping a cartridge and moving the cartridge between a storage position and the drive. Many of these automated libraries resemble juke boxes, particularly for large computer systems. Some of the relatively smaller types of cartridge libraries are typically referred to as autoloaders. Autoloaders typically have but one drive, and a fairly small number of storage positions or cells.

Automated cartridge handling systems typically employ a cartridge changer or cartridge engagement/transport mechanism for picking or gripping a cartridge and moving the cartridge between a storage position and the drive. Such robotic mechanisms, often called a cartridge "picker" or "gripper", are typically mounted in a handling system (e.g., library or autoloader) frame in order to introduce and remove cartridges relative to one or more stationary drives.

The following United States patents and patent applications, all commonly assigned herewith and incorporated herein by reference, disclose various configurations of automated cartridge libraries, as well as subcomponents thereof (including cartridge engagement/transport mechanisms, entry/exit ports, and storage racks for housing cartridges):

U.S. Pat. No. 4,984,106 to Herger et al., entitled "CARTRIDGE LIBRARY SYSTEM AND METHOD OF OPERATION THEREOF".

U.S. Pat. No. 4,972,277 to Sills et al., entitled "CARTRIDGE TRANSPORT ASSEMBLY AND METHOD OF OPERATION THEREOF".

U.S. Pat. No. 5,059,772 to Younglove, entitled "READING METHOD AND APPARATUS FOR CARTRIDGE LIBRARY".

U.S. Pat. No. 5,103,986 to Marlowe, entitled "CARTRIDGE RACK".

U.S. Pat. Nos. 5,237,467 and 5,416,653 to Marlowe, entitled "CARTRIDGE HANDLING APPARATUS AND METHOD WITH MOTION-RESPONSIVE EJECTION".

U.S. Pat. No. 5,498,116 to Woodruff et al., entitled "ENTRY-EXIT PORT FOR CARTRIDGE LIBRARY".

U.S. Pat. No. 5,487,579 to Woodruff et al., entitled PICKER MECHANISM FOR DATA CARTRIDGES".

U.S. Pat. No. 5,718,339 to Woodruff et al., entitled "CARTRIDGE RACK AND LIBRARY FOR ENGAGING SAME".

U.S. Pat. No. 5,739,978, entitled "CARTRIDGE HANDLING SYSTEM WITH MOVING I/O DRIVE".

U.S. Pat. No. 6,008,964, entitled "CARTRIDGE LIBRARY AND METHOD OF OPERATION THEREOF".

U.S. patent application Ser. No. 08/970,205, entitled "CARTRIDGE LIBRARY WITH CARTRIDGE LOADER MOUNTED ON MOVEABLE DRIVE ASSEMBLY".

U.S. Pat. No. 6,005,745, entitled "CARTRIDGE LIBRARY WITH ENTRY/EXIT PORT AND METHOD OF OPERATION THEREOF".

U.S. Pat. No. 6,175,467, entitled "DATA CARTRIDGE LIBRARY WITH CARTRIDGE TRANSPORT ASSEMBLY".

U.S. Pat. No. 6,239,941, entitled "CARTRIDGE LIBRARY AND METHOD OF OPERATION".

U.S. Pat. No. 6,144,521, entitled "TAPE CARTRIDGE MAGAZINE WITH STRUCTURE TO PREVENT IMPOROPER LOADING OF CARTRIDGES".

U.S. Pat. No. 6,236,530, entitled "DATA CARTRIDGE LIBRARY HAVING A PIVOTING CARTRIDGE TRANSPORT".

U.S. Pat. No. 6,229,666, entitled "DATA CARTRIDGE LIBRARY HAVING A PIVOTING CARTRIDGE TRANSPORT".

U.S. Pat. No. 6,233,111, entitled "DATA CARTRIDGE LIBRARY HAVING A PIVOTING CARTRIDGE TRANSPORT AND A CARTRIDGE STATUS INDICATOR".

U.S. Pat. No. 6,466,396, entitled "CARTRIDGE LIBRARY".

U.S. Pat. No. 6,385,003, entitled "CARTRIDGE LIBRARY".

U.S. Pat. No. 6,462,900, entitled "CARTRIDGE PICKER ROBOT WITH RIBBON CABLE FOR cartridge library".

U.S. Design Pat. No. D456,404, entitled "CARTRIDGE LIBRARY".

U.S. Design Pat. No. D464,354, entitled "CARTRIDGE MAGAZINE".

U.S. Pat. No. 6,612,499, entitled "CALIBRATION SCHEME FOR AUTOMATED TAPE LIBRARY".

U.S. Pat. No. 6,473,261, entitled "CARTRIDGE OVER-INSERTION PROTECTION FOR CARTRIDGE LIBRARY".

U.S. Design Pat. No. D415,126, entitled "CARTRIDGE LIBRARY".

U.S. Pat. No. 7,180,702, entitled "Automated Handling of Data Cartridges".

It is desirable that at least some components of a cartridge library be as compact and efficient as possible, particularly the robot or cartridge engagement/transport apparatus of a cartridge library.

BRIEF SUMMARY

A cartridge library comprises at least one drive; a cartridge magazine; and, a transport mechanism configured to transport the cartridge between the magazine and the drive. The cartridge magazine comprises at least one cell configured to accommodate a cartridge of information storage media. The transport mechanism is configured to transport the cartridge between the magazine and the drive. The transport mechanism comprises a robot and a robot motive system.

The robot in turn comprises a robot carriage and a robot tray. The robot carriage carries or comprises cartridge engagement elements configured to selectively engage and release the cartridge. The robot tray is configured to facilitate linear motion of the robot carriage, the robot carriage being situated on a first side of the robot tray.

The robot motive system comprises three robot motive subsystems and a (robot) carriage motive subsystem. A robot first motive subsystem is configured to displace the robot linearly in a first direction. A robot second motive subsystem is configured to rotate the robot at last partially about an axis extending in a second direction (the second direction being orthogonal to the first direction). The carriage motive system is configured to displace the robot carriage linearly in a third direction toward and away from the cartridge magazine (the third direction being orthogonal to the first direction and to the second direction). A robot third motive subsystem is configured to displace the robot linearly in the second direction.

The third motive subsystem comprises an elevator frame having planks extending in the first direction and having a plank height in the second direction. At least one of the robot motive subsystems and the carriage motive subsystem comprise hardware situated on a second side of the robot tray, the hardware extending from the second side of the robot tray in the second direction to an extent not substantially greater than the plank height. Locating the hardware of plural subsystems on the second side of the robot tray and within a volume defined by the robot tray and the plank height facilitate not only a transport mechanism, but also a compact and efficient library.

Preferably the hardware situated on the second side of the robot tray is also situated between the planks with respect to the third direction.

In an example embodiment, the hardware of at least one of the subsystems that is situated on the second side of the robot tray is an ultimate gear of the subsystem. An ultimate gear of a subsystem is either the only or last acting gear in a gear chain affecting motion of the system.

Whereas at least some of the hardware of the subsystem(s) is situated on the second side of the robot tray, at least one of the robot motive subsystems and the carriage motive subsystem comprise a motor situated on the first side of the robot tray. Therefore, the motor is connected (e.g., via gearing or a pinion) through the robot tray to the operative hardware on the second side of the robot tray.

The robot third motive subsystem further comprises a scissors assembly configured to facilitate movement of the elevator frame in the second direction.

In an example embodiment, the robot first motive subsystem comprises a first gear situated on the second side of the robot tray and the carriage motive subsystem comprises a second gear situated on the second side of the robot tray. In such embodiment, the first gear and the second gear are stacked in concentric manner. A friction reducing material axially is preferably positioned between the first gear and the second gear. The friction reducing material preferably comprises ultra high molecular weight polyethylene.

The robot first motive subsystem comprises a robot track extending in the first direction. The robot track is supported by the planks of the elevator frame. Moreover, the robot first motive subsystem comprises a pinion configured to engage the robot track, the pinion being situated on the second side of the robot tray.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention. In certain drawings in which dimensions are supplied, such dimensions are merely for sake of illustrating a particular embodiment and are not limiting or restrictive in any sense.

FIG. 8-1 is a top perspective view of a drive glide strip according to a an example embodiment.

FIG. 8-2 is a bottom perspective view of the drive glide strip of FIG. 8-1.

FIG. 8-3 is a front view of the drive glide strip of FIG. 8-1.

FIG. 8-4 is a rear view of the drive glide strip of FIG. 8-1.

FIG. 8-5 is a top view of the drive glide strip of FIG. 8-1.

FIG. 8-6 is a side sectional view of the drive glide strip of FIG. 8-1 taken along line A-A of FIG. 8-3.

FIG. 8-7 is a side sectional view of the drive glide strip of FIG. 8-1 taken along line B-B of FIG. 8-3.

FIG. 9-1 is a top perspective view of a drive glide strip according to another example embodiment.

FIG. 9-2 is a bottom perspective view of the drive glide strip of FIG. 9-1.

FIG. 9-3 is a front view of the drive glide strip of FIG. 9-1.

FIG. 9-4 is a rear view of the drive glide strip of FIG. 9-1.

FIG. 9-5 is a top view of the drive glide strip of FIG. 9-1.

FIG. 9-6 is a side sectional view of the drive glide strip of FIG. 9-1 taken along line A-A of FIG. 9-3.

FIG. 9-7 is a side sectional view of the drive glide strip of FIG. 9-1 taken along line B-B of FIG. 9-3.

FIG. 10-1 is a top perspective view of a drive glide strip according to another example embodiment.

FIG. 10-2 is a bottom perspective view of the drive glide strip of FIG. 10-1.

FIG. 10-3 is a front view of the drive glide strip of FIG. 10-1.

FIG. 10-4 is a rear view of the drive glide strip of FIG. 10-1.

FIG. 10-5 is a top view of the drive glide strip of FIG. 10-1.

FIG. 10-6 is a side sectional view of the drive glide strip of FIG. 10-1 taken along line A-A of FIG. 10-3.

FIG. 10-7 is a side sectional view of the drive glide strip of FIG. 10-1 taken along line B-B of FIG. 10-3.

FIG. 11-1 is a top perspective view of a drive glide strip according to another example embodiment.

FIG. 11-2 is a bottom perspective view of the drive glide strip of FIG. 11-1.

FIG. 11-3 is a front view of the drive glide strip of FIG. 11-1.

FIG. 11-4 is a rear view of the drive glide strip of FIG. 11-1.

FIG. 11-5 is a top view of the drive glide strip of FIG. 11-1.

FIG. 11-6 is a side sectional view of the drive glide strip of FIG. 11-1 taken along line A-A of FIG. 11-3.

FIG. 11-7 is a side sectional view of the drive glide strip of FIG. 11-1 taken along line B-B of FIG. 11-3.

FIG. 12-1 is a top perspective view of a drive glide strip according to another example embodiment.

FIG. 12-2 is a bottom perspective view of the drive glide strip of FIG. 12-1.

FIG. 12-3 is a front view of the drive glide strip of FIG. 12-1.

FIG. 12-4 is a rear view of the drive glide strip of FIG. 12-1.

FIG. 12-5 is a top view of the drive glide strip of FIG. 12-1.

FIG. 12-6 is a side sectional view of the drive glide strip of FIG. 12-1 taken along line A-A of FIG. 12-3.

FIG. 12-7 is a side sectional view of the drive glide strip of FIG. 12-1 taken along line B-B of FIG. 12-3.

FIG. 13-1 is a top perspective view of a drive glide strip according to another example embodiment.

FIG. 13-2 is a bottom perspective view of the drive glide strip of FIG. 13-1.

FIG. 13-3 is a front view of the drive glide strip of FIG. 13-1.

FIG. 13-4 is a rear view of the drive glide strip of FIG. 13-1.

FIG. 13-5 is a top view of the drive glide strip of FIG. 13-1.

FIG. 13-6 is a side sectional view of the drive glide strip of FIG. 13-1 taken along line D-D of FIG. 13-3.

FIG. 13-7 is a side sectional view of the drive glide strip of FIG. 13-1 taken along line E-E of FIG. 13-3.

FIG. 13-8 is an enlarged view of a portion of FIG. 13-3.

FIG. 27C illustrates a flag adapted to engage the sensor.

FIG. 43A, FIG. 43B, and FIG. 43C are top views of the structure of FIG. 42, wherein FIG. 43A shows a robot midway through a cartridge pick cycle wherein the two cartridge engagement hooks begin to engage a cartridge; wherein FIG. 43B shows a robot at a full engagement point in the cartridge pick cycle wherein the two cartridge engagement hooks have engaged a cartridge; and wherein FIG. 43C shows a robot at a withdrawal point in the cartridge pick cycle wherein the two cartridge engagement hooks have withdrawn from a recessed feature of the cartridge.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 1:
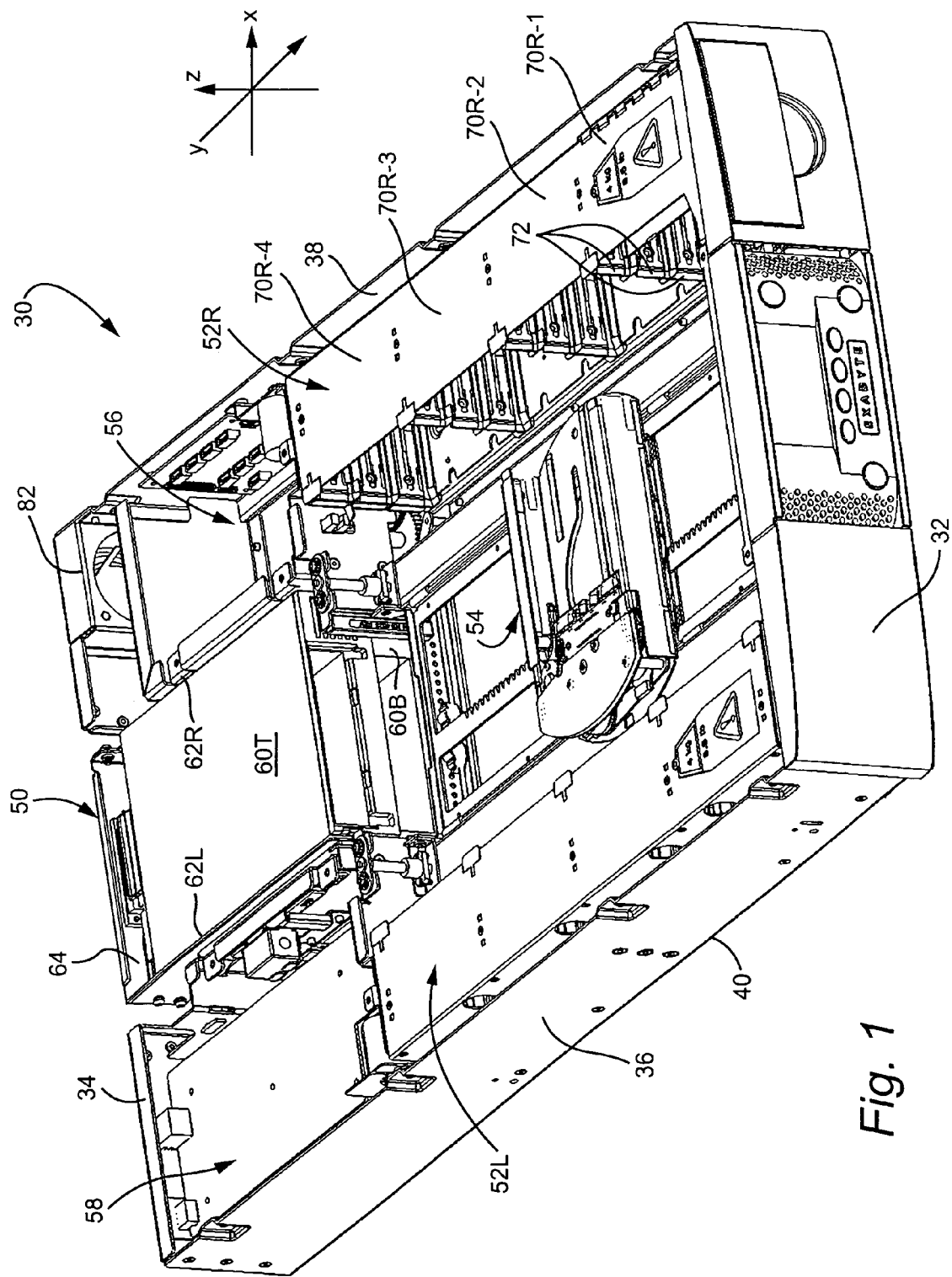
FIG. 1 is a top left perspective view of an automated cartridge library according to an example embodiment.
Figure 2:
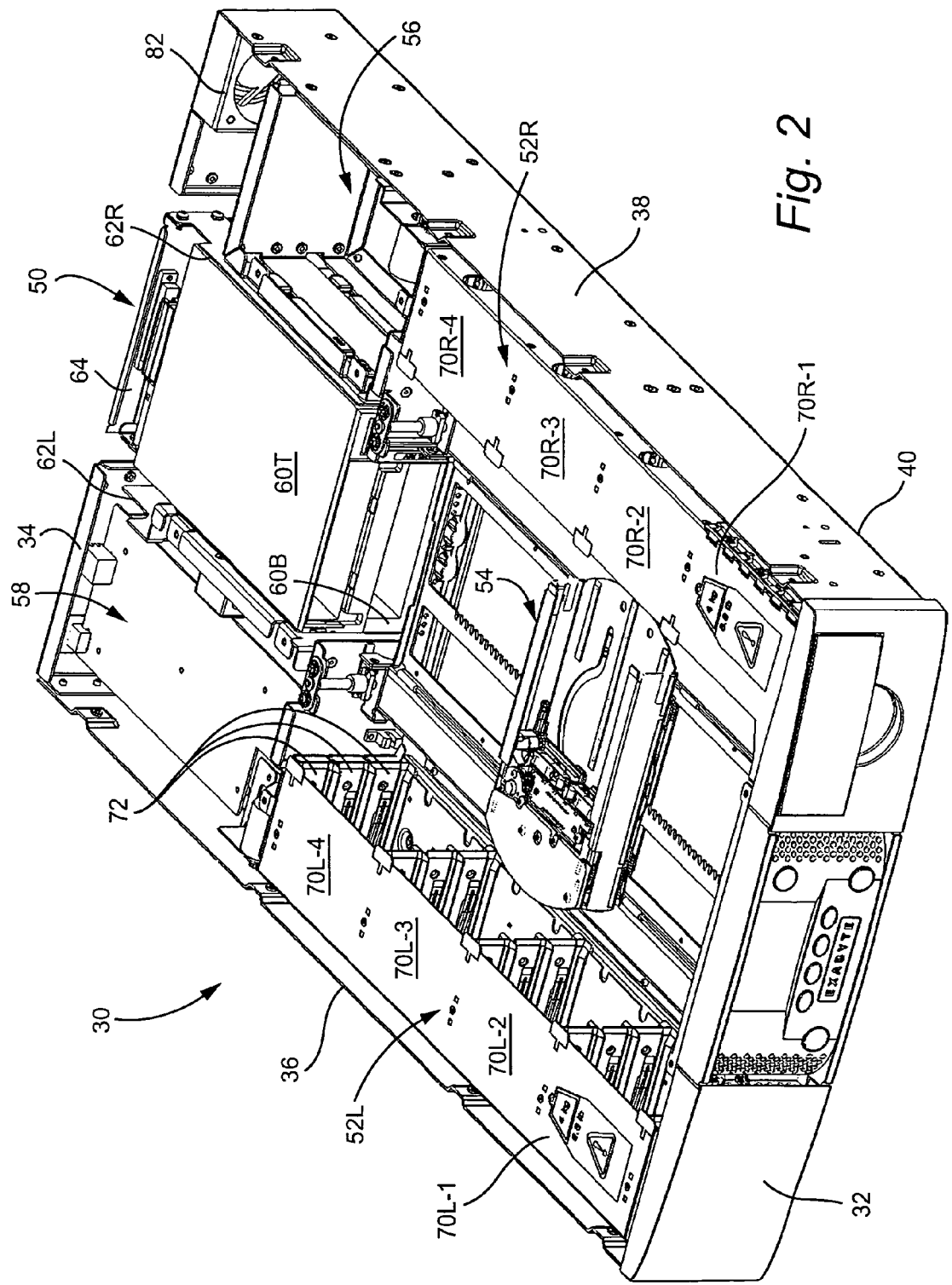
FIG. 2 is a top right perspective view of the automated cartridge library of FIG. 1.

FIG. 1 and FIG. 2 illustrate an example embodiment of an automated cartridge library 30. The automated cartridge library 30 comprises an essentially rectangular frame having a library front cover 32; library rear wall 34; library left sidewall 36; library right sidewall 38; and library floor 40. The automated cartridge library 30 further includes a library top cover which is removed in FIG. 1 and FIG. 2 to permit viewing of various constituent elements and subsystems of automated cartridge library 30.

FIG. 1 also establishes a three dimension axes notation for automated cartridge library 30. As shown in FIG. 1, a library X axis extends across a width of the automated cartridge library 30 from library left sidewall 36 to library right sidewall 38; a library Y axis extends across a depth of automated cartridge library 30 from library front cover 32 to library rear wall 34; and, a library Z axis extends across a height of automated cartridge library 30 from library floor 40 to the unillustrated cover. These particular axes or dimensions will herein be referenced as "library axes" or "library dimensions", and apply to all references to dimensions or axes mentioned herein unless otherwise indicated.

FIG. 1 and FIG. 2 show various elements or subsystems of automated cartridge library 30, including drive bay 50; two cartridge magazines 52L and 52R; cartridge transport mechanism 54; electronics bay 56; and power supply bay 58. The electronics bay 56 can include, e.g., a library controller or processor. Each of these and other elements or subsystems of automated cartridge library 30 are discussed subsequently.

The drive bay 50 is located at a rear central portion of automated cartridge library 30. In the particular example embodiment illustrated in FIG. 1 and FIG. 2, drive bay 50 accommodates two drives 60-B and 60-T. The second or top drive 60-T is stacked vertically (in the Z axis) on the first or bottom drive 60-B. The drive bay 50 is defined by two opposing drive bay sidewalls 62L and 62R, both of which extend in a Y-Z plane, as well as drive bay rear wall 64.

The drives 60 can be any type of apparatus which transducer information from a storage medium, e.g., magnetic storage medium for example. Although the illustrations particularly show the drives 60 as being of a type that accommodate and transduce information stored in a cartridge on magnetic tape, other media are possible, including (for example, magnetic disc, optical medium, optical disc, etc.). Further, in subsequent illustrations the particular cartridge illustrated happens to be a magnetic tape cartridge of the type known as an LTO (Linear Tape Open™). However, the structure encompassed hereby is not limited to any particular type of medium or cartridge, and even different types of tape cartridges are encompassed such as, by way of non-limiting examples, QIC, SLR, DLT and DAT/DDS, and eight millimeter cartridges.

The two cartridge magazines 52L and 52R extend along interior surfaces of respective library sidewalls 36 and 38 from just inside library front cover 32 almost to an X-Z plane that substantially includes front walls of drives 60. Each cartridge magazine 52 comprises plural cartridge magazine sections 70, with each cartridge magazine section 70 comprising plural cartridge cells 72. For example, cartridge magazine 52R comprises four cartridge magazine sections 70R, starting with cartridge magazine section 70R-1 positioned at the back of library front cover 32 and continuing to cartridge magazine section 70R-4 proximate the X-Z plane that substantially includes the front walls of drives 60. Similarly, cartridge magazine 52L comprises four cartridge magazine sections 70R, starting with cartridge magazine section 70L-1 positioned at the back of library front cover 32 and continuing to cartridge magazine section 70L-4 proximate the X-Z plane that substantially includes the front walls of drives 60. In the illustrated example embodiment, each cartridge magazine section 70 includes three vertically arranged cartridge cells 72, each cell configured to accommodate a cartridge of information media. In particular, each cartridge magazine section 70, and hence each cartridge cell 72, has an open face in a Y-Z plane which is oriented toward a center of automated cartridge library 30 so that cartridge transport mechanism 54 can insert or remove a cartridge of information media from the respective cartridge cell 72.

Figure 3:
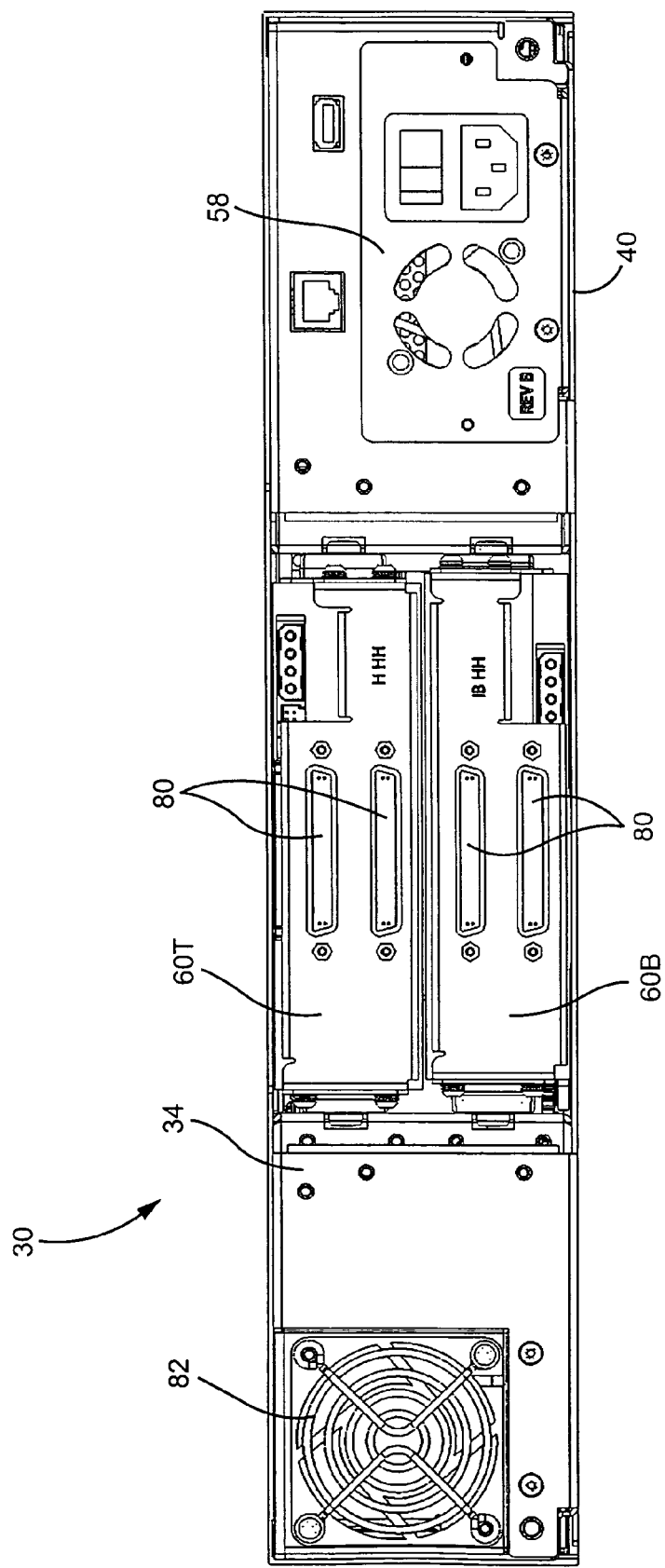
FIG. 3 is a rear view of the automated cartridge library of FIG. 1.

FIG. 3 shows the rear of automated cartridge library 30 and features of various elements which are inserted into or otherwise housed at the rear of automated cartridge library 30. For example, FIG. 3 shows a rear of power supply bay 58; a rear panel of drive 60T and drive 60B (including connector terminals 80 for the drives 60); and, a ventilation fan 82 which is situated at the rear of electronics bay 56.

Drive Mounting

Figure 4:
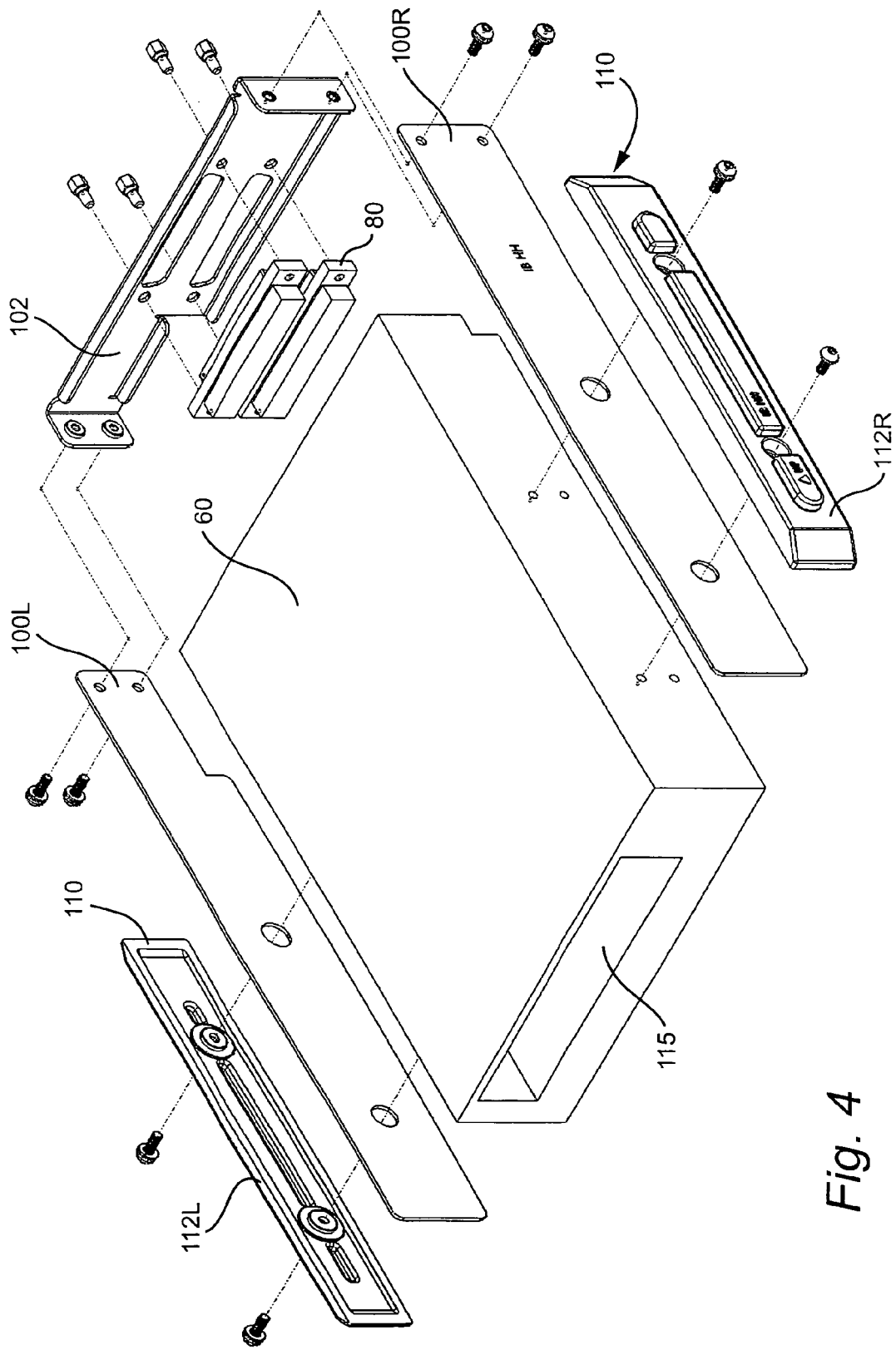
FIG. 4 is an exploded view of a drive and its drive drawer, as well as drive mounting mechanisms.

FIG. 4 shows how a generic drive 60 is typically formed into a insertable unit which can be slid into drive bay 50 from the rear of automated cartridge library 30. The insertable unit can be or essentially form a drawer 100 for the drive 60, and as such includes drive drawer left sidewall 100L, drive drawer right sidewall 100R; and drive drawer rear wall 102. Also shown in FIG. 4 are drive connectors 80. The drawer left sidewall 100L, drive drawer right sidewall 100R; and drive drawer rear wall 102 are affixed to drive 60 by various fasteners, as also shown in FIG. 4. In addition, as hereinafter explained, the drawer 100 has attached thereto (also by fasteners) drive mounting mechanism 110. In an example implementation, the drive mounting mechanism 110 comprises a pair of drive glide strips 112, e.g., left drive glide strip 112L and right drive glide strip 112R.

Figure 5:
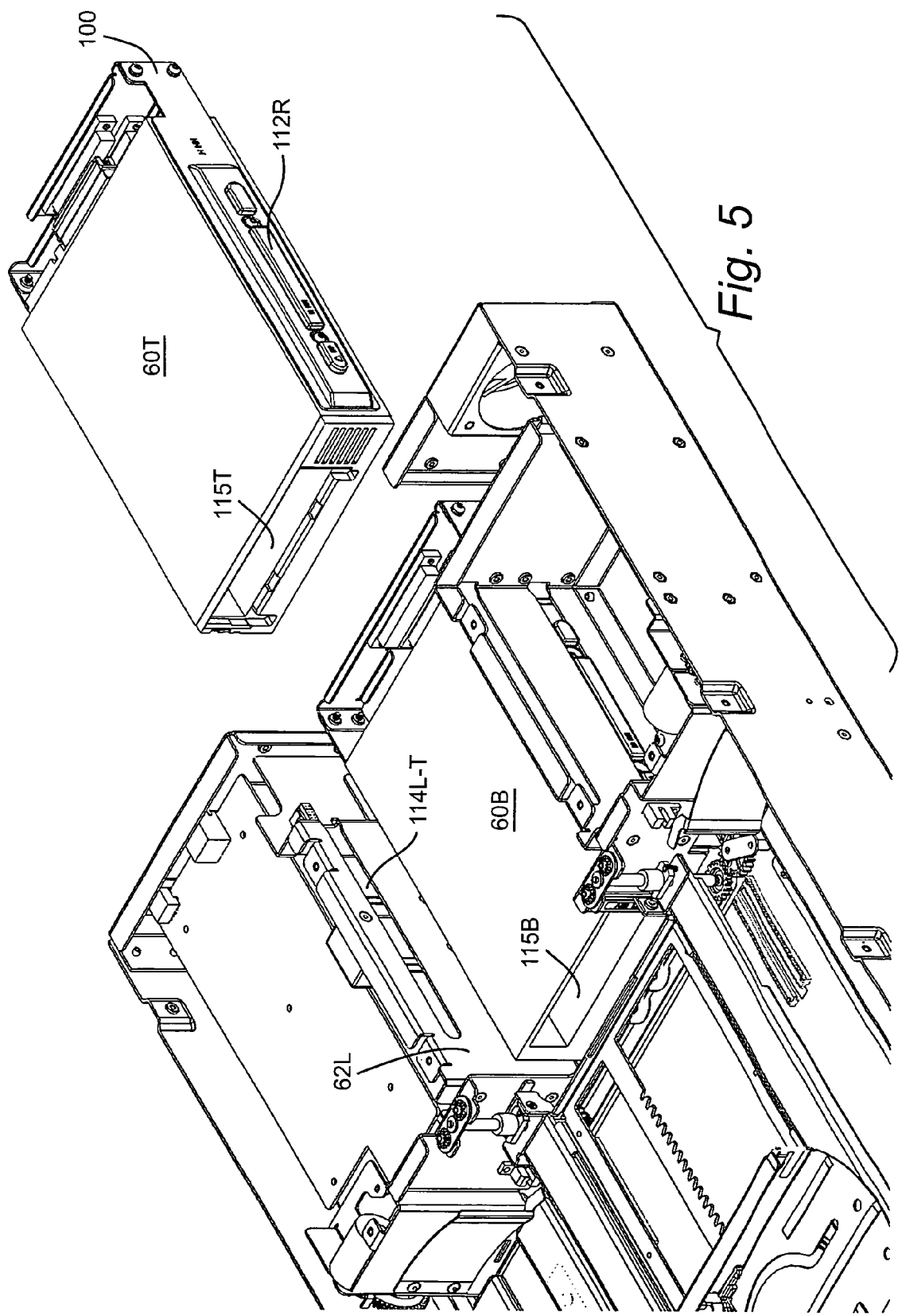
FIG. 5 is a top perspective view of a rear portion of the cartridge library of FIG. 1 with cover removed, and showing particularly insertion of a drive into a drive bay.
Figure 6:
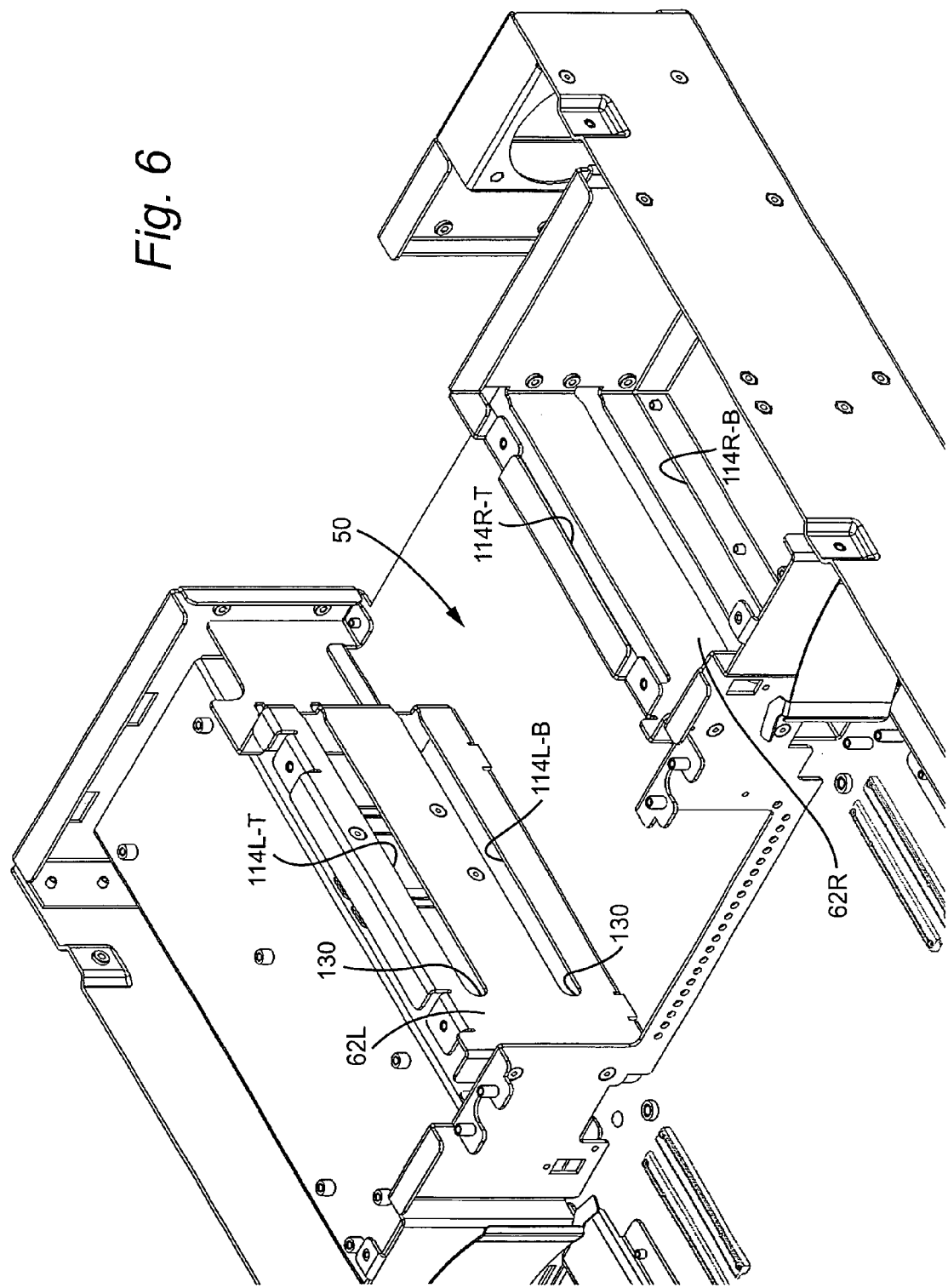
FIG. 6 is a top perspective view of a rear portion of the cartridge library of FIG. 1 with cover removed, and particularly of a drive bay without drives.

FIG. 5 shows a situation in which drive 60B has already been inserted into drive bay 50, and drive 60T is about to be inserted. In particular, insertion of a drive 60 into automated cartridge library 30 is accomplished by sliding the respective drive drawer 100 into drive bay 50 from the rear of automated cartridge library 30. In particular, the drive glide strips 112 are slid into guide receiver slots 114L and 114R formed on drive bay sidewalls 62L and 62R, respectively. For each drive 60 (and hence for each drive drawer 100) the drive bay 50 has vertically aligned guide receiver slots 114 formed on opposing drive bay sidewalls 62, i.e., for each of drive 60T and drive 60B, drive bay sidewall 62L has a guide receiver slot 114L and drive bay sidewall 62R has a guide receiver slot 114R. The guide receiver slots 114L-B, 114R-B are vertically aligned (e.g., positioned along the Z axis) appropriately for drive 60B; and similarly the guide receiver slots 114L-T, 114R-T are vertically aligned (e.g., positioned along the Z axis) appropriately for drive 60T. FIG. 6 further shows drive bay 50 (without drives), and particularly the location of guide receiver slots 114L-B, 114R-B for drive 60B and guide receiver slots 114L-T, 114R-T for drive 60T.

Thus, the automated cartridge library 30 has plural drive mounting mechanisms 110, e.g., a tape guide mounting mechanism for each of its plural drives 60. For example, drive 60T has drive mounting mechanism 110T (comprising, e.g., drive glide strips 112T-L and 112T-R) while drive 60B has drive mounting mechanism 110B (comprising, e.g., drive glide strips 112B-L and 112B-R).

Each drive 60 includes a load tray 115 adapted to receive a cartridge of information media from the cartridge transport mechanism 54, e.g., load tray 115T for drive 60T and load tray 115B for drive 60B. Because drives from different manufacturers may have the load trays in different locations, each drive 60T and 60B has a respective drive mounting mechanism 110T and 110B that is structured to align the load trays 115T and 115B regardless of manufacture.

That is, linear tape-open (LTO) drives from different manufacturers may have the load trays in different locations both horizontally and vertically. In an example implementation of an automated cartridge library 30, the cartridge transport mechanism 54 may provide elevator (vertical) motion and the cartridge transport mechanism 54 can be calibrated to find the vertical location of each load tray 115T and 115B. However, the cartridge transport mechanism 54 may have no lateral motion capability to find the horizontal location of each load tray 115T and 115B. Therefore, it is necessary for each of the load trays 115T and 115B to be horizontally aligned with the cartridge transport mechanism 54 for reliable operation of the cartridge transport mechanism 54.

Figure 7:
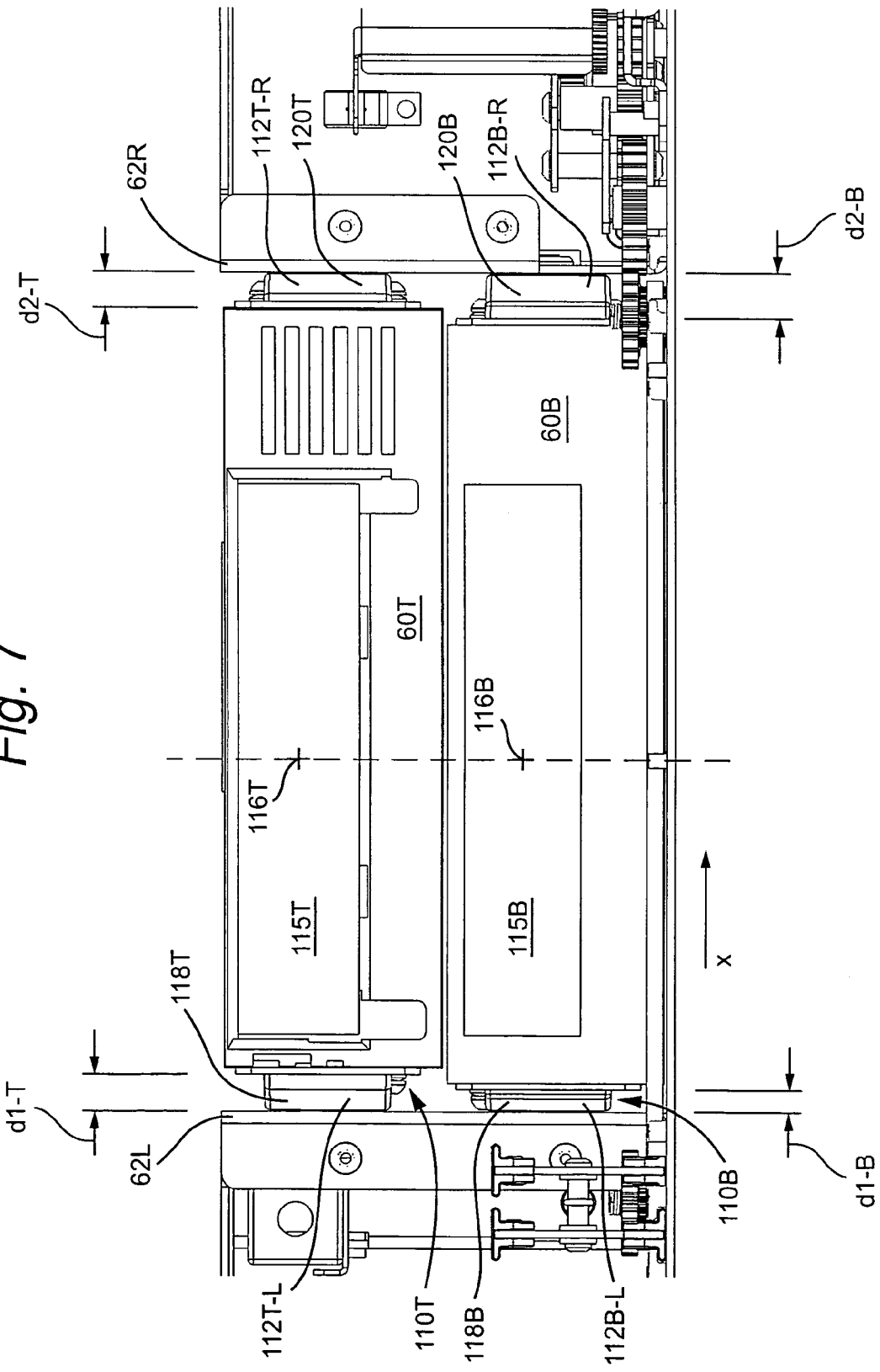
FIG. 7 is a front view of a drive bay portion of the automated cartridge library of FIG. 1.

In the illustrated embodiment, the drive mounting mechanism 110T facilitates accommodation of the drive 60T into the drive bay 50 and positions the load tray 115T of the drive 60T in a predetermined alignment position with respect to the width of the drive bay, i.e., with respect to a horizontal direction or the library X axis as viewed in FIGS. 1 and 7. The horizontal direction or library X axis is essentially orthogonal to a vertical direction or the library Z axis as viewed in FIG. 1. The drive mounting mechanism 110B similarly facilitates accommodation of a drive 60B into the drive bay 50 and positions the load tray 115B of the drive 60B in the predetermined alignment position with respect to the width of the drive bay, i.e., with respect to the horizontal direction. Thus, a center 116T of the load tray 115T of the drive 60T and a center 1116B of the load tray 115B of the drive 60B are aligned at the same point along the horizontal direction or the X axis as shown in FIG. 7.

In order to facilitate the alignment of the load trays of different types of drives at the same predetermined alignment position, the drive mounting mechanism 110T and the drive mounting mechanism 110B respectively position the drive 60T and the drive 60B at differing distances from the opposing sidewalls 62L and 62R of the drive bay 50 with respect to the horizontal direction. That is, the positioning of the drive 60T within the drive bay 50 and positioning of the drive 60B within the drive bay 50 is offset with respect to the horizontal direction.

As noted above, drive mounting mechanism 110T for drive 60T includes drive glide strips 112T-L and 112T-R, and drive mounting mechanism 110B for drive 60B includes drive glide strips 112B-L and 112B-R. The combined total thickness of the two glide strips for each drive is constant for all the drives regardless of manufacturer. By varying the relative thickness of these drive glide strips (e.g., thinner glide strip on one side of the drive and thicker glide strip on the other side of the drive), all of the different lateral locations of the load trays can be aligned with the cartridge transport mechanism 54. In an example implementation, FIG. 7 shows two different types of drives 60T and 60B, having different lateral locations for their load trays 115T and 115B. By varying the relative thickness of the drive glide strips 112T-L and 112T-R, 112B-L and 112B-R for each drive 60T and 60B, the lateral locations for both load trays 115T and 115B are aligned when the drives 60T and 60B are slid into drive bay 50.

FIG. 7 illustrates a first member 118T of the pair of drive glide strips 112T-L and 112T-R that is positioned on the drive bay sidewall 62L and a second member 120T of the pair of drive glide strips 112T-L and 112T-R that is positioned on the drive bay sidewall 62R. Similarly, a first member 118B of the pair of drive glide strips 112B-L and 112B-R is positioned on the drive bay sidewall 62L and a second member 120B of a pair of drive glide strips 112B-L and 112B-R is positioned on the drive bay sidewall 62R.

As illustrated, the first member 118T of the first pair of drive glide strips 112T-L and 112T-R has a different dimension in the horizontal direction than the first member 118B of the second pair of drive glide strips 112B-L and 112B-R. Similarly, the second member 120T of the first pair of drive glide strips 112T-L and 112T-R has a different dimension in the horizontal direction than the second member 120B of the second pair of drive glide strips 112B-L and 112B-R. That is, the dimension d1-T of the first member 118T is different than the dimension d1-B of the first member 118B, and the dimension d2-T of the second member 120T is different than the dimension d2-B of the second member 120B.

Yet, with respect to the horizontal direction, a sum of dimensions of the first member 118T and the second member 120T of the first pair of drive glide stripes 112T-L and 112T-R (i.e., d1-T+d2-T) is substantially equal to a sum of dimensions of the first member 118B and the second member 120B of the second pair of drive glide stripes 112B-L and 112B-R (i.e., d1-B+d2-B). That is, each different drive 60T and 60B has a different pair of drive glide strips, i.e., one thick member and one thin member for each pair, but the combined total thickness of the two glide strips for each different drive 60T and 60B is constant for all the drives regardless of manufacturer.

Figures 1, 2, 8:
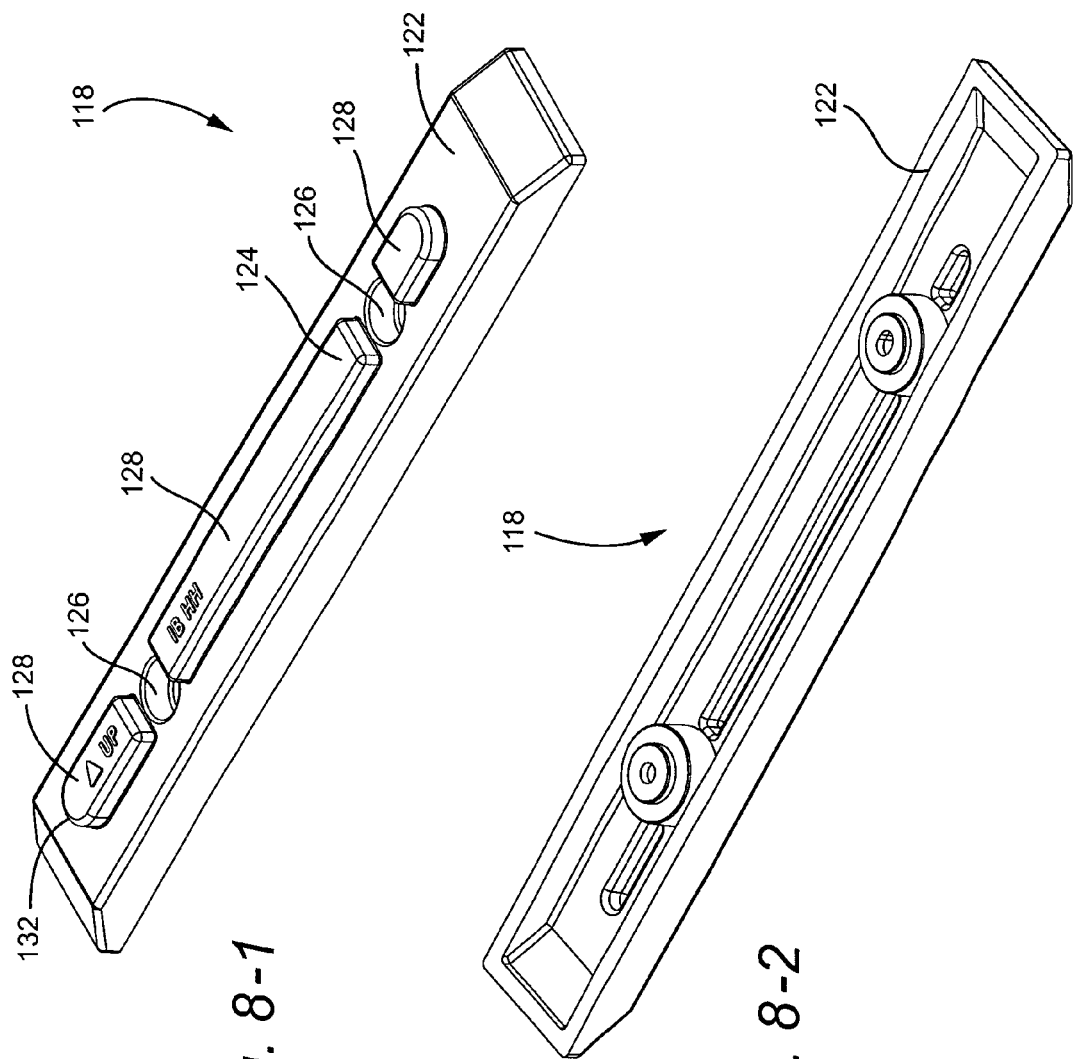
Figures 6, 8:
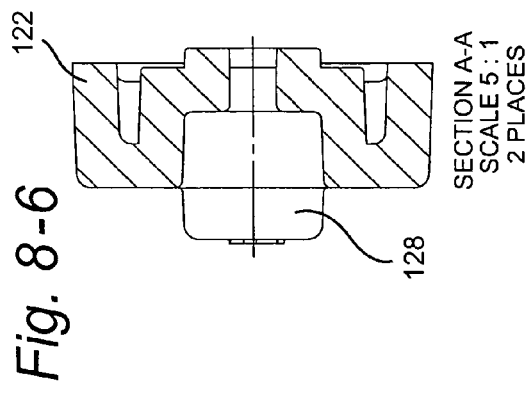
Figures 7, 8:
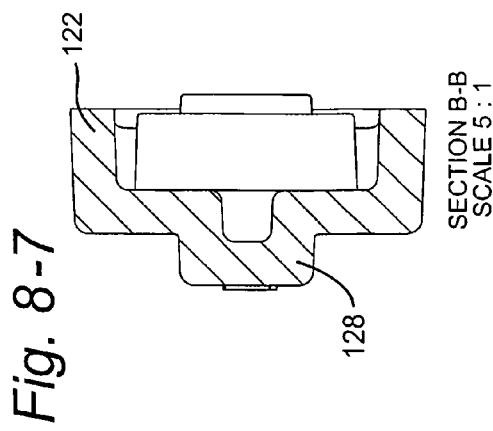
Figures 3, 8:
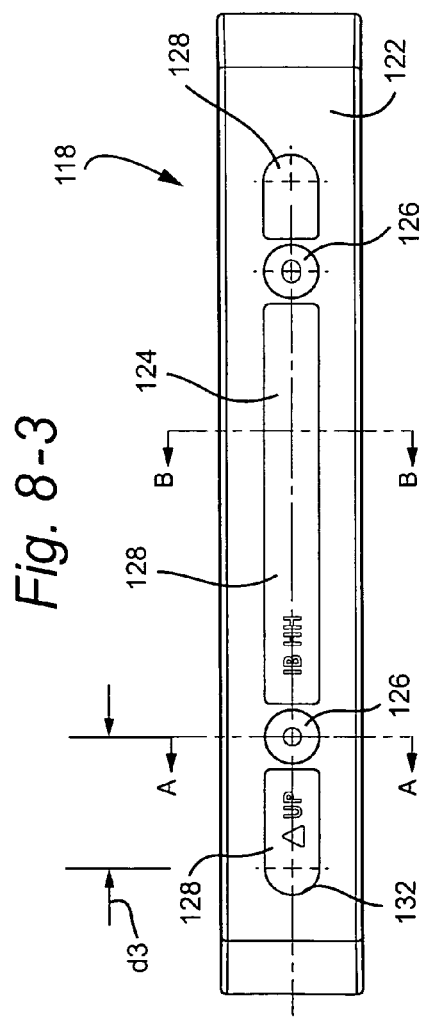
Figures 4, 8:
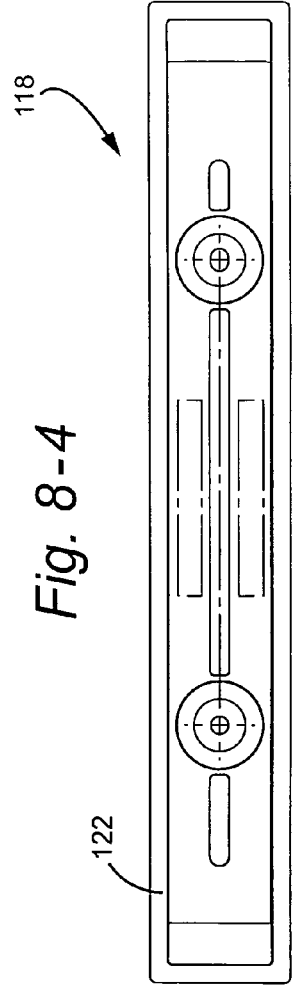
Figures 5, 8:
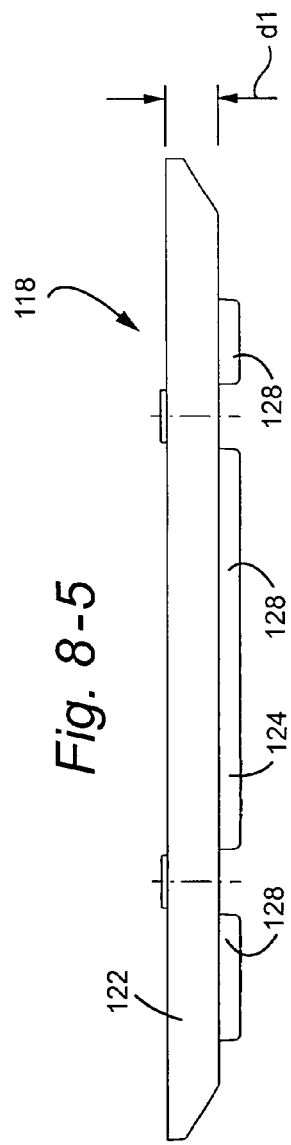
Figures 1, 2, 9:
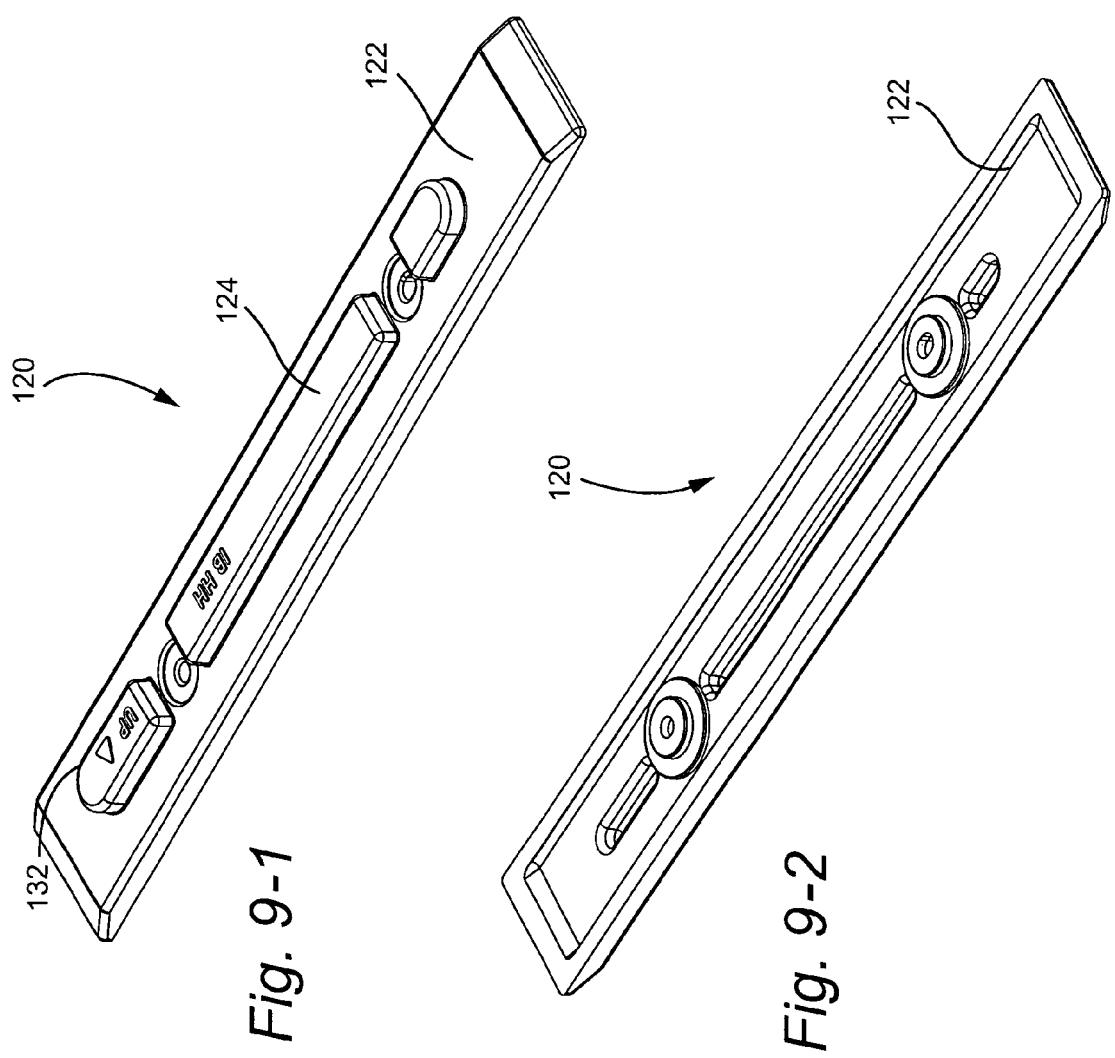
Figures 6, 9:
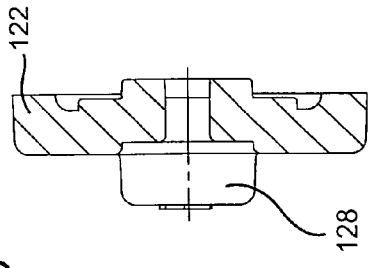
Figures 7, 9:
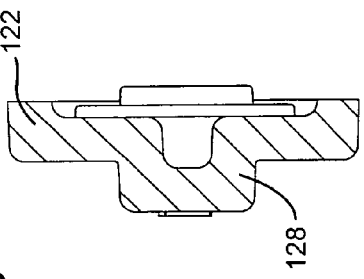
Figures 3, 9:
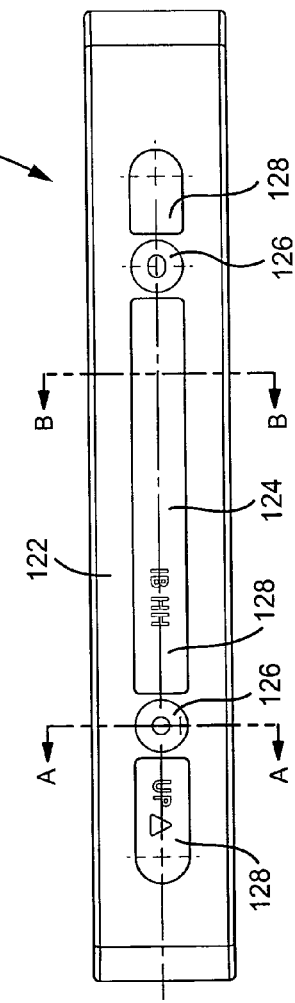
Figures 4, 9:
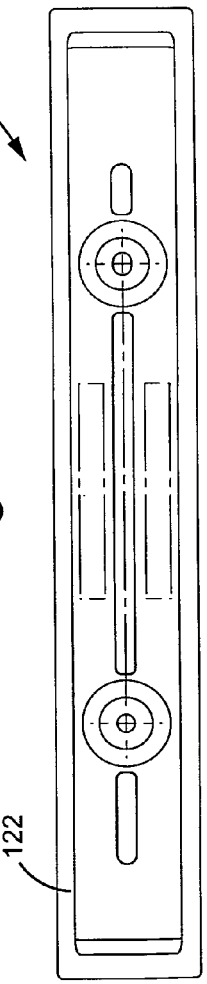
Figures 5, 9:
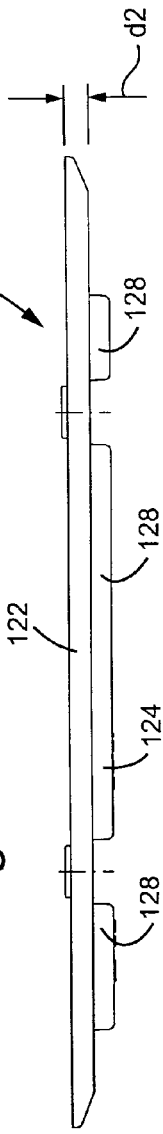
Figures 1, 10:
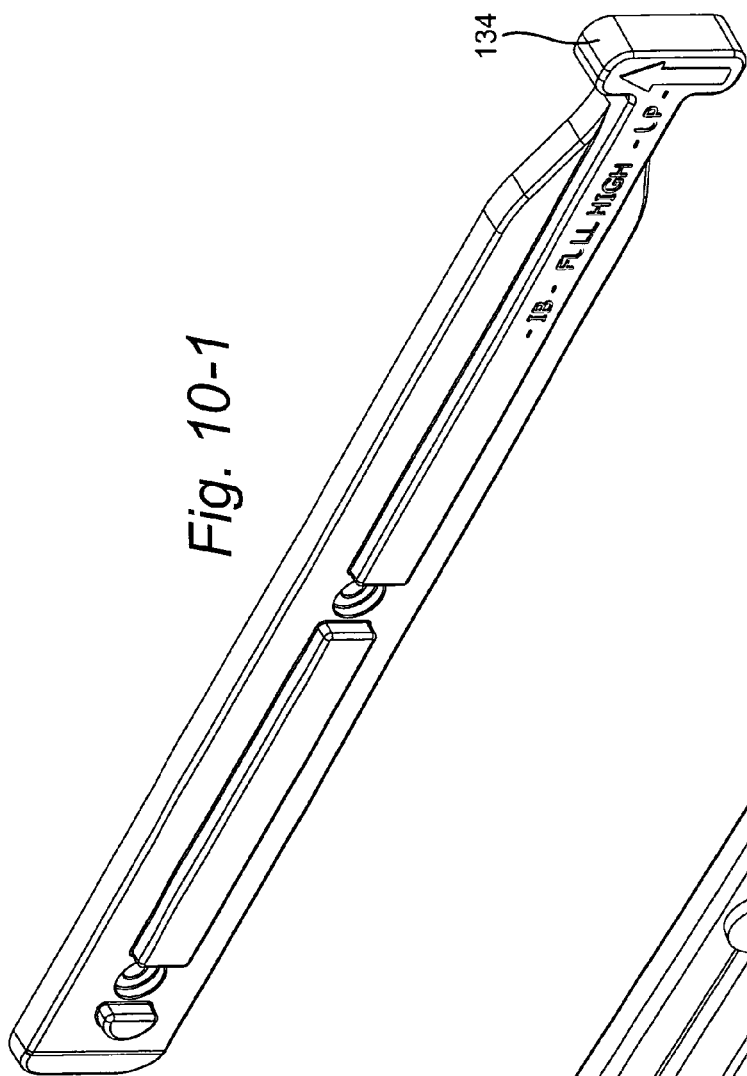
Figures 2, 10:
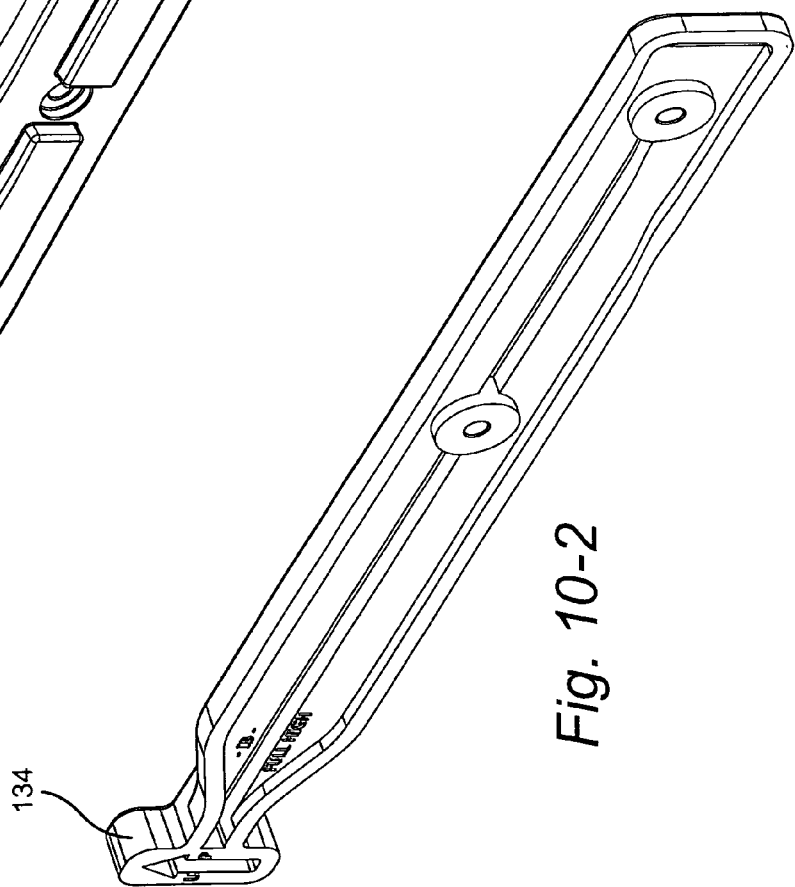
Figures 1, 11:
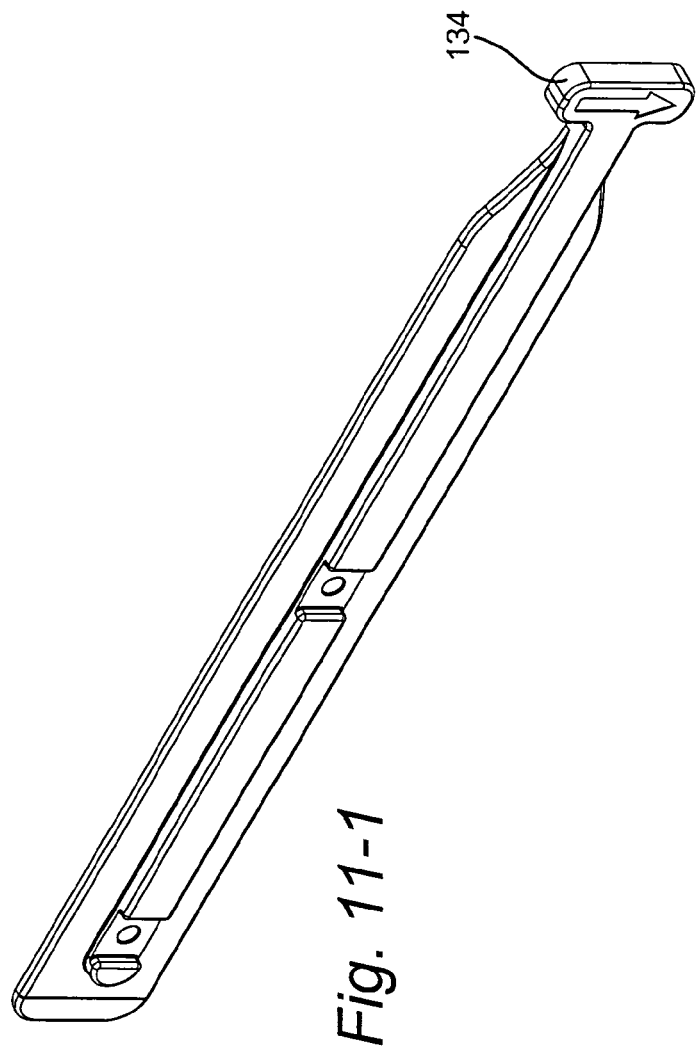
Figures 2, 11:
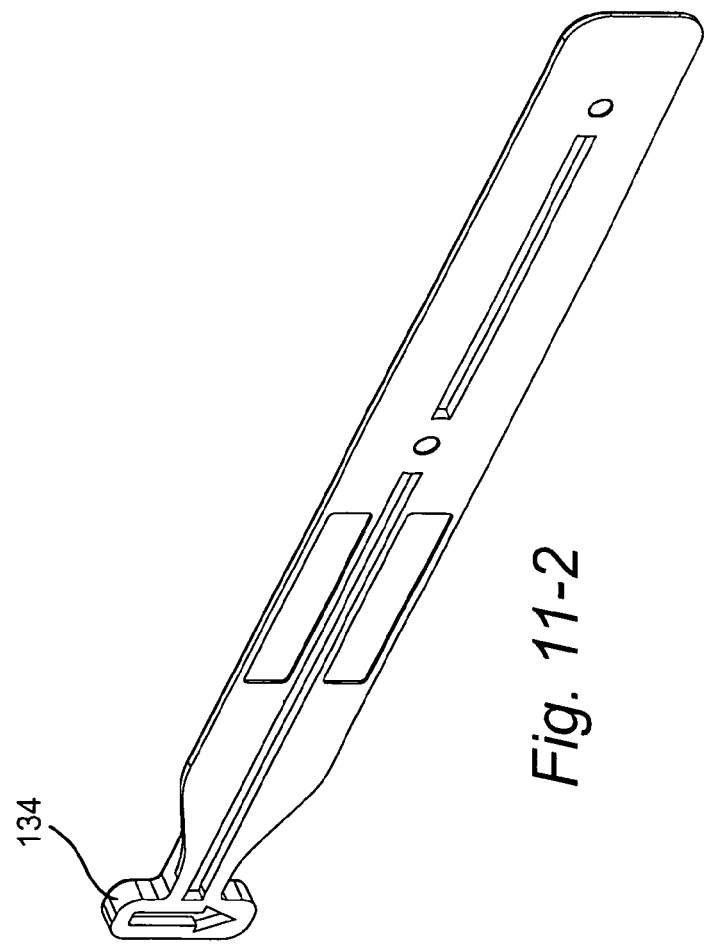
Figures 1, 13:
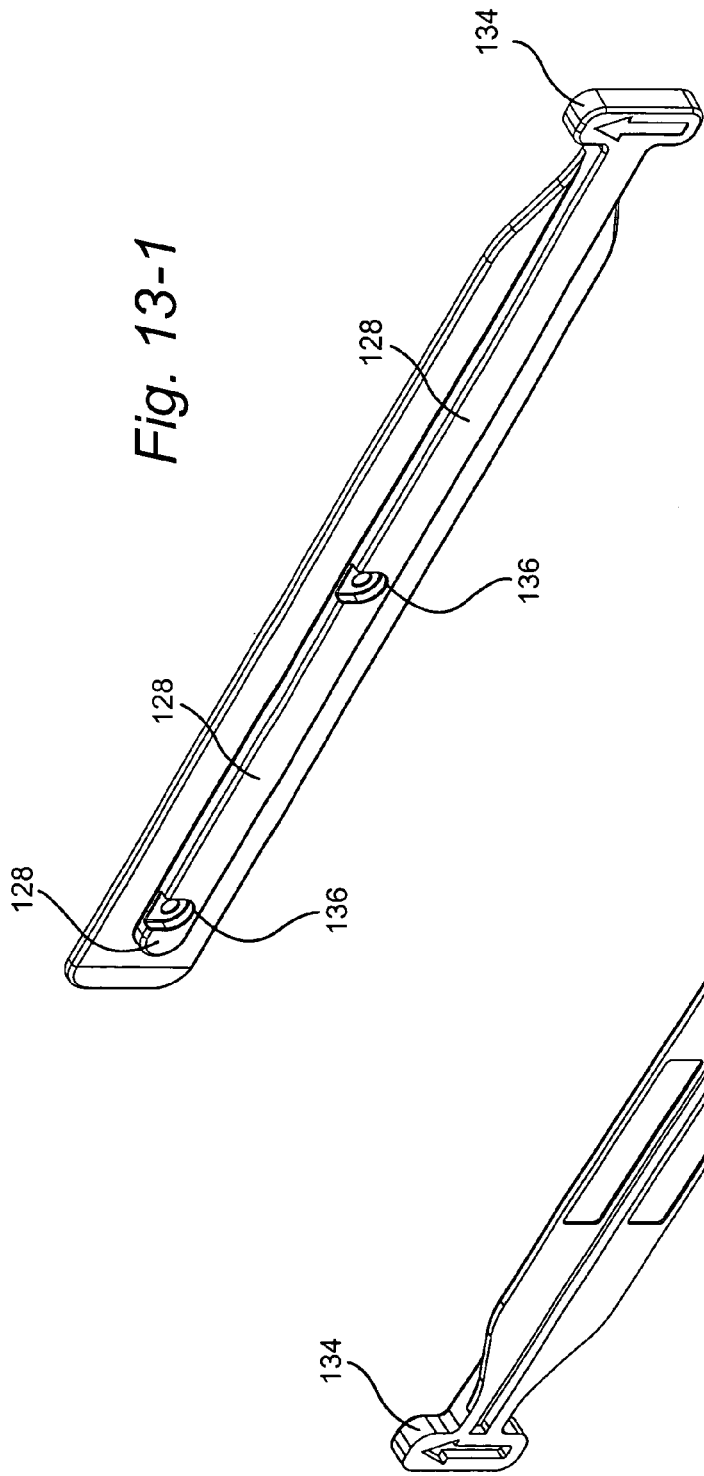
Figures 2, 13:
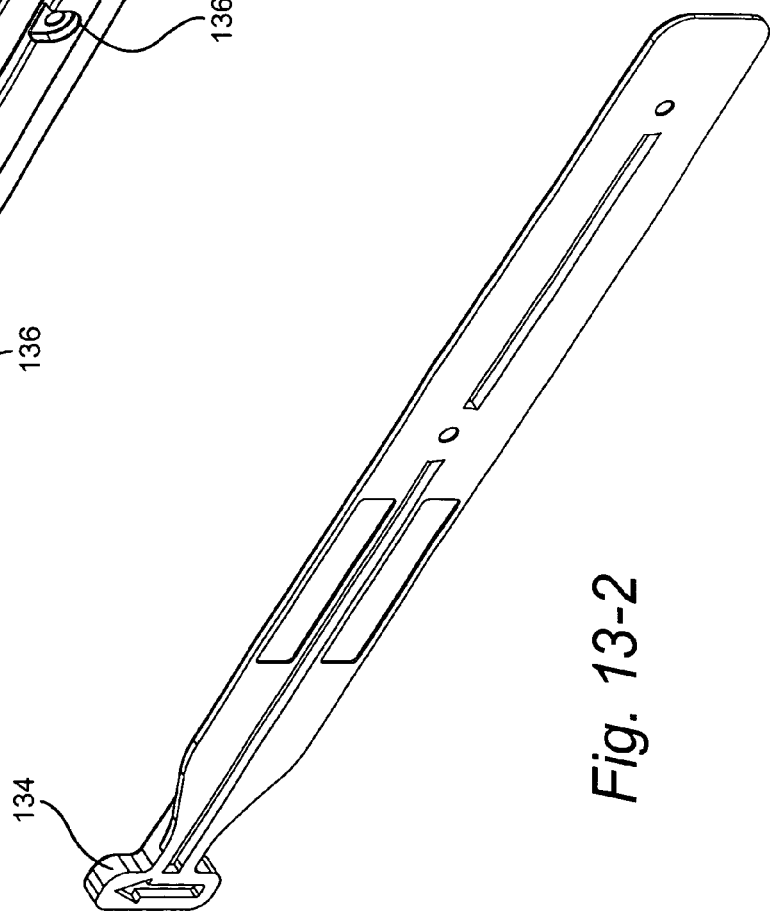

In an example implementation, both the drive mounting mechanism 110T and the drive mounting mechanism 110B facilitate insertion (e.g., sliding insertion) of the respective drives 60T and 60B into the drive bay 50. FIGS. 8-1 to 8-7 illustrate a first member 118 of an exemplary pair of drive glide strips, and FIGS. 9-1 to 9-7 illustrate a second member 120 of an exemplary pair of drive glide strips. As illustrated, each member 118 and 120 includes a first portion 122 that attaches to the drive 60 and a second portion 124 that is slidably received in a respective guide receiver slot 114 provided in the drive bay sidewall 62. Openings 126 are provided through the first portion 122 for receiving fasteners that attach the member 118 to the drive 60. The second portion 124 provides glides or projections 128 that extend into the guide receiver slot 114. The glides or projections 128 are spaced apart to accommodate the openings 126.

The first portion 122 of the first member 118 includes a thickness or dimension d1 that is different than a thickness or dimension d2 of the first portion 122 of the second member 120. The thickness of the glides 128 for the first and second members 118, 120 is substantially constant. As described above, the thicknesses d1 and d2 may be varied to adjust the lateral location of the load tray of the drive. Table 1 provides exemplary thicknesses d2 of the first portion 122 for the first and second members 118, 120 of different pairs of drive glide strips. The thicknesses of the members in each pair of drive glide strips is selected based on the type of drive it is to be used with (e.g., drive type arbitrarily indicated as types 1-4). As illustrated, the combined thickness of the two members 118, 120 of each pair is substantially constant for all different pairs.

TABLE 1

| Drive Type | Thick Member (mm) | Thin Member (mm) |
| --- | --- | --- |
| 1 | 8.5 | 4.1 |
| 2 | 7.7 | 4.9 |
| 3 | 8.6 | 4 |
| 4 | 7 | 5.35 |

The cartridge eject distance varies for LTO drives from different manufactures. For reliable operation of the cartridge transport mechanism 54, it is necessary for the cartridge ejected from a drive to be in a known location with respect to the cartridge transport mechanism 54. By varying the location of the in stop provided by the drive glide strip 112, which rests against the front of the guide receiver slot 114 in the drive bay sidewall 62, the ejected cartridges of the different drive types will be in the same known location.

In the illustrated embodiment, the in stop or drive stop feature includes the round end 132 of the front glide or projection 128 (e.g., end with orientation arrow as shown FIGS. 8-1 and 8-3) that is adapted to engage the round end 130 of the slot 114 in the drive bay side walls 62 (see FIG. 6).

In an example implementation, a first drive stop feature (e.g., round end 132 of front glide 132) is provided on the drive mounting mechanism 110T and configured to position the drive 60T in the drive bay 50 with respect to the Y axis direction as shown in FIG. 1, and a second drive stop feature (e.g., round end 132 of front glide 132) is provided on the drive mounting mechanism 110B and configured to position the drive 60B in the drive bay 50 with respect to the Y axis direction as shown in FIG. 1. The first drive stop feature and the second drive stop feature may be offset in the Y axis direction (e.g., as shown in FIG. 1) to facilitate aligned discharge of cartridges from the first drive 60T and the second drive 60B with respect to the Y axis direction (e.g., as shown in FIG. 1), the Y axis direction being the cartridge eject direction.

In an embodiment, the round end of the slot 114 is not adjustable and the round end 132 of the front glide 128 is not adjustable in a classical sense, however, its location with respect to the fasteners which attach the drive glide strip to the drive is a design parameter which varies in the mold for the drive glide strip. For example, the dimension d3 shown in 8-3 is based on the cartridge eject dimension of a particular drive type.

Also, all the drive types have the same width, which is an industry standard form factor. So, if the variation in load tray locations for all drive types is understood, the width of the drive bay 50 may be selected so that drive glide strips 112 may work for all drive types. In an example implementation, the width of the drive bay is about 161.60 mm. However, other suitable dimensions are possible, e.g., depending on the variation in load tray locations.

FIGS. 10-1 to 11-7 illustrate thick and thin members for an exemplary pair of drive glide strips according to an alternative embodiment of the present invention. In such embodiment, each member includes a pull tab 134 to facilitate insertion and/or removal of the drive from the drive bay.

FIGS. 12-1 to 13-8 illustrate thick and thin members for an exemplary pair of drive glide strips according to another alternative embodiment of the present invention. In such embodiment, each member includes a pull tab 134 to facilitate insertion and/or removal of the drive from the drive bay. In addition, the glides 128 of each member are connected via connecting portions 136.

In another of its aspects, the technology also concerns a method of operating a cartridge drive library. The method includes providing plural drive mounting mechanisms, e.g., drive mounting mechanisms 110T and 110B. The method further comprises selecting and mounting to an interior wall of a drive bay 50 both a first drive mounting mechanism 110T and a second drive mounting mechanism 110B. The first drive mounting mechanism 110T is configured to facilitate accommodation of a first drive 60T into the drive bay 50 and to position a load tray 115T of the first drive 60T in a predetermined alignment position with respect to a width of the drive bay 50. The second drive mounting mechanism 110B is configured to facilitate accommodation of a second drive 60B into the drive bay 50 and to position a load tray 115B of the second drive 60B in the predetermined alignment position. The first drive mounting mechanism 110T and the second drive mounting mechanism 110B are configured to respectively position the first drive 60T and the second drive 60B at differing distances from the opposing sidewalls 62 of the drive bay 50 with respect to the second direction, e.g., the X axis as shown in FIG. 1.

An example implementation of the method comprises providing the first drive mounting mechanism 110T as a first pair of drive glide strips 112T-L and 112T-R and providing the second drive mounting mechanism 110B as a second pair of drive glide strips 112B-L and 112B-R. The method further comprises positioning a first member 118 of each pair of drive glide strips 112 being on a first of two opposing interior walls 62 of the drive bay 50 and positioning a second member 120 of each pair of drive glide strips 112 on a second of the two opposing interior walls 62 of the drive bay 50. A first member 118 of a first pair of drive glide strips 112T has a different dimension in the second direction (e.g., the X axis as shown in FIG. 1) than a first member 118 of a second pair of drive glide strips 112B. A second member 120 of a first pair of drive glide strips 112T has a different dimension in the second direction (e.g., the X axis as shown in FIG. 1) than a second member 120 of a second pair of drive glide strips 112B. A sum of dimensions in the second direction of the first member 118 and the second member 120 of the first pair of drive glide stripes 112T is substantially equal to a sum of dimensions in the second direction of the first member 118 and the second member 120 of the second pair of drive glide strips 112B.

After positioning of the drive mounting mechanism 110T and 110B, the method can further include inserting (e.g., sliding insertion) the first drive 60T into the guide receiver slots 114L-T, 114R-T in drive bay 50, and inserting (e.g., sliding insertion) the second drive 60B into the guide receiver slots 114L-B, 114R-B in drive bay 50.

Entry/Exit Port

Figure 14:
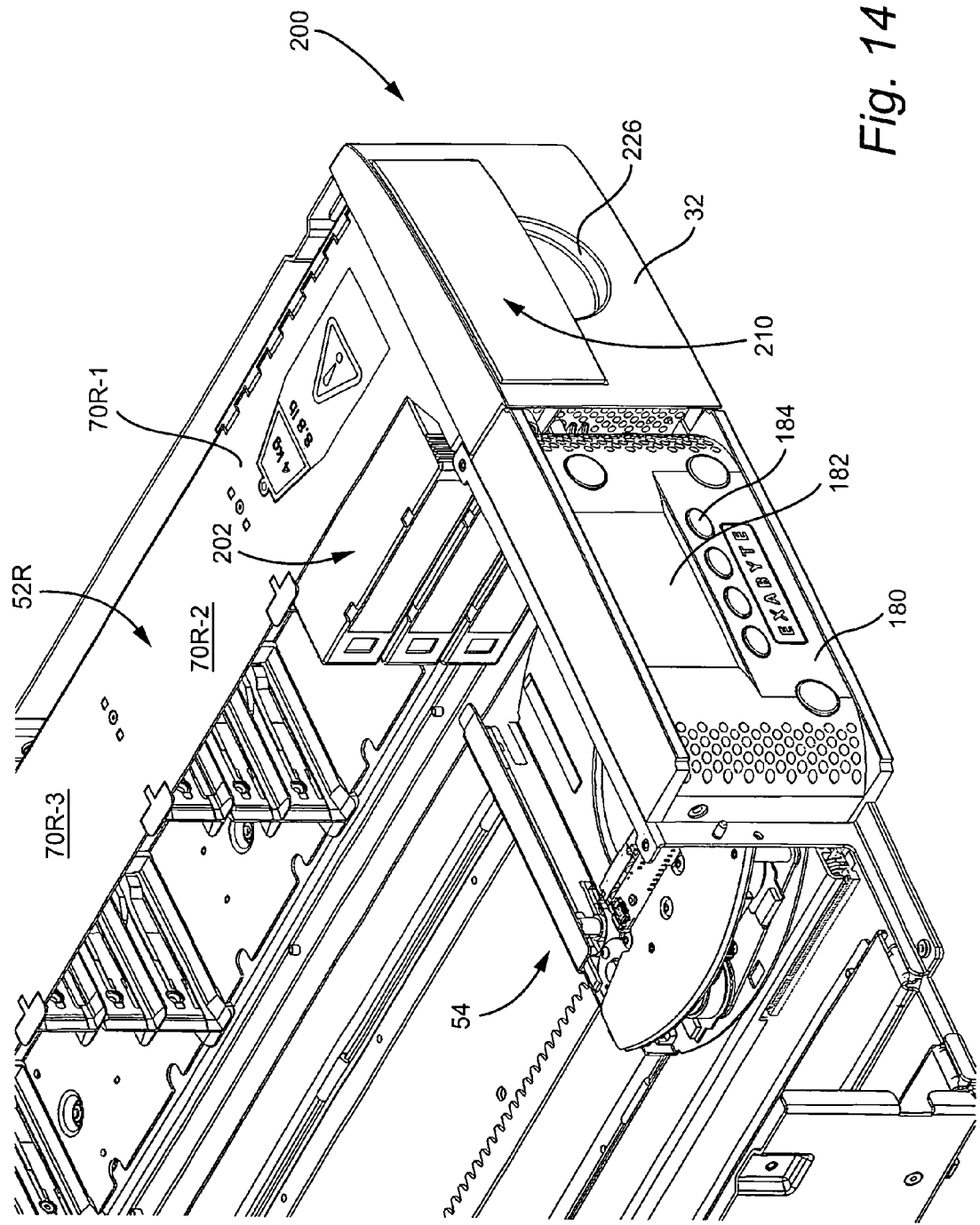
FIG. 14 is a top front perspective view of a front portion of the automated cartridge library of FIG. 1, including a front bezel.
Figure 15:
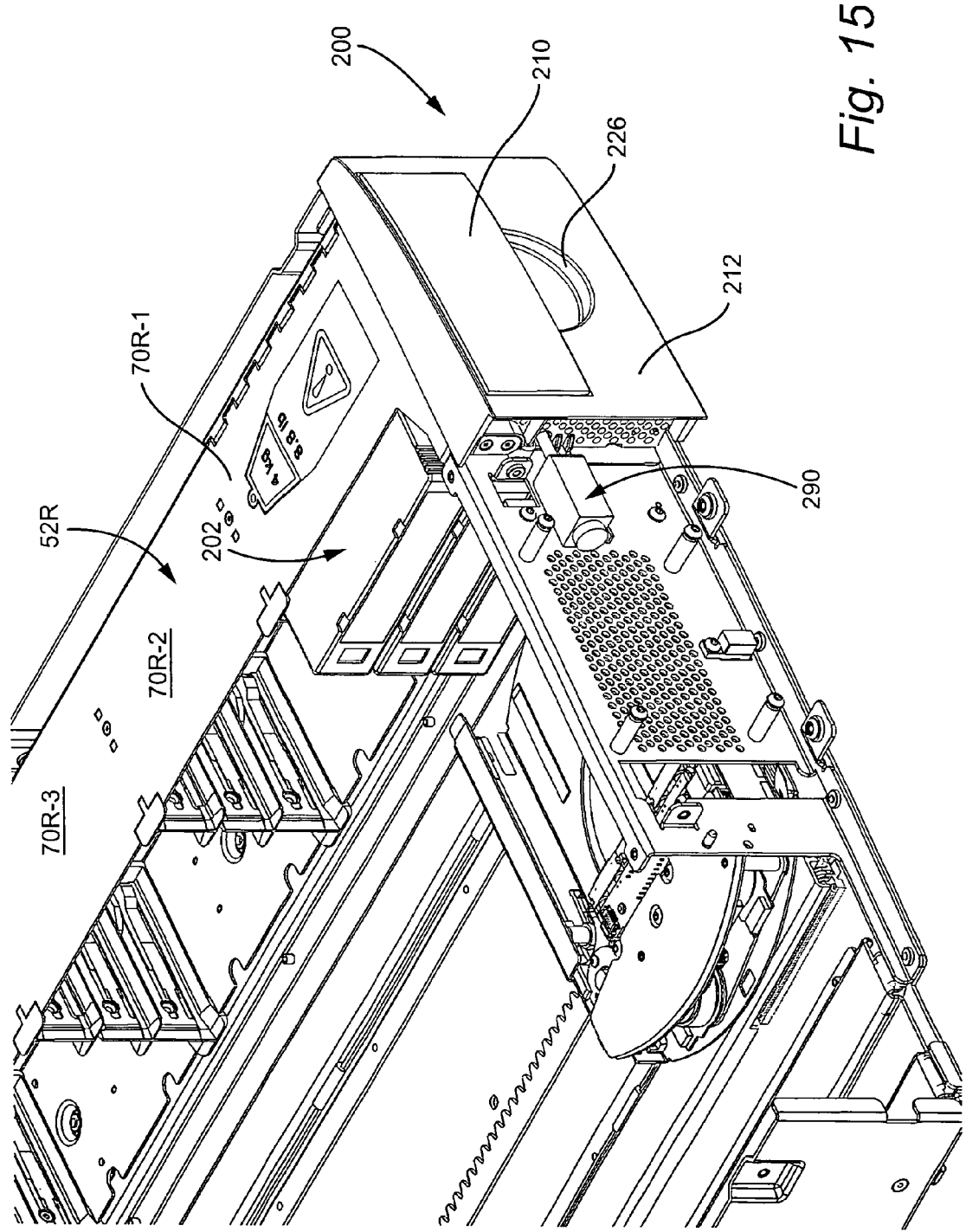
FIG. 15 is a top front perspective view of a front portion of the automated cartridge library of FIG. 1, but with bezel removed.

FIG. 14 shows a front portion of automated cartridge library 30, e.g., a portion of library front cover 32, a portion of cartridge magazine 52R, and a portion of cartridge transport mechanism 54. A central portion of library front cover 32 is covered by a bezel 180. The bezel 180 bears, e.g., a display 182 and operator input elements 184 (such as operator input keys or buttons). FIG. 15 shows the front portion of automated cartridge library 30, but with bezel 180 removed.

To the right of bezel 180 an entry/exit port 200 is provided on the library front cover 32. The entry/exit port 200 is the means by which cartridges (one at a time) can be loaded into cartridge magazine 52. In particular, through entry/exit port 200 a cartridge can be loaded into an entry/exit port cell 202 of cartridge magazine 52. In the illustrated example embodiment, the entry/exit port cell 202 is the top most cell of cartridge magazine section 70R-1. The entry/exit port cell 202 is thus the position in cartridge magazine section 70R-1 shown in FIG. 14 as being occupied by the top most cartridge.

The entry/exit port 200 comprises an entry/exit port handle 210 which is inserted into handle magazine 212. The handle magazine 212 comprises a right portion of library front cover 32 and is securely attached to the library frame. The handle magazine 212 is contoured to facilitate manual grasping of the handle 210. That is, the handle magazine 212 includes a contoured recess 226 that allows manual grasping of the lower edge of the handle 210 (e.g., see FIGS. 14 to 15 and 23 to 24).

Figure 16:
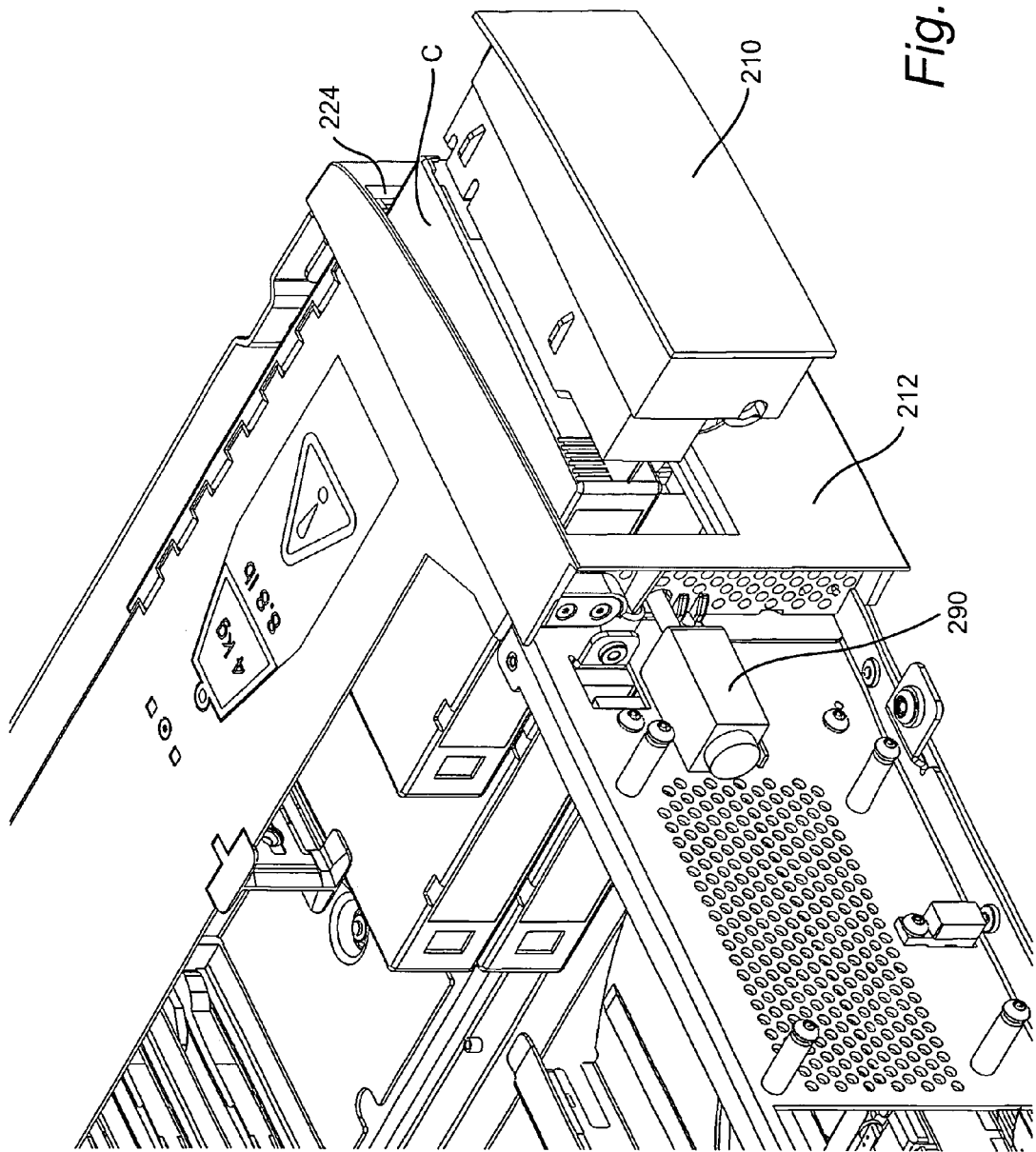
FIG. 16 is a top front perspective view of the automated cartridge library of FIG. 14, showing a handle of an entry/exit port unlocked and translated linearly forward.
Figure 17:
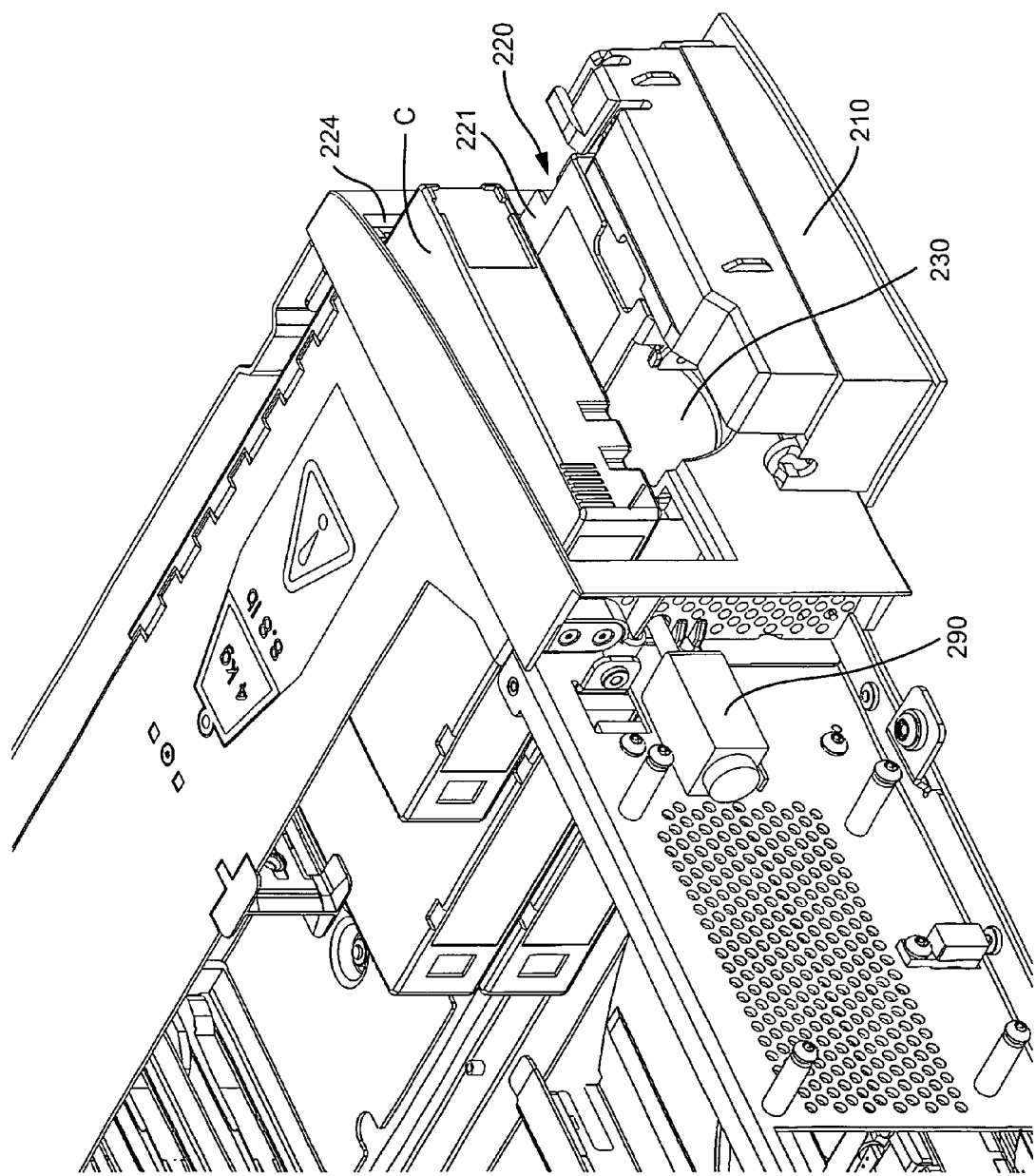
FIG. 17 is a top front perspective view of the automated cartridge library of FIG. 14, showing a handle of an entry/exit port pivotally translated after having been translated linearly forward.

The entry/exit port 200 also comprises a cartridge caddy 220, to which the entry/exit port handle 210 is pivotally attached. The caddy 220 comprises a caddy tray 221 configured to support the cartridge C. The entry/exit port handle 210 is configured both for selective closure of the aperture 224 provided in the frame (see FIGS. 14 and 15) and selective translation with respect to the frame for opening the aperture 224 (see FIGS. 16 to 18). The cartridge caddy 220 is configured to carry the cartridge C out of the entry/exit port cell 202 and through the aperture 223 upon translation of the handle 210.

The library frame has a frame wall 228 upon which the handle 210 is attached. The caddy tray 221 essentially lies in a tray plane (e.g., in the X-Y plane as viewed in FIG. 1) that is orthogonal to the frame wall 228 (e.g., in the Y-Z plane as viewed in FIG. 1) upon which the handle 210 is attached. The caddy tray 221 is configured for linear motion of the caddy tray 221 in the tray plane. The handle 210 is configured for linear translation in the tray plane and then for pivotal translation about an axis 230 (see FIG. 17) lying essentially in the tray plane, the axis 230 being at a point of pivotal attachment of the handle 210 to the caddy tray 221.

The cartridge transport mechanism 54 is configured to transport the cartridge C of information media in a first direction (i.e., along the X axis as viewed in FIG. 1) relative to the cartridge magazine 52. The caddy 220, on the other hand, is configured to carry the cartridge C in a second direction (i.e., along the Y axis as viewed in FIG. 1) through the aperture 224 upon translation of the handle 210, the second direction (or Y axis) being orthogonal to the first direction (or X axis). In particular, the caddy 220 is configured to slidably carry the cartridge C through the aperture 224 upon translation of the handle 210.

Figure 19:
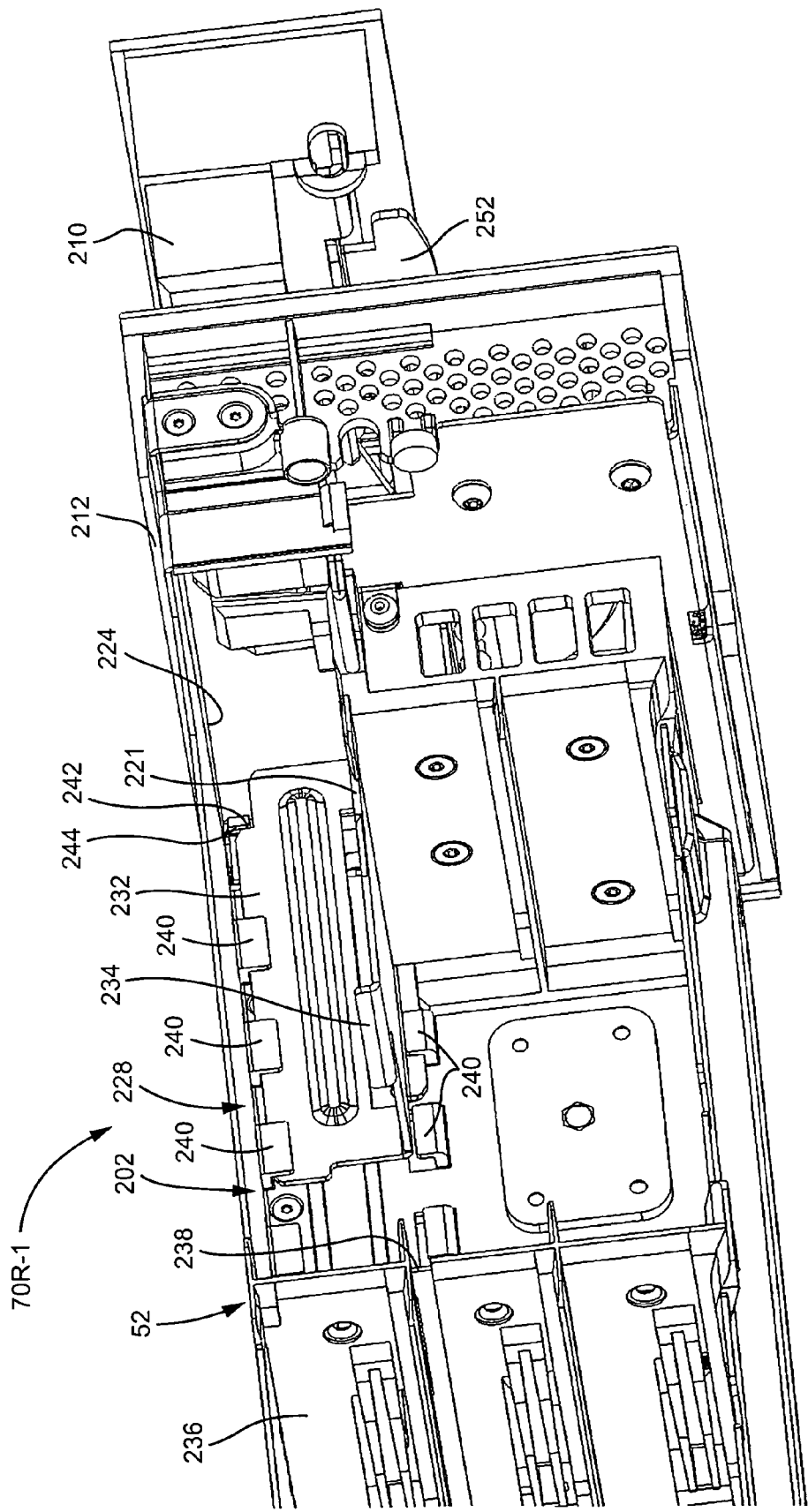
FIG. 19 is a rear perspective view of a front wall portion of the automated cartridge library of FIG. 14, showing an open entry/exit port and a cartridge caddy extended from an entry/exit port cell.
Figure 21:
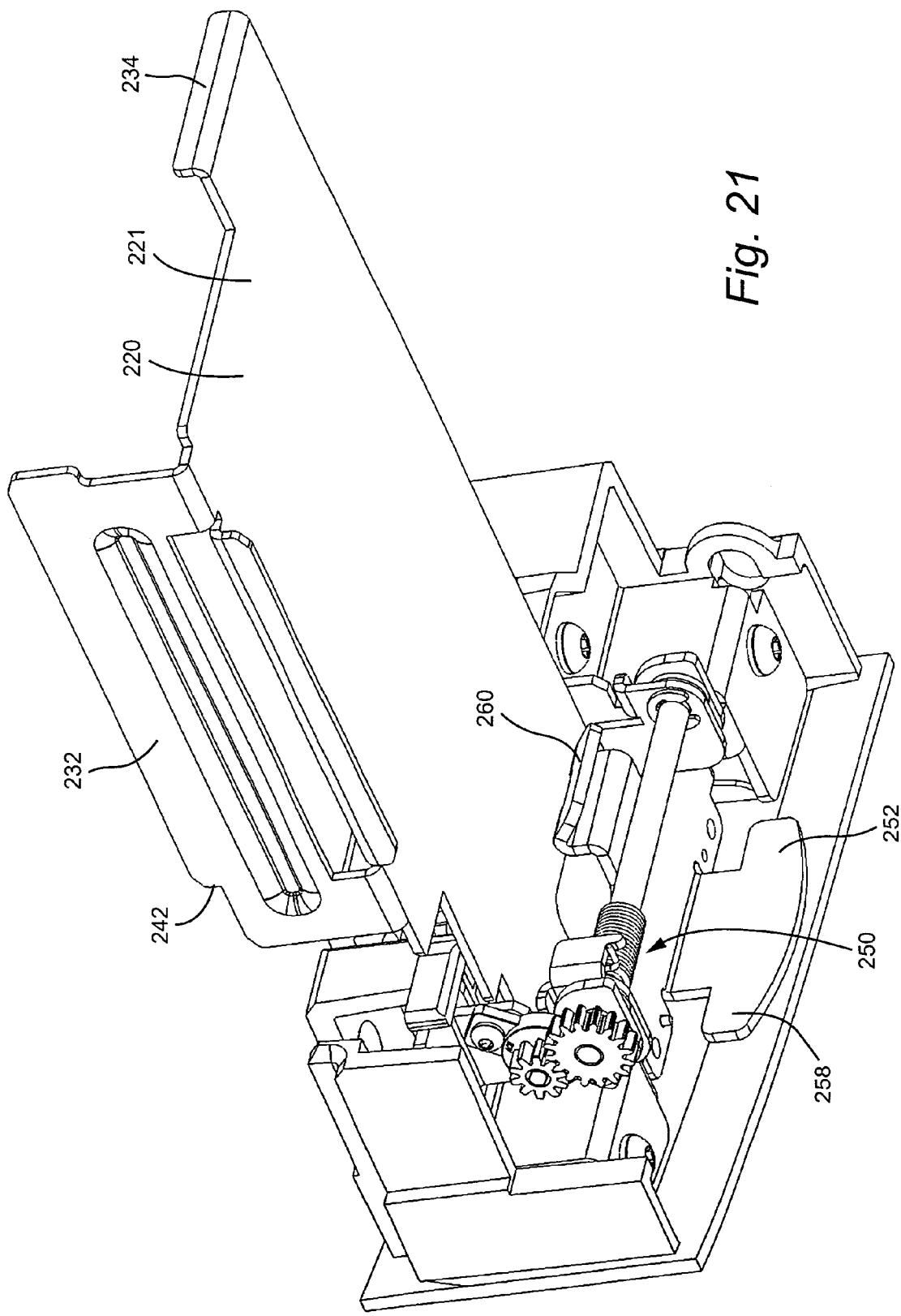
FIG. 21 is a rear bottom perspective view of an open entry/exit port, including an entry/exit port handle and a cartridge caddy.

As best shown in FIGS. 19 and 21, the caddy 220 comprises both the caddy tray 221 (which lies in a caddy plane) and a caddy side rail 232 which extends orthogonally from the caddy tray 221. The caddy tray 221 has a lip 234 thereon configured to catch at least a portion of an edge of the cartridge C when carrying the cartridge C. That is, the lip 234 ensures that the cartridge C moves out with the caddy tray 221 when the entry/exit port 200 is opened. As shown in FIG. 19, a wall 236 of the magazine 52 opposite the aperture 224 has a recess 238 provided therein configured to accommodate the lip 234 of the caddy 220 when the entry/exit port 200 is closed. Also, the frame wall 228 includes upper and lower guide members 240 structured to slidably engage the caddy side rail 232 to allow sliding movement of the caddy C.

The caddy 220 comprises a stop member for limiting travel of the caddy 220 when the handle 210 has translated sufficiently that the aperture 224 is clear for passage of the cartridge C of information media through the aperture 223. In the illustrated embodiment, the stop member comprises a profiled segment 242 of an upper surface of the caddy side rail 232. The profiled segment 242 is adapted to engage a stop arm 244 (e.g., see FIG. 20) provided to the frame wall 228 which limits travel of the caddy 220.

Figure 18:
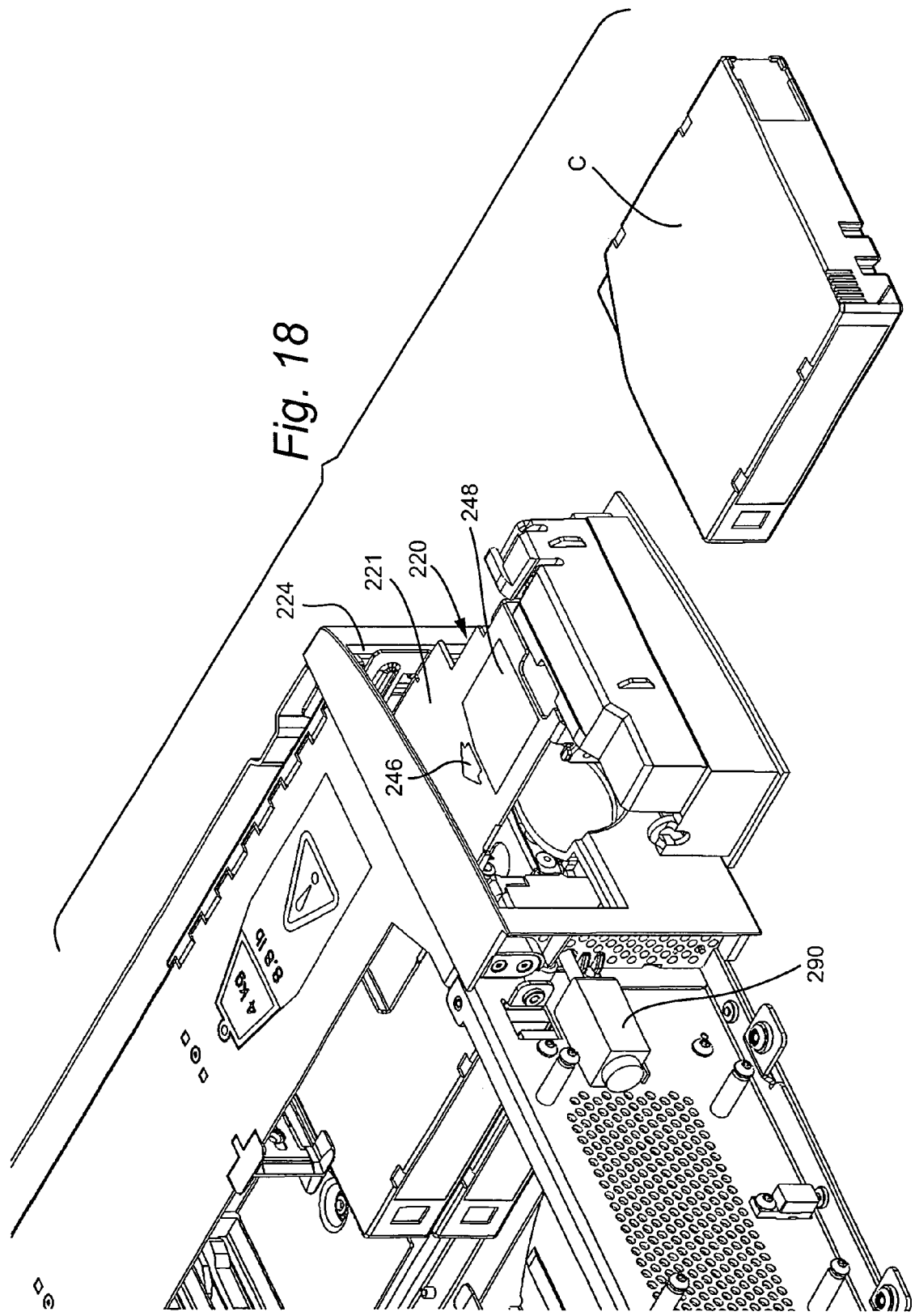
FIG. 18 is a top front perspective view of the automated cartridge library of FIG. 14, showing full removal of a cartridge from an entry/exit port.

In an example implementation, the caddy 220 bears first indicia 246 visible upon opening of the entry/exit port 200 using the handle 210 (e.g., see FIG. 18). In the illustrated embodiment, the first indicia 246 is in the form of an arrow configured for showing a direction in which the caddy 220 is to be moved for closing of the entry/exit port 200. Alternatively or additionally, the caddy 220 also bears second indicia 248 (e.g., see FIG. 18). In the illustrated embodiment, the second indicia 248 is in the form of a cartridge outline configured for showing placement of a cartridge C upon the caddy tray 221.

Figure 20:
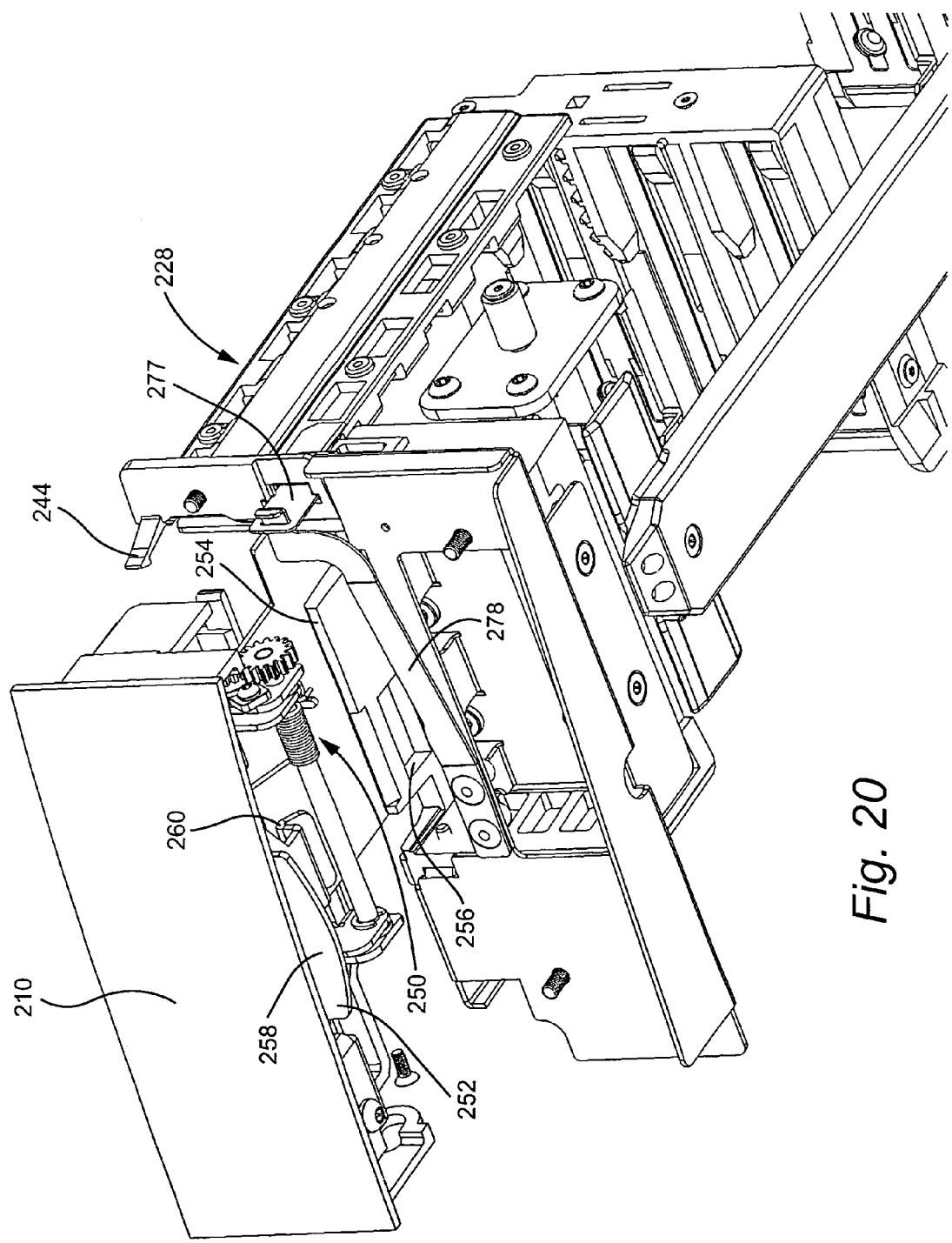
FIG. 20 is a front bottom perspective view of a front wall portion of the automated cartridge library of FIG. 14, showing an open entry/exit port.
Figure 26:
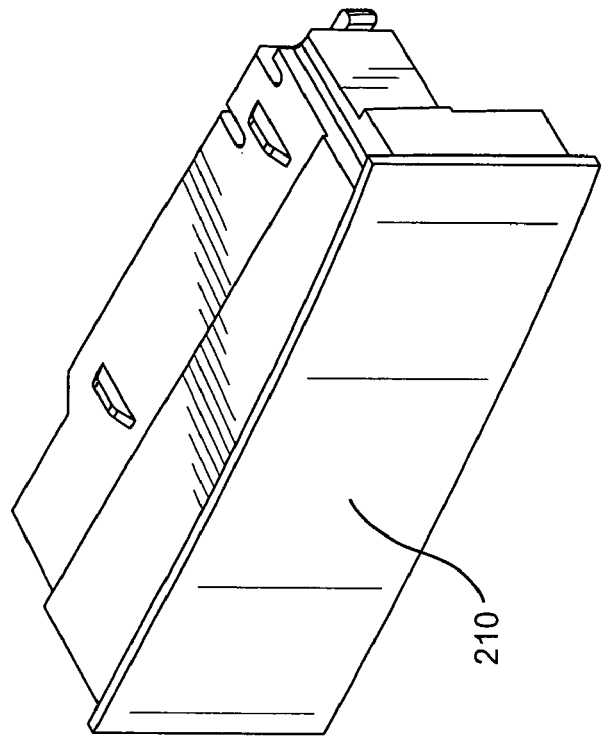
FIG. 26 is a left rear perspective view of the entry/exit port handle of FIG. 25.
Figure 25:
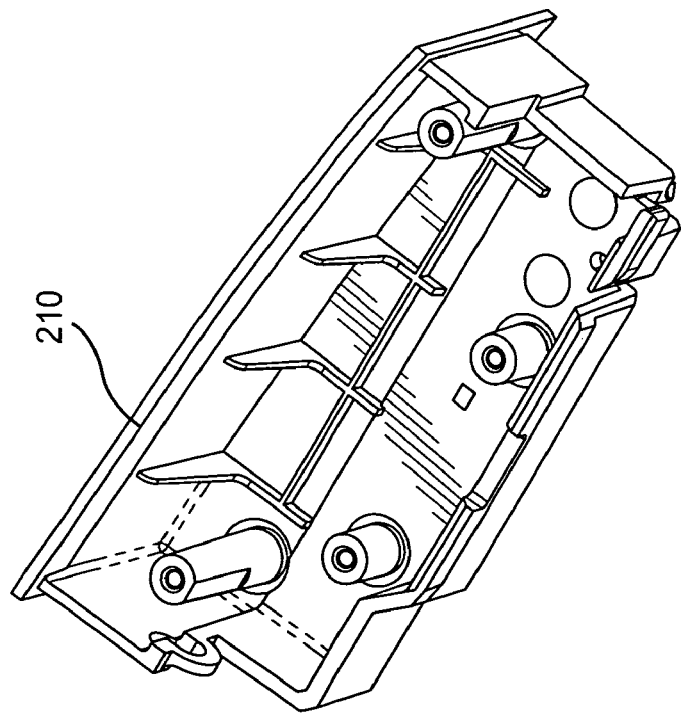
FIG. 25 is a right front perspective view of an entry/exit port handle for the automated cartridge library of FIG. 14.

As noted above, the handle 210 is pivotally attached to the front end of the caddy tray 221 so that the handle 210 can pivot downwardly with respect to the caddy tray 221 when the entry/exit port 200 is moved to an open or unlocked position. This arrangement facilitates insertion and/or removal of a cartridge from the caddy tray 221. As best shown in FIGS. 20 and 21, a damping arrangement 250 may be provided to the pivotal connection between the handle 210 and the caddy tray 221. As illustrated the damping arrangement 250 includes one or more gears and spring members that are arranged to make the pivotal movement of the handle 210 have a quality look, sound, and/or feel. FIGS. 25 and 26 illustrate the handle 210 removed from the caddy tray 221.

The handle 210 may be releasably lockable to the library frame when the entry/exit port 200 is in a closed position. In the illustrated embodiment, a manual mechanical latch 252 is provided to the handle 210 that is adapted to releasably engage a recess 256 provided in a front wall 254 of the library frame (e.g., see FIGS. 20 and 21). The manually mechanical latch 252 is pivotally mounted to the handle 210 and includes an engagement portion 258 and a latch portion 260. The engagement portion 258 is positioned adjacent the lower edge of the handle 210 and may be manually engaged through the contoured recess 226 in the handle magazine 212 (e.g., see FIGS. 14 and 15). The latch portion 260 is positioned to releasably engage the recess 256 when the handle 210 is in a closed position. The engagement portion 258 is adapted to be manually pivoted to release the latch portion 260 from the recess 256 before the handle 210 is moved to an open position.

Figure 22:
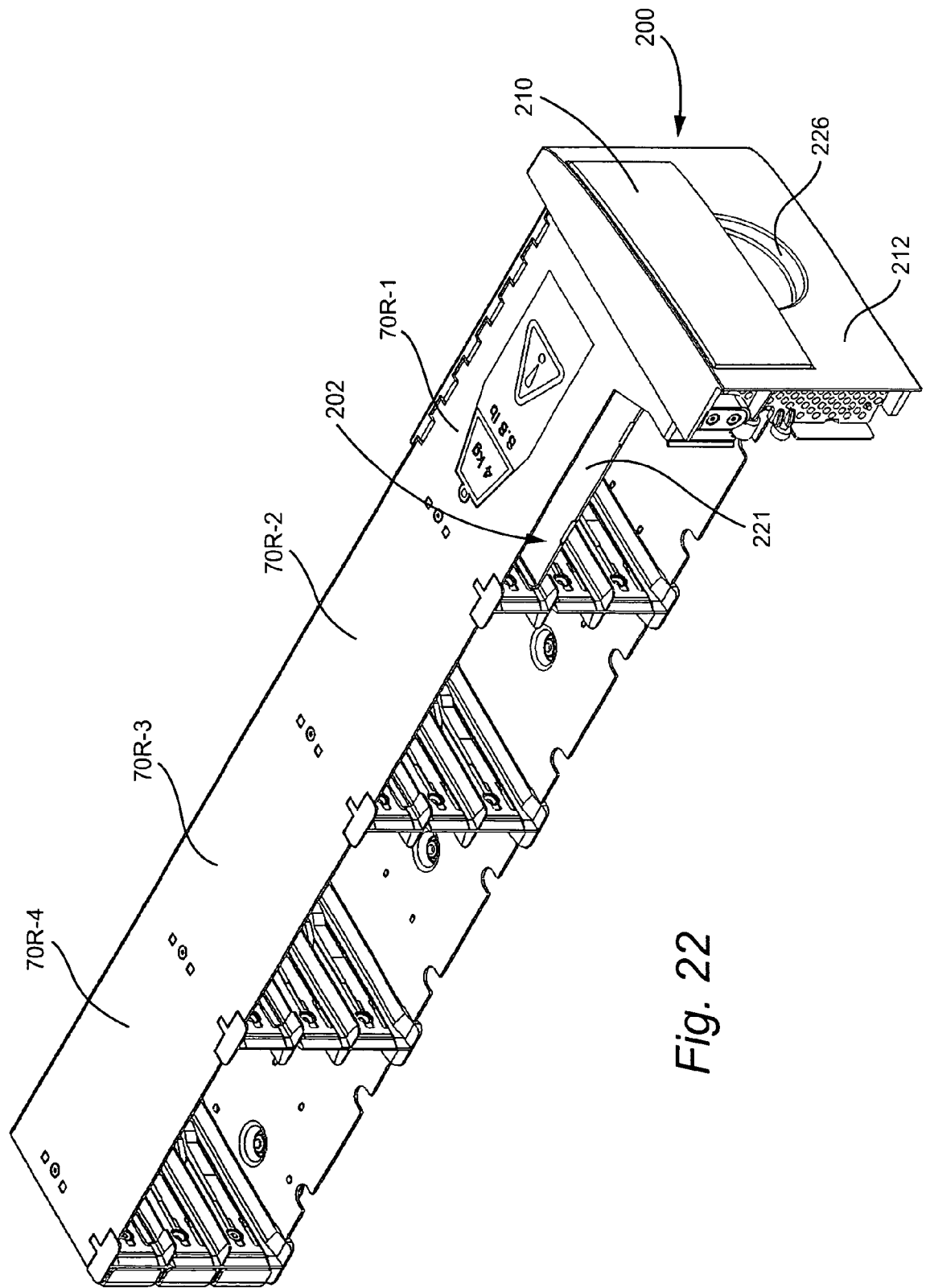
FIG. 22 is a front top perspective view of a portion of the automated cartridge library of FIG. 14, showing a handle magazine and a cartridge magazine section.
Figure 24:
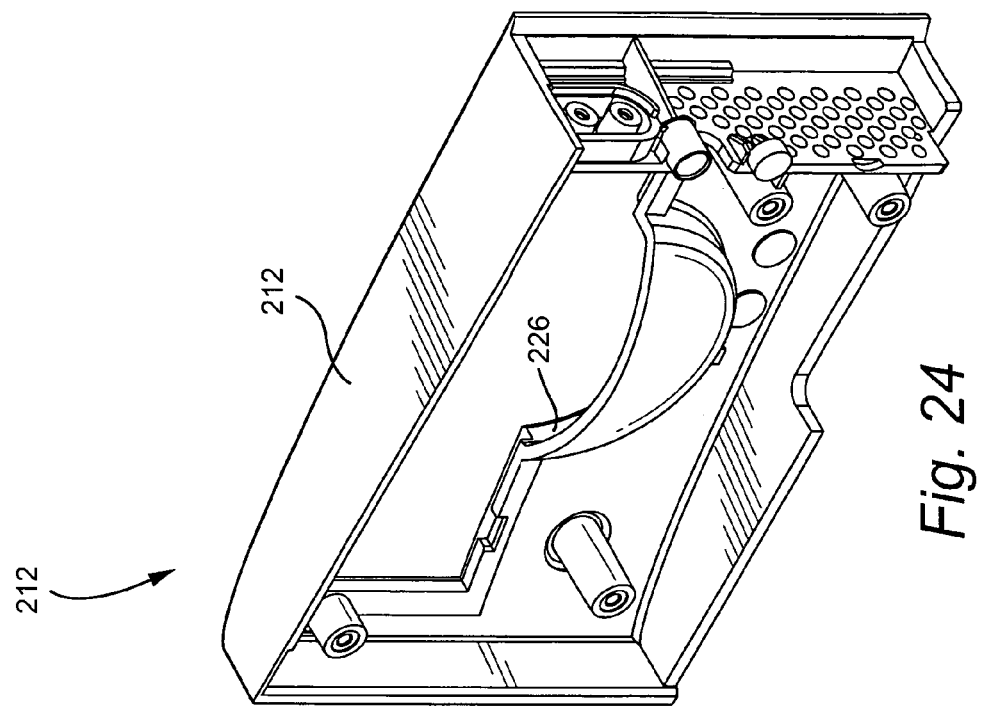
FIG. 24 is a left rear perspective view of the handle magazine of FIG. 23.
Figure 23:
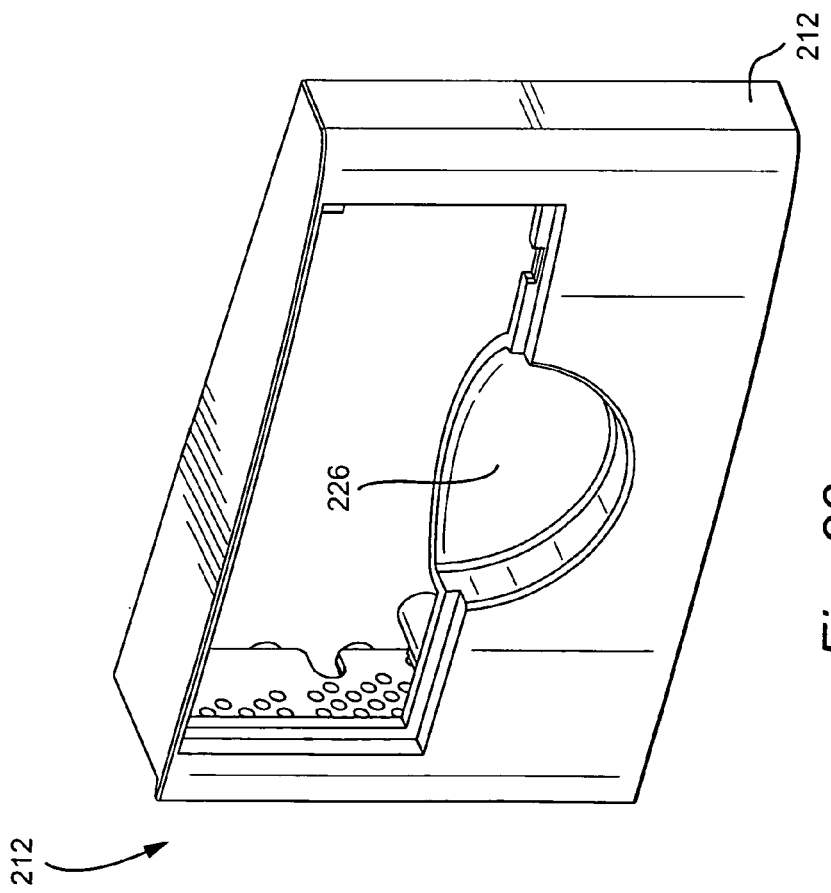
FIG. 23 is a right front perspective view of a handle magazine for the automated cartridge library of FIG. 14.

In the illustrated example embodiment (e.g., see FIGS. 14, 15, and 22), the entry/exit port cell 202, which is the top most cell of cartridge magazine section 70R-1, operates in two modes. Mode one allows the cell 202 to be accessed by the cartridge transport mechanism 54 by allowing the cartridge transport mechanism 54 to pick cartridges C from or place cartridges C to this cell 202. Mode two allows the cell 202 to be accessed by the entry/exit port 200 by allowing a user to insert or extract a cartridge C into the cell 202 through the entry/exit port 200.

In an example implementation, when the cell 202 is unlocked (i.e., entry/exit port 200 in an open or unlocked position), the unlocking of the cell 202 may alert a library controller that the inventory or cartridge C in this cell 202 is no longer valid and will need to be checked after the cell 202 is relocked (i.e., entry/exit port 200 in a closed or locked position). The magazine 52 may be locked to prevent any interaction between the user and the cartridge transport mechanism 54 allowing the cartridge transport mechanism 54 to remain on-line and functioning normally. This also preserves the integrity of the inventory in the remainder of the magazine 52. A sensor may be provided to insure that when the entry/exit port 200 is closed it is in a lockable position prior to being locked. Features in the cell 202 maintain the cartridge keying function.

Figure 27A:
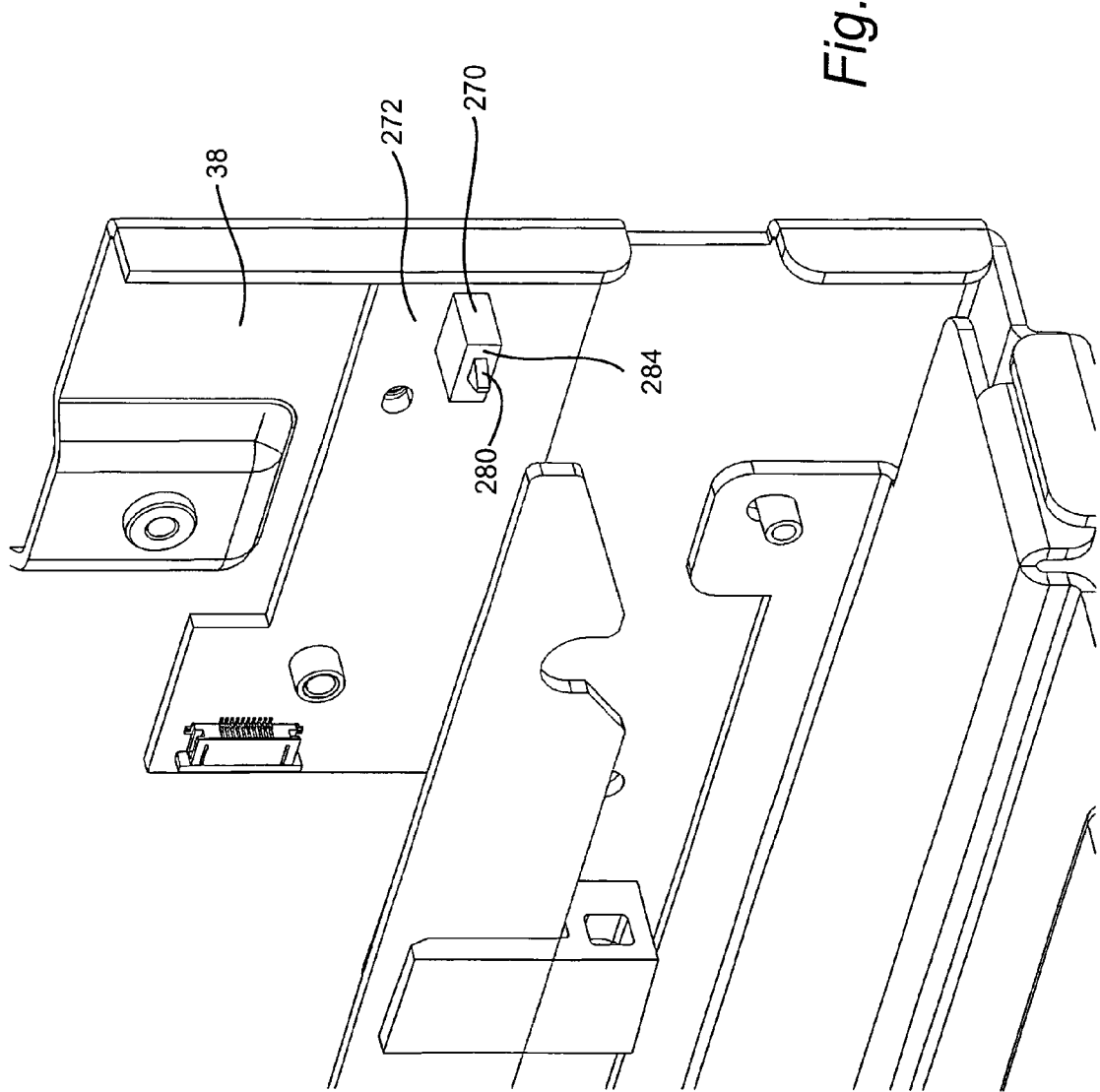
FIG. 27A illustrates a sensor for actuating a lock solenoid, with a shroud removed.
Figure 27B:
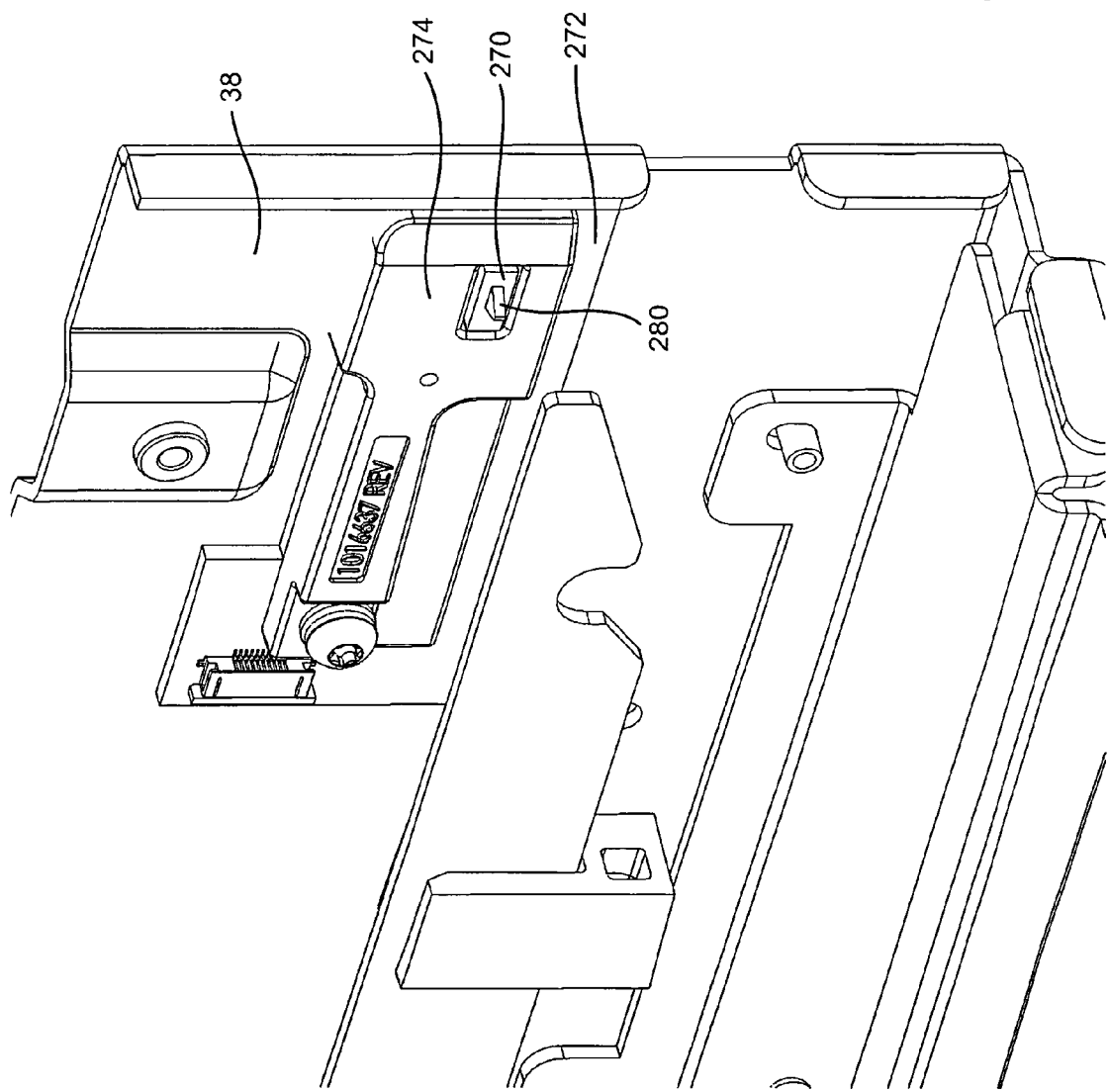
FIG. 27B illustrates the sensor with the shroud.
Figure 27D:
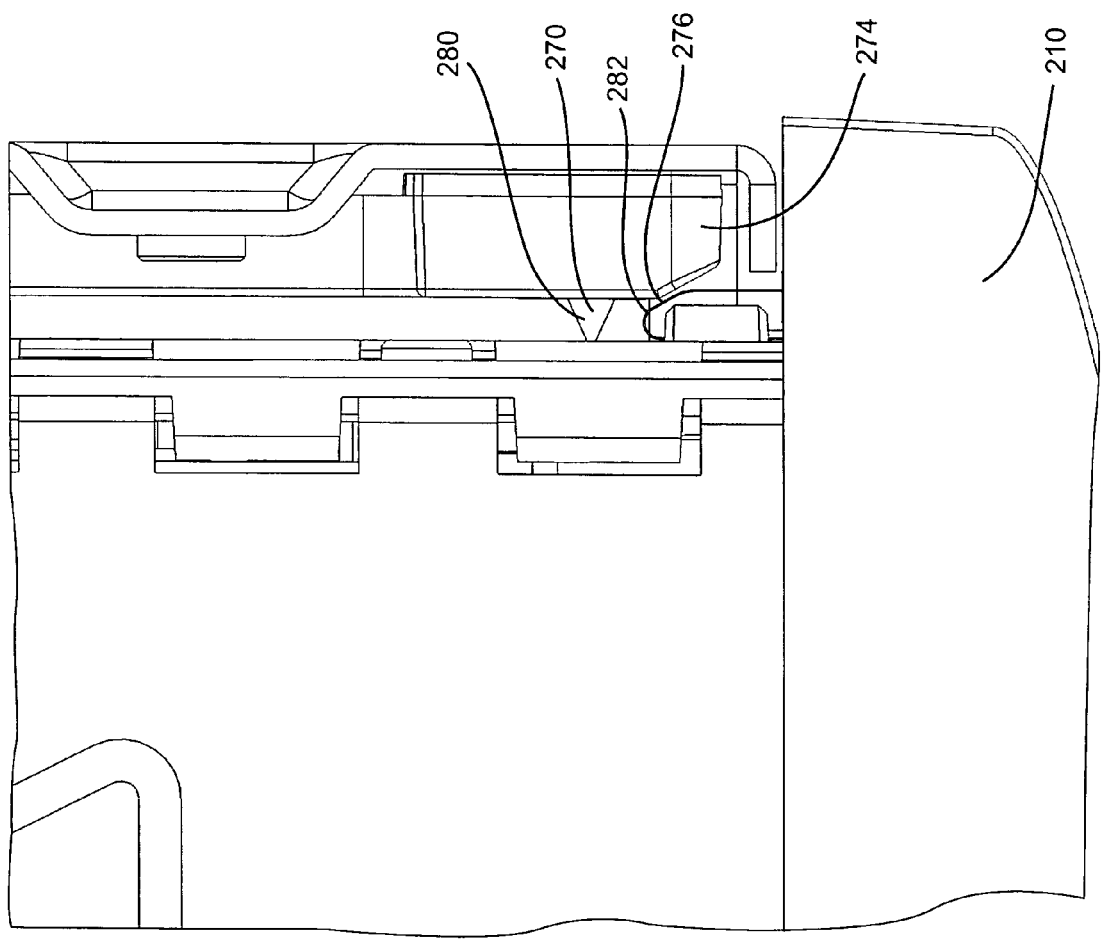
FIG. 27D is a top view showing the flag and its relationship to the lever of the sensor when the handle is open.
Figure 27E:
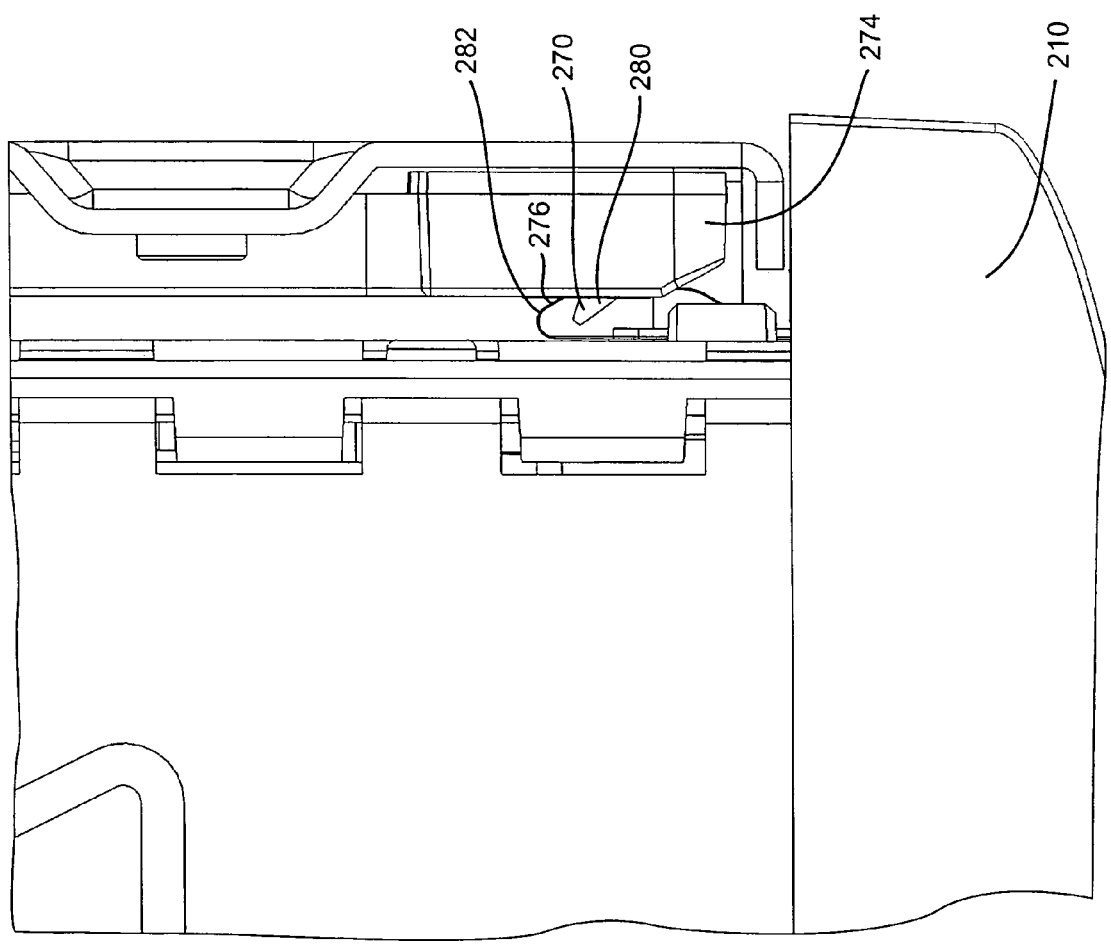
FIG. 27E is a top view showing the flag engaged with the lever when the handle is closed.

A lock solenoid 290 (e.g., see FIGS. 15 to 18) may be actuated to lock the entry/exit port 200 and prevent user interaction. A sensor may be provided to insure that the entry/exit port 200 is closed and in a lockable position prior to being locked by the lock solenoid 290. FIG. 27A illustrates a sensor 270 on a card 272 attached to the inside of the right sidewall 38 of the library frame and FIG. 27B illustrates the sensor 270 with a shroud 274 to protect it when a cartridge C is inserted. FIG. 27C illustrates a flag 276 which is slideably mounted and located by a leaf spring 278 (see FIG. 20). The leaf spring 278 is deflected by the handle 210 when it is moved into the closed position. FIG. 27D is a top view showing the flag 276 and its relationship to the lever 280 of the sensor 270 when the handle 210 is open (e.g., unlocked and moved out), and FIG. 27E is a top view showing the flag 276 engaged with the lever 280 (e.g., flag moved into and over the lever) when the handle 210 is closed to actuate the sensor 270. The sensor 270 is tripped or actuated approximately midway between the positions shown in FIGS. 27D and 27E.

An example mode for closing and locking the entry/exit port 200 will now be described. After the handle 210 is rotated up (e.g., until the handle 210 reaches an up stop), the handle 210 is moved into the cell and the back of the handle 210 deflects the leaf spring 278. The free end of the leaf spring 278 is inserted into a slot in a slider 277 (e.g., see FIG. 20) which carries the flag 276. The leaf spring 278 pushes the flag 276 into and past the sensor lever 280, tripping the sensor 270. The flag 276 is in the form of a spring and the free surface 282 slides on the face of the sensor shroud 274 (e.g., see FIGS. 27D and 27E). The sensor lever 280 can recede fully flush with the sensor body 284 (e.g., see FIG. 27A). FIG. 27E shows the sensor lever 280 partially receded, and it should be appreciated that the sensor lever 280 may be receded more flush with the sensor body 284. There may be a time delay (e.g., approximately 2 seconds) from the time the sensor 270 is tripped and the lock solenoid 290 is energized. This delay was required for users which may close the door more slowly. Thus, the sensor 270 ensures that the entry/exit port 200 is closed and lockable before locking the entry/exit port 200 via the lock solenoid 290.

The entry/exit port 200 provides several advantages. For example, the entry/exit port 200 requires no additional space within the cartridge library 30 as the entry/exit port 200 uses an existing magazine cell 202. The entry/exit port 200 is configurable between a normal magazine cell accessible by the cartridge transport mechanism 54 or an entry/exit port that allows a user to insert or extract a cartridge into the cell. The entry/exit port 200 does not require taking the library off-line. Also, when the entry/exit port 200 is used, the magazine 52 remains locked, thereby preserving the inventory of all cells except the entry/exit port cell 202.

Transport Mechanism

FIG. 1 shows cartridge transport mechanism 54 in position in automated cartridge library 30. Cartridge transport mechanism 54 serves to transport a cartridge between the cells of the magazines 52, and between the magazine cells and one or more of the plural drives 60 accommodated in the drive bay 50. The cartridge transport mechanism 54 comprises robot 300 (see FIG. 28) which actually grips and transports a cartridge from an initial location to a destination location. For example, robot 300 can move a cartridge from one magazine cell to another magazine cell, from a magazine cell to a selected drive 60; and from a drive 60 to a selected magazine cell. When stocking automated cartridge library 30, the automated cartridge library 30 can carry cartridges loaded into the entry/exit port cell 202 of entry/exit port 200 to another cell in automated cartridge library 30.

Figure 28:
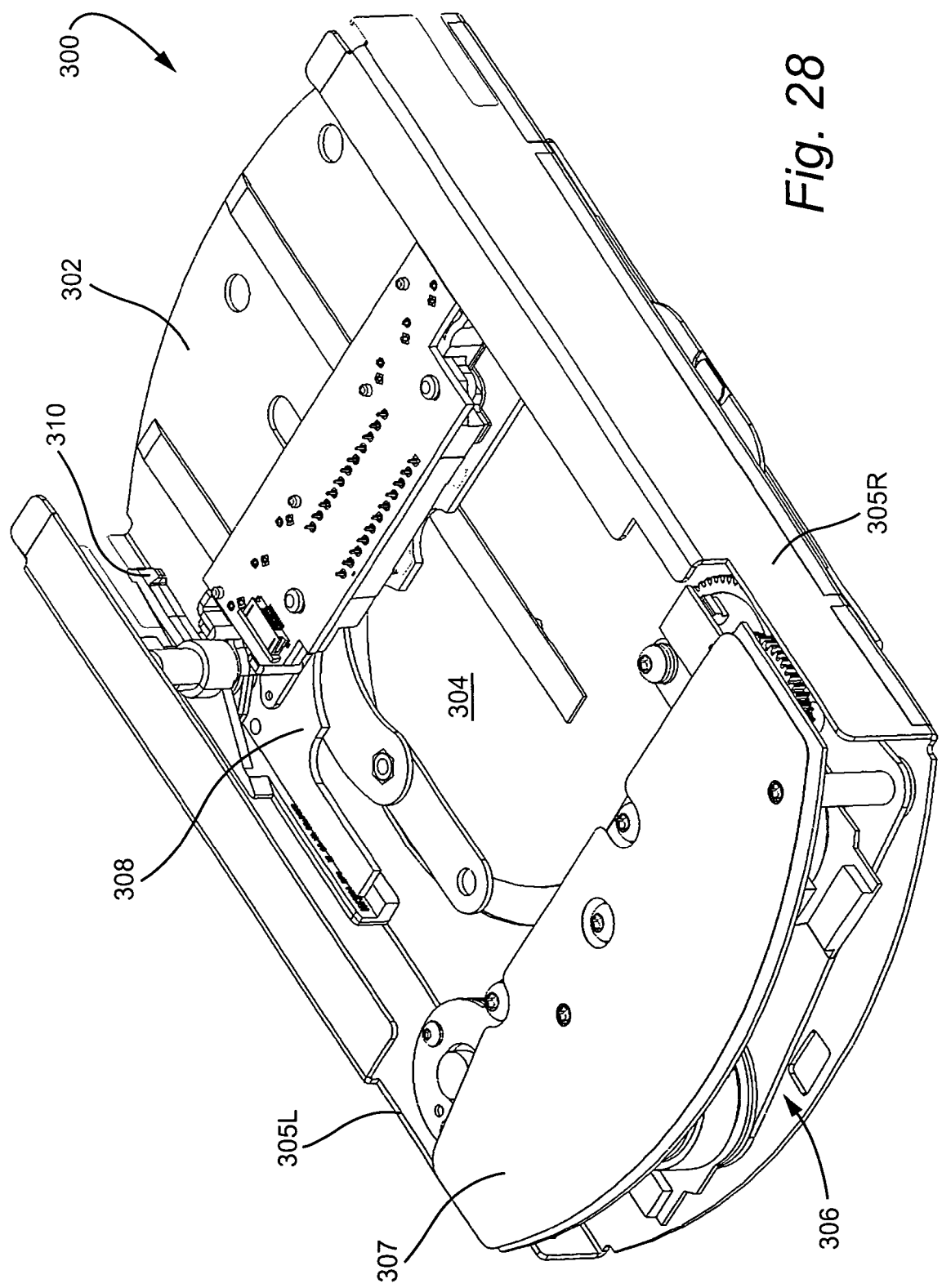
FIG. 28 is a top perspective view of a robot according to an example embodiment.

The robot 300 is shown in FIG. 28 as including a robot tray 302, also known as a robot carriage or carriage tray. The robot tray 302 comprises a robot tray floor 304 which lies essentially in the XY plane (see FIG. 1). Along its major XY plane dimension, the robot tray 302 has two side rails or guides 305L, 305R which extend orthogonally to the robot tray floor 304, e.g., reside in parallel XZ planes as shown in FIG. 1. At one end, the robot tray 302 carries motor and gearing region 306 which is covered by motor/gear cover 307. An end of robot tray 302 opposite to motor and gearing region 306 has an open mouth for accommodating a cartridge engaged by robot carriage 308. Robot carriage 308 extends across robot tray 302 essentially from side rail 305L to side rail 305R. The robot carriage 308 of robot 300 includes two cartridge engagement fingers, also called cartridge hooks 310. As seen from the robot 300 looking toward a cell of a cartridge magazine 52, the cartridge hooks are viewed as a left hook 310L and a right hook 310R. The robot carriage 308 travels linearly, e.g., along the X direction as shown in FIG. 1, and thus, when engaging a cartridge, serves to move or displace between a carriage retracted position to a carriage extracted position, and thereby linearly displace the cartridge engaged by the cartridge engagement elements 310.

Figure 29:
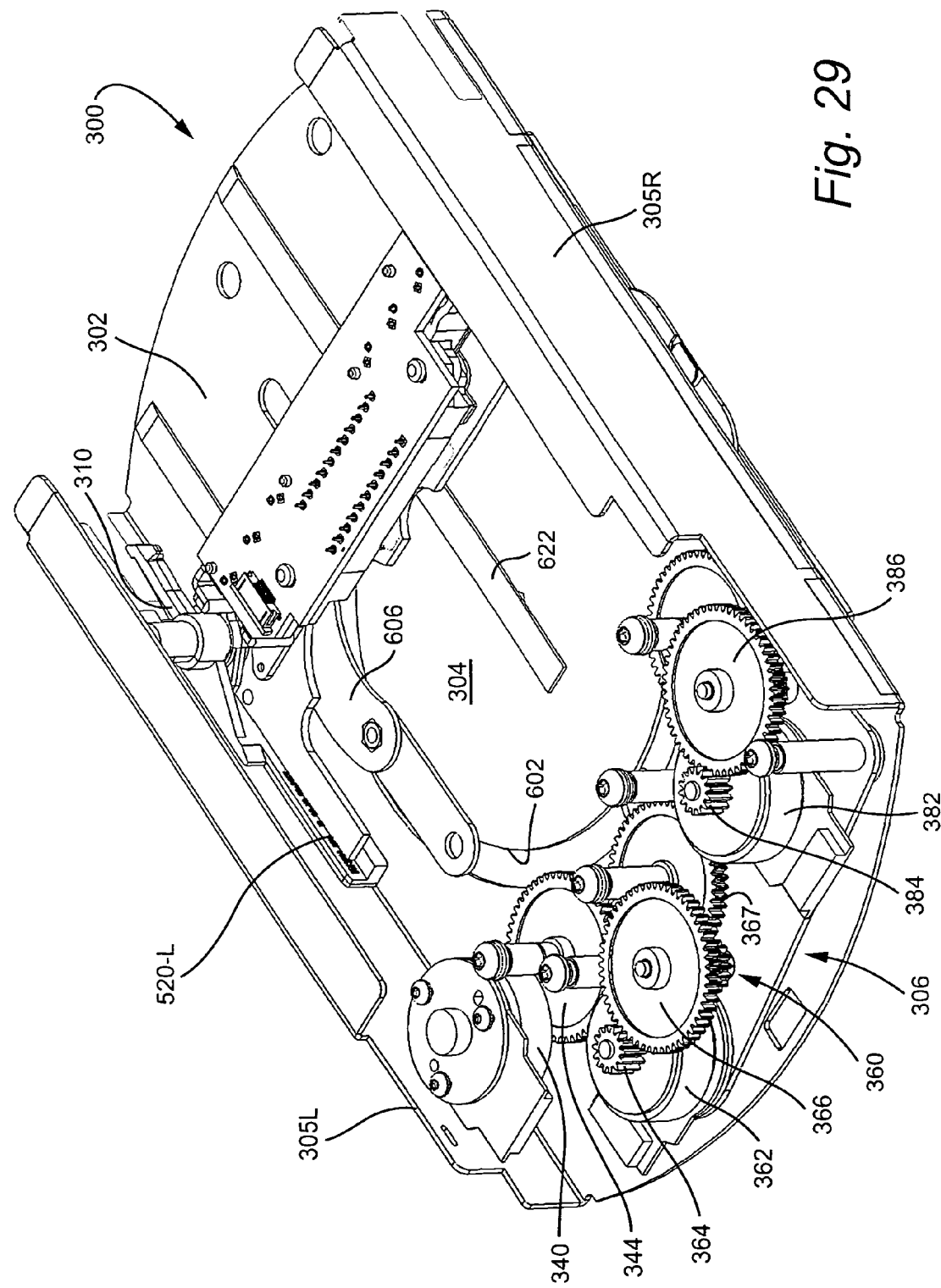
FIG. 29 is a top perspective view of the robot of FIG. 28, but with a cover removed to expose a motor and gearing region.
Figure 30:
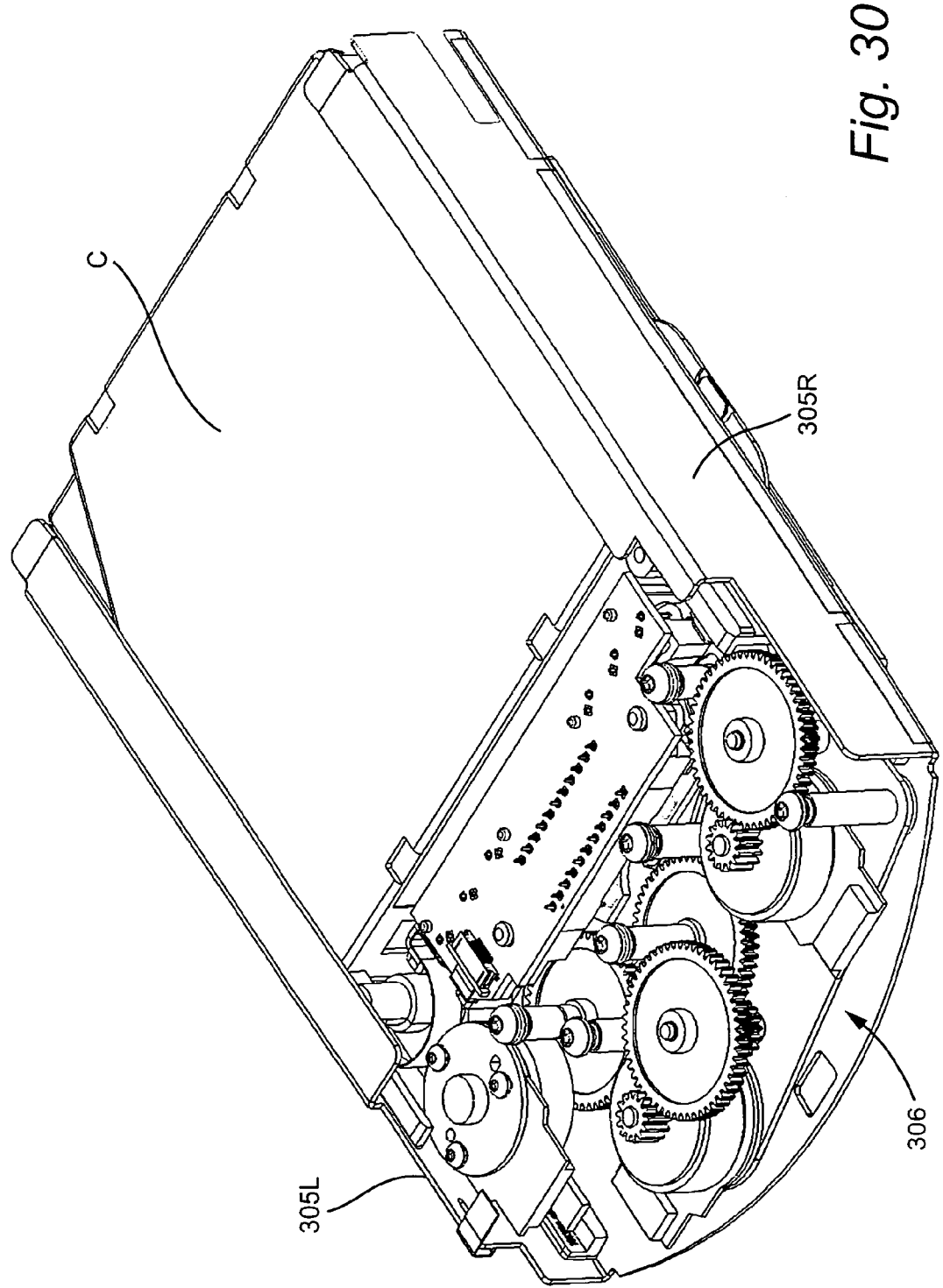
FIG. 30 is a top perspective view of the robot of FIG. 28 with the robot engaging a cartridge.

FIG. 29 shows robot 300 with its motor/gear cover 307 removed, thereby exposing motor and gearing region 306. Example constituent members of motor and gearing region 306 are subsequently described. FIG. 30 shows robot 300, not only with motor/gear cover 307 removed, but also engaging an example cartridge C.

The cartridge transport mechanism 54 comprises not only robot 300, but also a robot motive system. The robot motive system encompasses three robot motive subsystems, as well as a motive subsystem for robot carriage 308.

Figure 31:
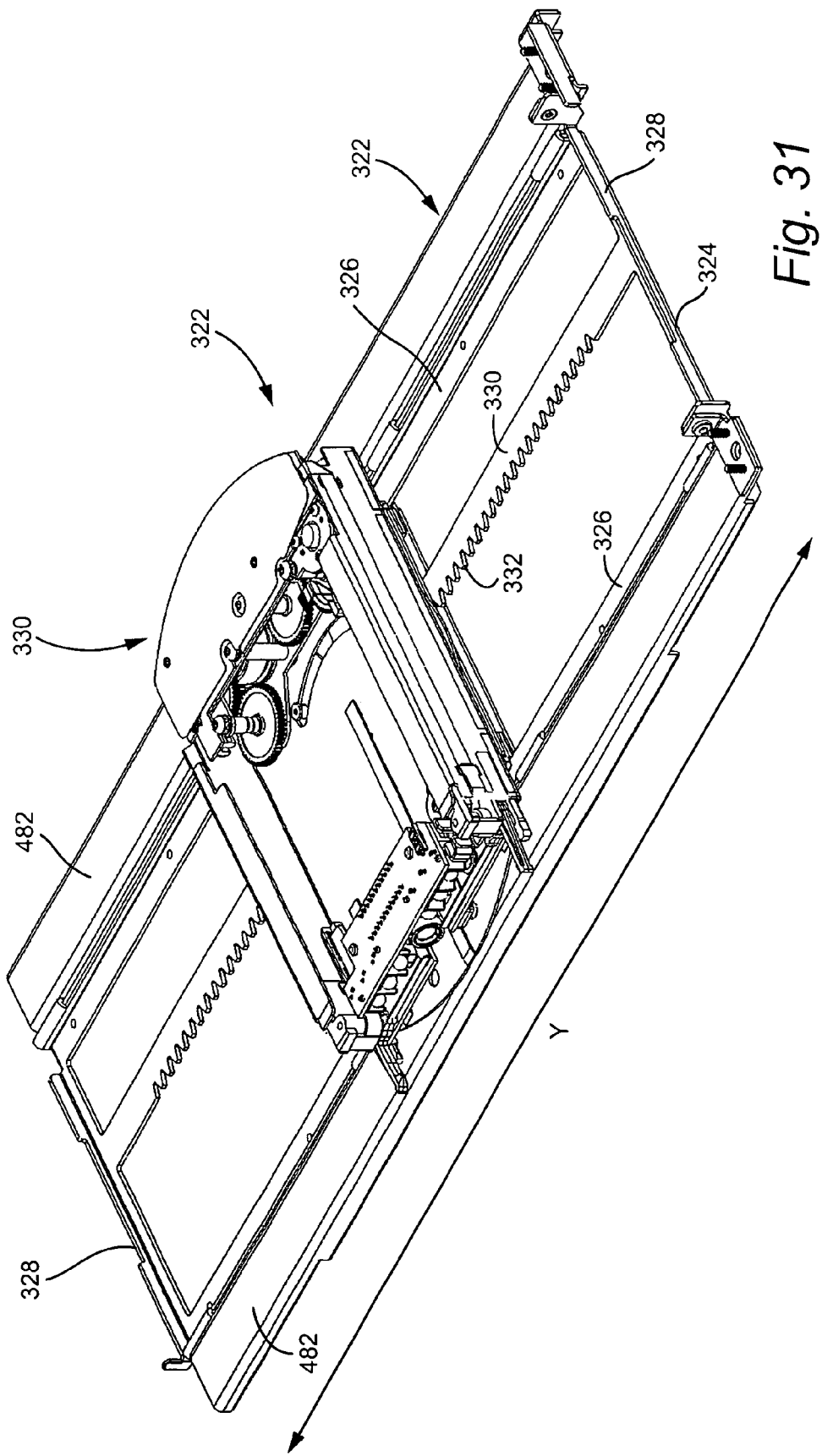
FIG. 31 is a top perspective view of a robot and portions of a robot first motive subsystem according to an example embodiment.
Figure 32:
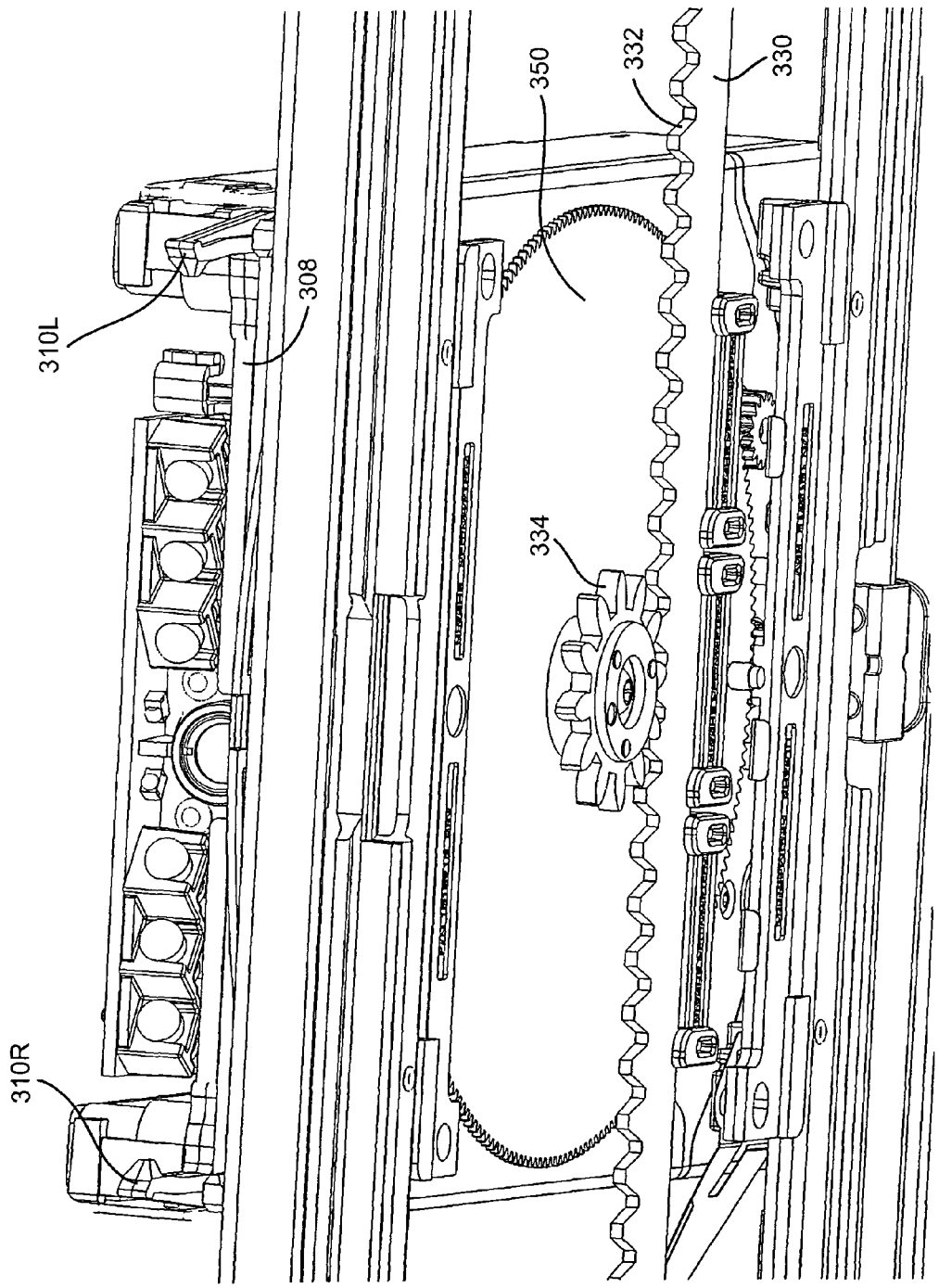
FIG. 32 is a bottom perspective view of the robot and robot first motive subsystem portions of FIG. 31.

A robot first motive subsystem 320 facilitates movement of robot 300 along the Y axis (see FIG. 1). The robot first motive subsystem 320 is shown in FIG. 31 as comprising robot track assembly 322. The robot track assembly 322 comprises track frame 324. The track frame 324 has an essentially rectangular perimeter shape, and comprises two parallel and opposed major frame members 326 connected by two parallel and opposed end frame members 328. The major frame members 326 extend in the library Y direction; the end frame members 328 extend in the library X direction. A robot track or rack 330 bridges and is connected to the end frame members 328, the robot rack 330 thus also extending between the end frame members 328 and in parallel relation to major frame members 326. On one of its longitudinal edges, rack 330 is provided with teeth 332 for engagement with pinion 334. As seen in FIG. 32, pinion 334 is situated underneath robot carriage 308.

Figure 33:
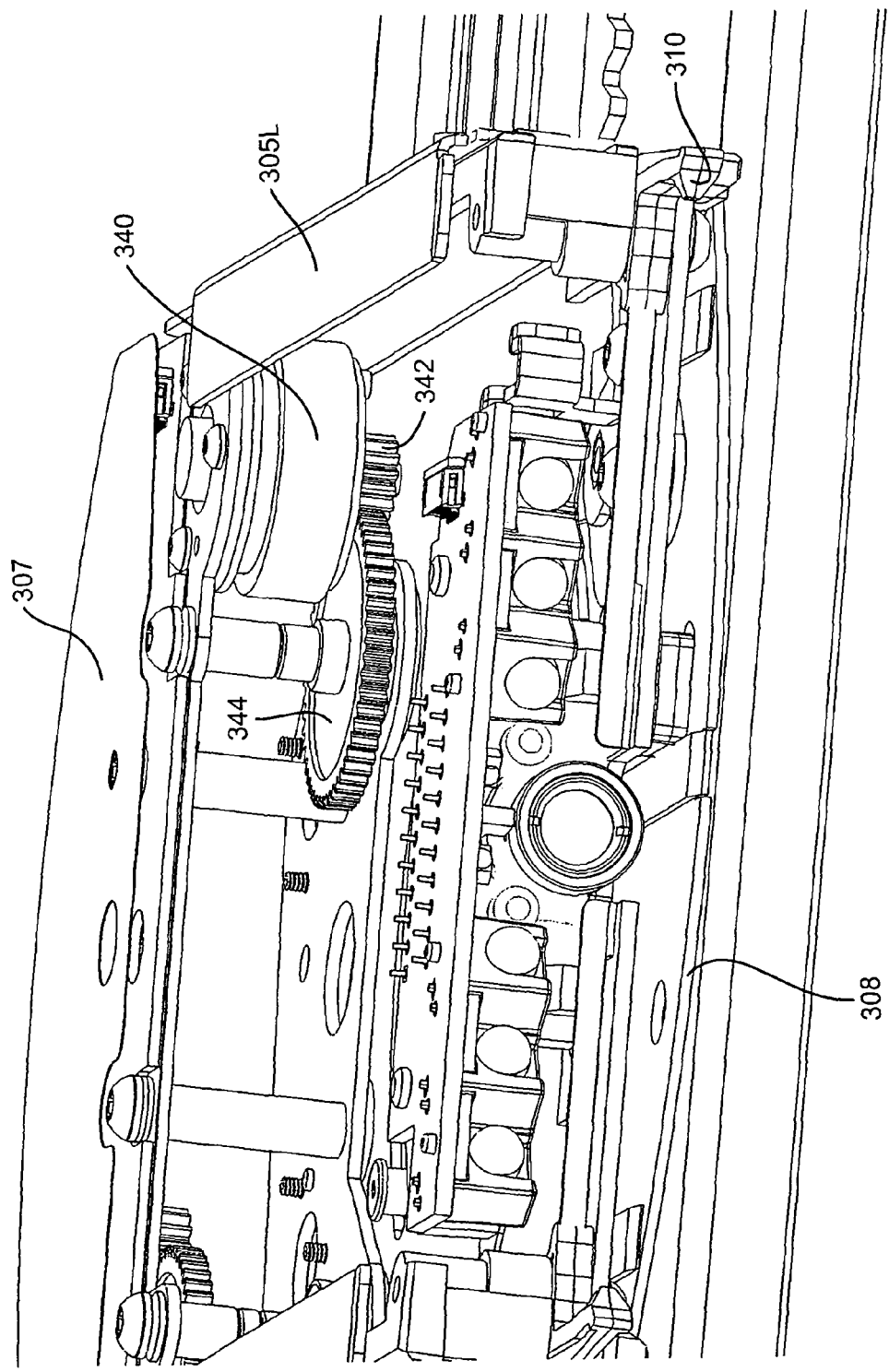
FIG. 33 is a side top perspective view of the robot and robot first motive subsystem portions of FIG. 31.

FIG. 29 and FIG. 31 show drive motor 340 included in robot first motive subsystem 320. The motor 340 is mounted on an upper side of robot tray floor 304. An output shaft of motor 340 is connected to output gear 342, which in turn meshes with larger gear 344 (e.g., see FIG. 33). A central shaft upon which gear 344 is mounted rotates with gear 344 and rotatably extends through robot tray floor 304 for connection with the under-tray pinion 334. As shown, for example, in FIG. 34, under-tray pinion 334 of robot first motive subsystem 320 is not the only gear situated under robot carriage 308. Another gear or drive disk 350 is also positioned beneath robot carriage 308, between library rear wall 34 and robot tray floor 304, and is axially co-centered with pinion 334. Although concentric, the pinion 334 and drive disk 350 do not rotate together, but are separately driven. For this reason, a top surface of pinion 334 is at least partially covered with a thin (0.13 mm thick) layer of UHMWPE (Ultra High Molecular Weight Polyethylene). UHMWPE is a low friction material with high toughness, and thus reduces friction between pinion 334 and the drive disk 350 (which is between pinion 334 and the underside of robot tray floor 304).

Figure 35:
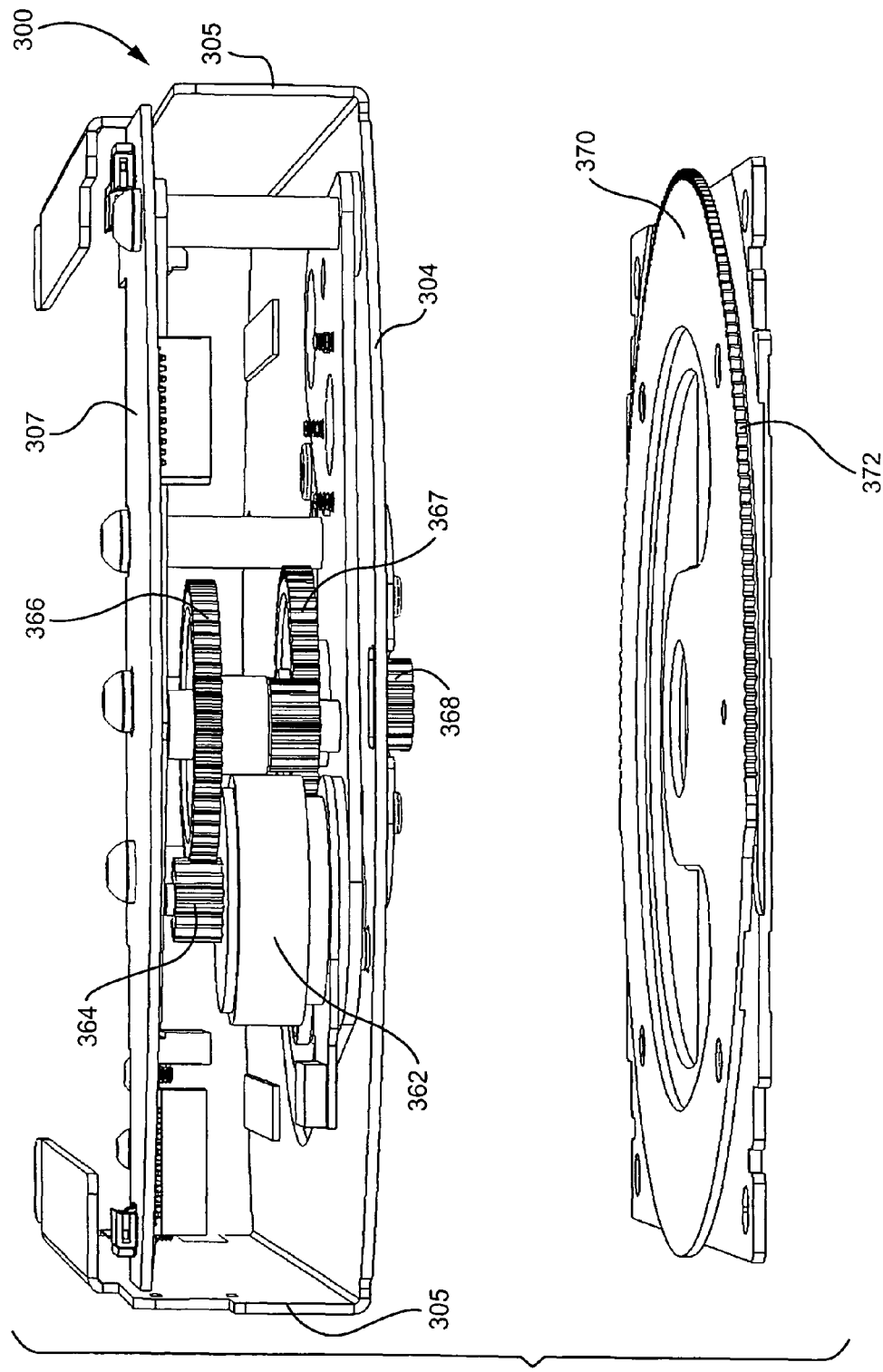
FIG. 35 is a perspective side view showing portions of the robot of FIG. 28 and portions of a robot second motive subsystem.

A robot second motive subsystem 360 facilitates movement of robot 300 rotationally about the Z axis (see FIG. 1), e.g., about a "theta" axis. The robot second motive subsystem 360, e.g., the "theta" motive subsystem, comprises theta motor 362 carried on robot tray 302 (see FIG. 29 and FIG. 35). The robot second motive subsystem 360 comprises gears 364, 365, and 367 rotatably mounted on the upper side of robot tray floor 304, and a circular gear 370 (also known as a "theta gear") situated beneath robot tray floor 304. Gear 364 is mounted on an output shaft of motor 362 and meshes with larger gear 366. Gear 366 is co-axially mounted to rotate with gear 367. Gear 367 has a pinion 368 which protrudes through the floor 304 of the robot tray 302. In this case the pinion does not drive circular gear 370, but instead drives against a periphery of circular gear 370. The gear 370 is attached to robot carriage 308 and has teeth 372 along its periphery, e.g., approximately one hundred eighty degrees of its circular periphery, for engagement with teeth of pinion 368. The robot carriage 308 is slideably mounted (and thus cannot rotate relative) to an elevator frame. So connected, rotation of pinion 368 as operated by motor 362 causes rotation of robot 300 about the Z axis, e.g., around its center of rotation, thereby enabling robot 300 to face both cartridge magazine 52R and cartridge magazine 52L.

Figure 36:
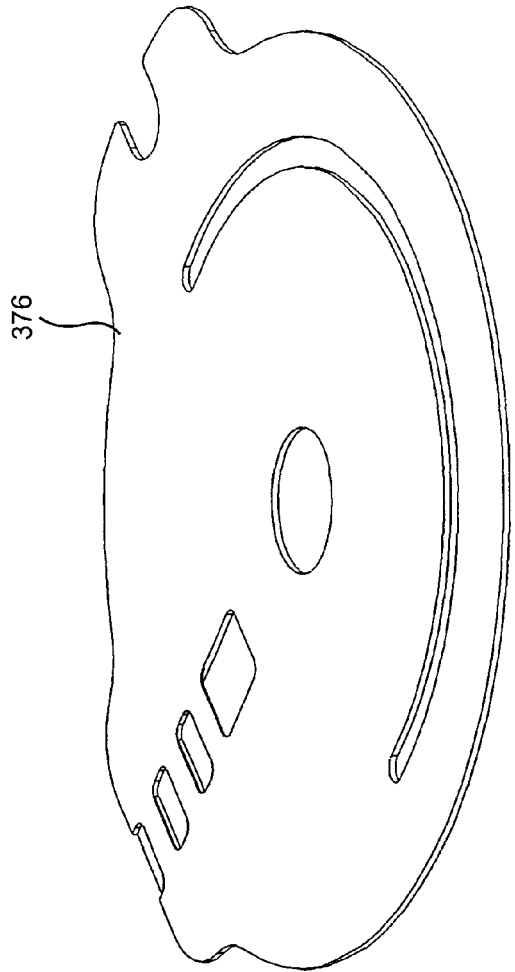
FIG. 36 is a top perspective view of a discus bushing employed in the robot second motive subsystem of FIG. 35.

A discus bushing 376 is situated between a top of the gear 370 and the bottom of drive disk 350. In an example implementation, drive disk 350 (shown in FIG. 36) is approximately 0.8 mm thick and made of Delrin-AF (Delrin plus Teflon). The discus bushing 376 reduces the friction between the gear 370 and drive disk 350. In addition, discus bushing 376 comprises features allowing a flex cable to be routed through the robot from a controller to the elevator frame.

A carriage motive subsystem 380 facilitates movement of robot 300 along the library X axis (see FIG. 1). This carriage motive subsystem 380, also known as a "reach mechanism", converts rotary motion of drive disk 350 into linear motion of the robot carriage 308, the linear motion being less than the diameter of drive disk 350. The linear motion of the reach shuttle, e.g., of robot carriage 308, is used to move a tape cartridge out of and into the robot tray 302. This tape cartridge is going into or being taken out of a magazine cell, an entry exit port, or a drive. The robot 300 transports this cartridge between these library addresses.

The carriage motive subsystem 380 comprises reach motor 382 and a compound gear train comprising, e.g., gears 384, 386, mounted on robot tray 302 (see FIG. 28). A pinion connected to one of the gears protrudes through robot tray floor 304 and drives drive disk 350, which in turn moves robot carriage 308 as hereinafter described.

Thus, cartridge robot 300 comprises robot carriage 308; robot tray 302; and a carriage motive system (e.g., robot third motive subsystem 380). The robot tray 302 comprises a guide (e.g., side rails or guides 305) configured to facilitate linear motion of robot carriage 308, the robot carriage 308 being situated on a first side of the robot tray 302. The robot carriage 308 comprises cartridge engagement elements 310 configured to selectively engage and release the cartridge. The carriage motive system 380 is configured to provide linear motion to the robot carriage 308 along the robot tray 302 from a carriage retracted position to a carriage extracted position (e.g., along the library X axis) and thereby linearly displace the cartridge engaged by the cartridge engagement elements 310.

Figure 37A:
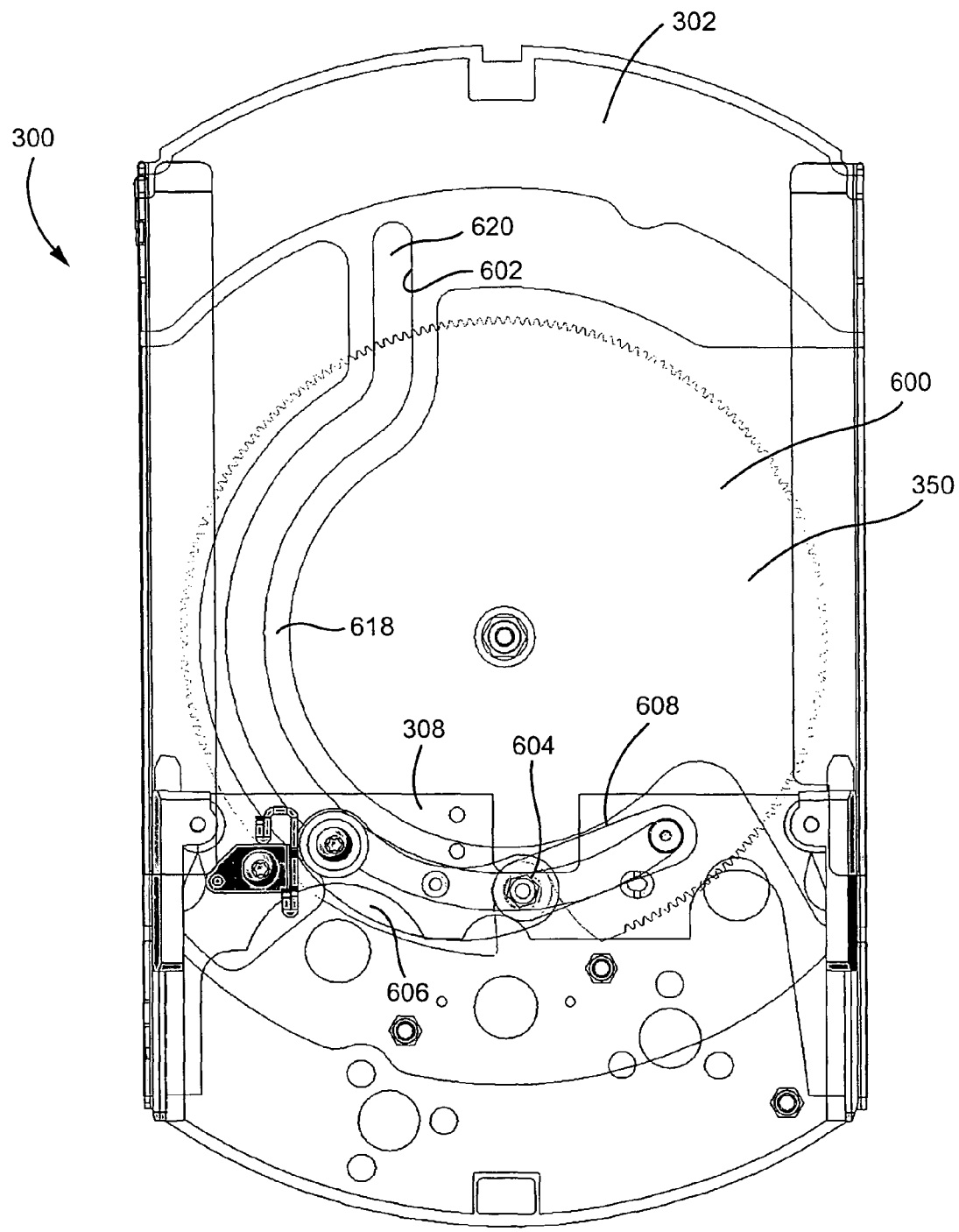
FIG. 37A is a top view of the robot of FIG. 28 with its robot carriage in a start of stroke or retracted position.
Figure 37B:
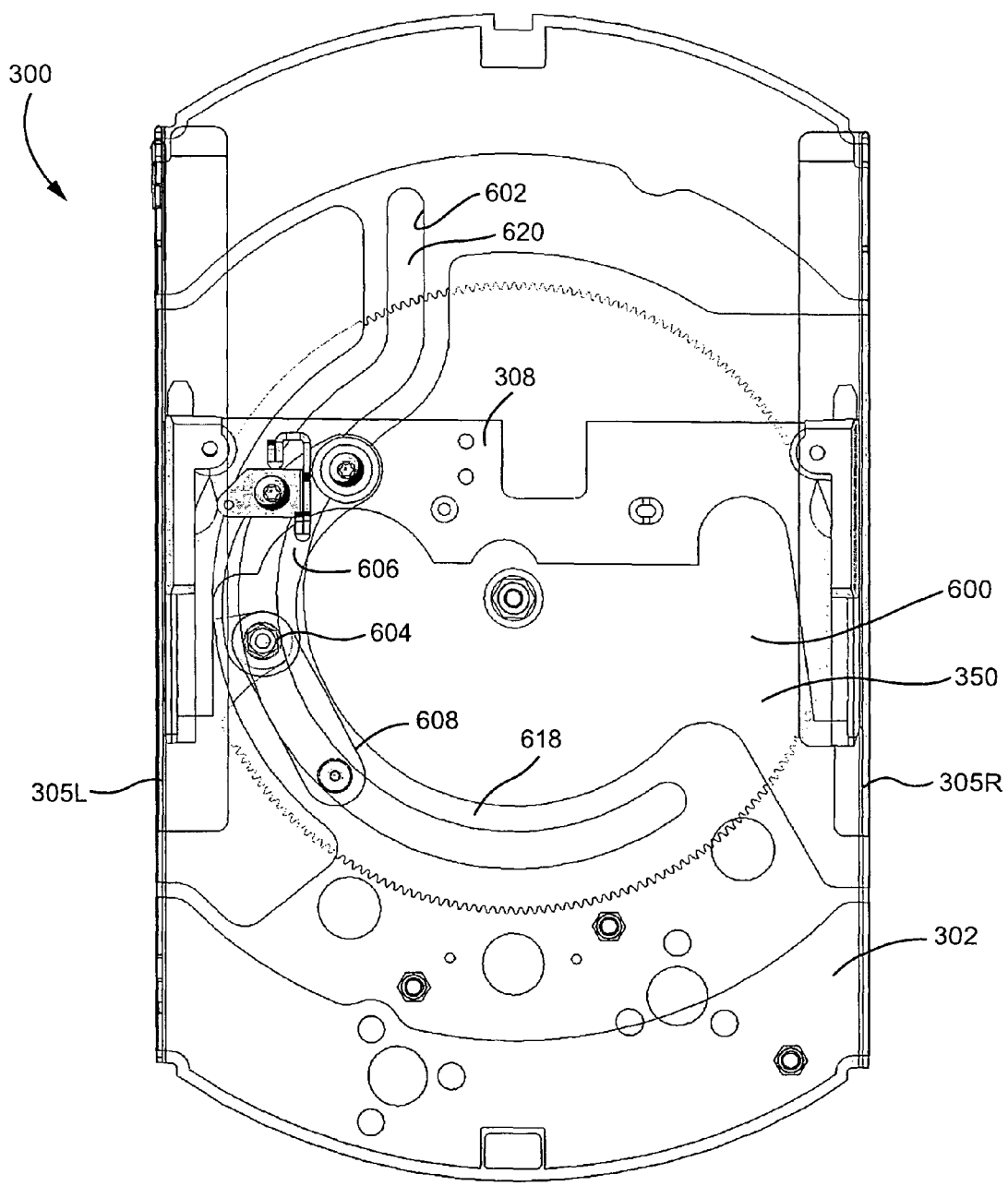
FIG. 37B is a top view of the robot of FIG. 28 with its robot carriage in mid-stroke position.
Figure 37C:
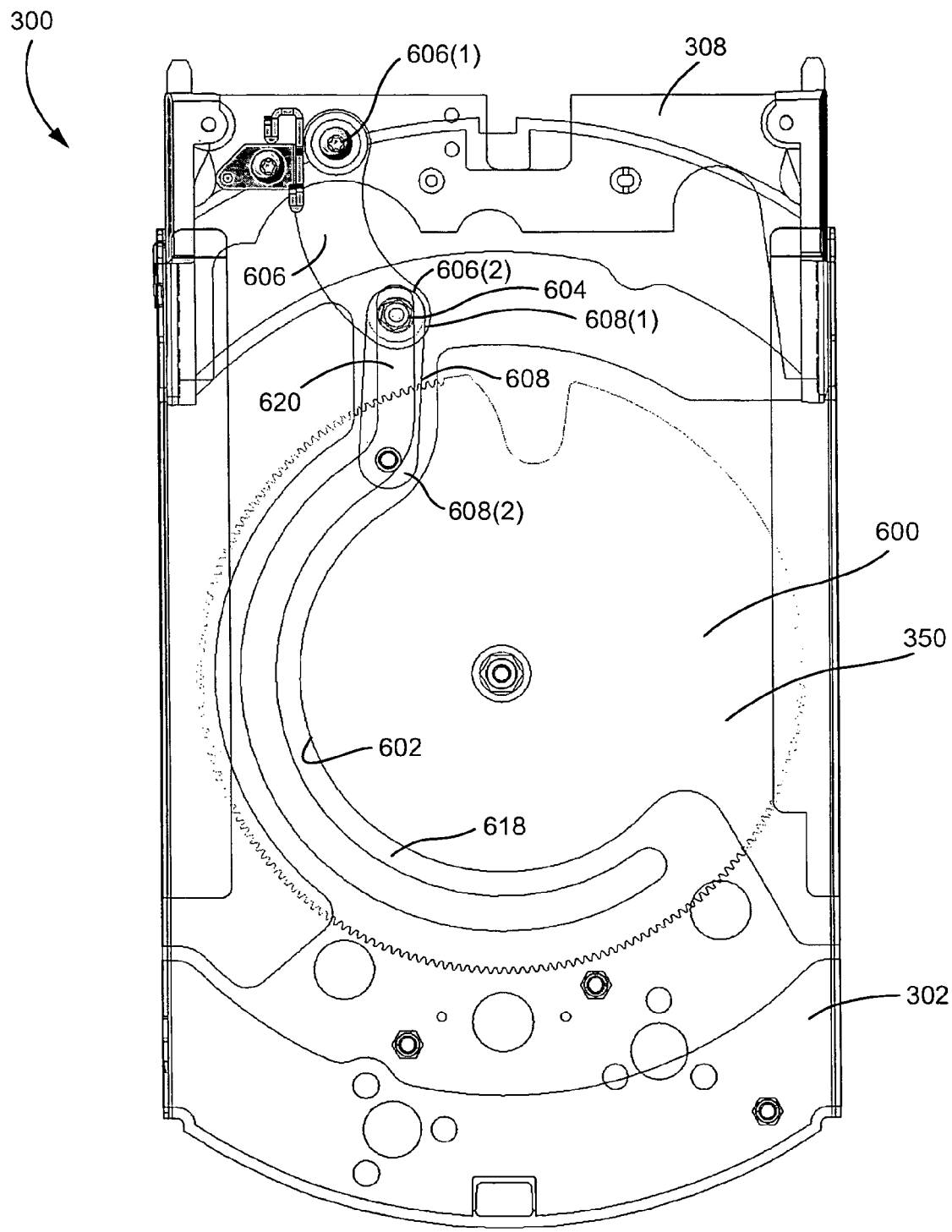
FIG. 37C is a top view of the robot of FIG. 28 with its robot carriage in an end of stroke or extended position.
Figure 38:
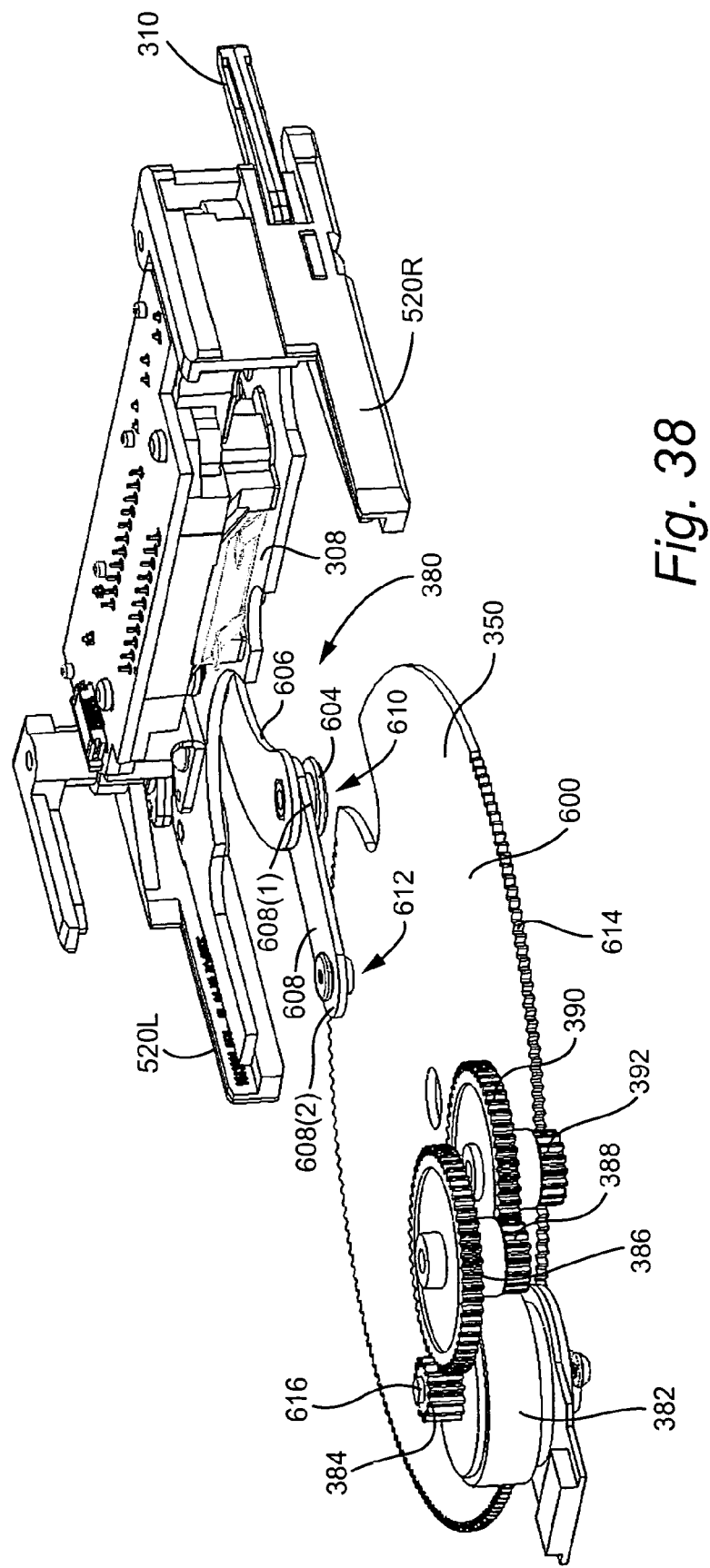
FIG. 38 is a side perspective view of cartridge robot and carriage motive portions of the robot of FIG. 28.

FIG. 37A is a top view of the robot 300 of FIG. 28 with its robot carriage 308 in a start of stroke or retracted position; FIG. 37B is a top view of the robot 300 of FIG. 28 with its robot carriage 308 in mid-stroke position; and FIG. 37C is a top view of the robot 300 of FIG. 28 with its robot carriage 308 in an end of stroke or extended position. FIG. 38 is a side perspective view of robot carriage 308 and carriage motive portions of the robot 300 of FIG. 28, e.g., carriage motive subsystem 380.

Figure 34:
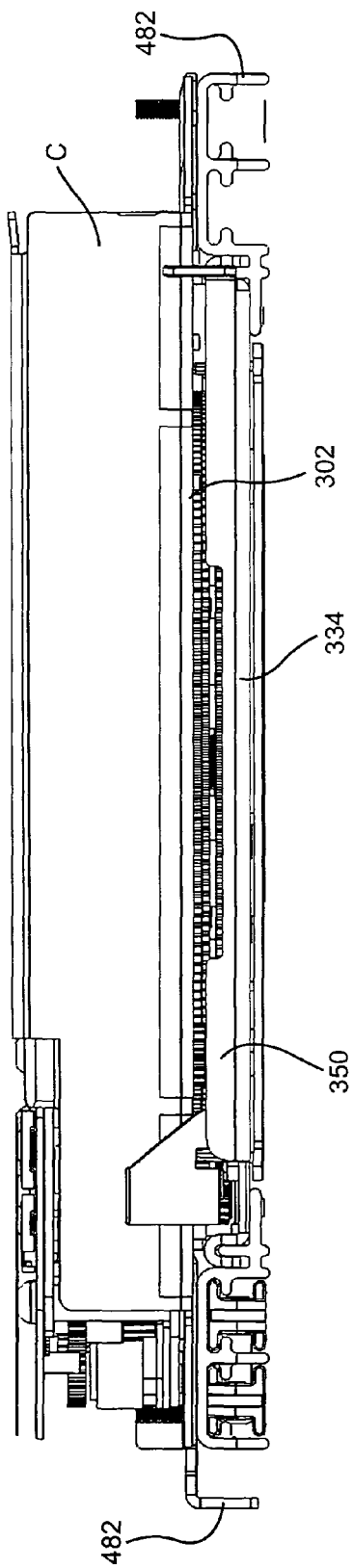
FIG. 34 is a side view showing relative placement of gears beneath a robot tray floor of the robot of FIG. 28.

As illustrated, the carriage motive system 380 comprises a rotation driver 600; a cam slot 602 provided in the robot tray 302; a cam follower 604; and, a cam connection link 606 for linking the robot carriage 308 with the cam follower 604. The rotation driver 600 can take the form of a rotatable member (e.g., drive disk 350). As shown in FIGS. 32 and 34, the rotatable member (e.g., disk drive 350) is preferably provided on a second side of the robot tray 302 (the second side of the robot tray 302 being opposite the first side of the robot tray 302 where resides the robot carriage 308). The cam slot 602 is provided in and extends through the robot tray 302. The cam slot 602 comprises a predetermined slot configuration for facilitating translation of rotational motion of the rotatable member (e.g., drive disk 350) into the linear motion of the robot carriage 308. The cam connection link 606 has a first end 606(1) pivotally connected to the robot carriage 308 (e.g., via a fastener extending into a PEM standoff extending up from the first end 606(1)) and a second end 606(2). The cam follower 604 is configured to extend through the cam slot 602 a second end of the cam follower 604 is attached to the second end 606(2) of the cam connection link 606. A polymer bushing may used to assure free rotation between link 606 and the carriage 308.

In an example embodiment, the carriage motive system 380 further comprises a second link 608. The cam follower 604 is attached to the rotatable member or disk drive 350 through the second link 608. The second link 608 comprises a second link first end 608(1) pivotally connected to a first end of the cam follower 604 (e.g., via a fastener that attaches the cam follower 604 and the link 608 to a PEM standoff extend down from the second end 606(2) of link 606) and a second link second end 608(2) connected to the rotatable member or disk drive 350. The second link first end 608(1) is pivotally connected to the first end of the cam follower 604 at a linkage intermediate connection point 610. In use, the link 608 pushes the cam follower 604 and the second end 606(2) of link 606 along the cam slot 602.

In order to provide compactness and yet sufficient reach of the robot carriage 308, the cam connection link 606 and the second link 608 essentially fully overlap the robot carriage 308 when the robot carriage 308 is in the carriage retracted position (e.g., see FIG. 37A). Preferably, the cam connection link 606 and the second link 608 are situated below the robot carriage 308 and above the robot tray 302. Moreover, the cam connection link 606 is situated above the second link 608 at the linkage intermediate connection point 610 (e.g., see FIG. 38). Further, with the second link first end 608(1) being pivotally connected to the first end of the cam follower 604 at the linkage intermediate connection point 610 and the second link second end 608(2) being connected to the rotatable member or disk drive 350 at a linkage disk connection point 612, the linkage intermediate connection point 610 and the linkage disk connection point 612 are essentially collinear when the robot carriage 308 is at the carriage extracted position.

The increased stroke is realized due to the more favorable start position (e.g., links 606, 608 and carriage 308 overlap) in addition to the links 606, 608 being more collinear at the end of the stroke (e.g., at the carriage extracted position), e.g., the links may go past a point of being collinear. This point of being collinear occurs at the nominal end of stroke when the cartridge has reached the back of the cell or the back of the load tray in a drive. The force exerted by the carriage 308 is maximized when the links 606, 608 are collinear.

In an example implementation, the rotatable member comprises a disk (e.g., drive disk 350) having gearing teeth 614 provided along at least a portion of a disk periphery. In such implementation, the carriage motive system 380 further comprises motor 382 and the gear system (e.g., gears 384, 386, 388, 390, 392). The motor 382 is situated on the first side of the robot tray 302 (a side of the robot tray 302 opposite the rotating disk 350). The motor 382 comprises a rotating output shaft 616. The gear system comprising gears 384, 386, 388, 390, 392 intermesh the rotating output shaft 616 of the motor 382 with the gearing teeth 614 of the disk periphery.

The carriage motive system 380 is configured to linearly displace the cartridge in a cartridge linear travel direction, e.g., along the library X axis. With respect to the cartridge linear travel direction, the cartridge engagement elements 310 are connected to the robot carriage 308 on a first side of the robot carriage 308 and the cam connection link 606 is connected to the robot carriage 308 on a second side of the robot carriage 308.

In an example embodiment, the predetermined slot configuration of the cam slot 602 comprises a semicircular cam slot section 618 and a linear slot section 620 which communicates with the semicircular cam slot section 618. The linear slot section 620 is arranged so that the cam follower 604 follows the linear slot section 620 when the carriage approaches the carriage extracted position (e.g., see FIG. 37C).

In an example embodiment, the cam connection link 606 has an essentially crescent shape, and is essentially fully overlapped and beneath the robot carriage 308 when the robot carriage 308 is in the carriage retracted position (e.g., see FIG. 37A).

The carriage motive system 380 includes several advantages. For example, the carriage motive system 380 is configured to convert rotary motion to linear motion with increased linear motion. Also, the carriage motive system 380 allows motion drive elements (e.g., cam follower 604, a cam connection link 606, second link 608) and the load being moved (e.g., robot carriage 308) to share space by increased overlapping, thereby producing a more compact assembly.

In an example implementation, the motors (e.g., motors 340, 362, 382) are brushless dc motors, with hall sensor generated tachometer counts. There may be two circuit cards involved in controlling the robotics motors, e.g., a first card or Neo card and a second card or Morpheous card. The Neo card may be located in the left rear of the library. The Neo card tasks the motors by telling them where to go, monitors and interprets actual against tasked tachometer counts, and monitors drive currents looking for stall conditions. The Neo card communicates with the Morpheous card, which is located on top of the motor gear-train assemblies in the robot. The Morpheous card contains the commutation logic in a FPGA, and the motor drivers.

In an example implementation, the robot tray 302 provides several functions. For example, the robot tray: provides a platform for the carriage 308, which is guided by the floor 304 and the side rails 305 of the robot tray 302; provides a secure location for the tape cartridge while the robot 300 is transporting the cartridge to and from cells in the library; provides vertical guiding for the tape cartridge when it is being transferred from the tray 302 into cells and drives, or being transferred from cells and drives into the tray 302; mounts the motors 340, 362, 382 and gear-trains; provides a connection between the three axes robot 300 and the "elevator" motive subsystem (described below); provides mounting surfaces for a Barcode reader flex cable (e.g., the Barcode reader is mounted on the carriage 308, and the barcode flex cable goes to the Morpheous card, which is mounted on top of the robot motor gear-train assembly); and provides mounting surfaces for the Z flex cable which goes from the Morpheous card to the Neo card.

In an example implementation, glide members or up-standing side parts 520L and 520R are provided to sides of the carriage 308 for guiding the carriage 308 along the side rails 305L and 305R of the robot tray 302. The glide members 520 serve one or more of the following purposes: the glide members 520 are a Teflon bearing polymer to reduce the sliding friction on the tray 302; they provide a rotational axis for the spring loaded cartridge hooks 310; they provide length to achieve a more favorable aspect ratio between the tray 302 and the carriage 308 to reduce sticking due to any cocking loads; they provide lateral location for the tape cartridge; they provide surfaces to push the tape cartridge; and one of the glide members may provide an egress path for the barcode flex cable.

The interaction between the side rails 305 and the glide members 520 of the carriage 308 is purely sliding, e.g., leading to sliding friction. As shown in FIG. 29 and 38, the connection between link 606 and the carriage 308 is offset to the left to reduce the cocking moment from contact with the left side rail 305L as the links 606, 608 tend to push the carriage 308 toward the left side rail 305L during the first half of the stroke (e.g., see FIG. 37B). Contact with the right side rail 305R is reduced by a slider or guide 532 (e.g., see FIGS. 42 and 47) under the center of the carriage 308 which slides on the left side of a cartridge glide strip 622 (e.g., see FIG. 29) attached to the floor 304 of the tray 302.

A robot third motive subsystem 450 facilitates movement of robot 300 along the Z axis (see FIG. 1). The robot third motive subsystem 450 shown in FIG. 39 and also known as the "elevator" motive subsystem, comprises elevator motor 452 housed in electronics bay 56. An output shaft of elevator motor 452 is connected through an elevator motor gear train 454 (also at least partially located in electronics bay 56) to drive idler gear 456. The idler gear 456 in turn meshes with right leadscrew drive gear/pulley 458, the two gears being essentially coplanar on a floor of automated cartridge library 30. The right leadscrew drive gear/pulley 458 is connected to rotate right leadscrew 460. The right leadscrew 460 extends upwardly in the Z direction, and is parallel to upstanding left leadscrew 462. The left leadscrew 462 has left leadscrew drive gear/pulley 464 concentrically mounted at its base. A transmission belt 466 is entrained about right leadscrew drive gear/pulley 458 and left leadscrew drive gear/pulley 464. Thus, rotation of right leadscrew 460 by elevator motor 452 via elevator motor gear train 454 also causes rotation of left leadscrew 462. Each of right leadscrew 460 and left leadscrew 462 are surmounted by lead screw nuts, e.g., right lead screw nut 470 and left lead screw nut 472. Rotation of right leadscrew 460 and left leadscrew 462 raise and lower the respective lead screw nuts 470, 472.

Figure 39:
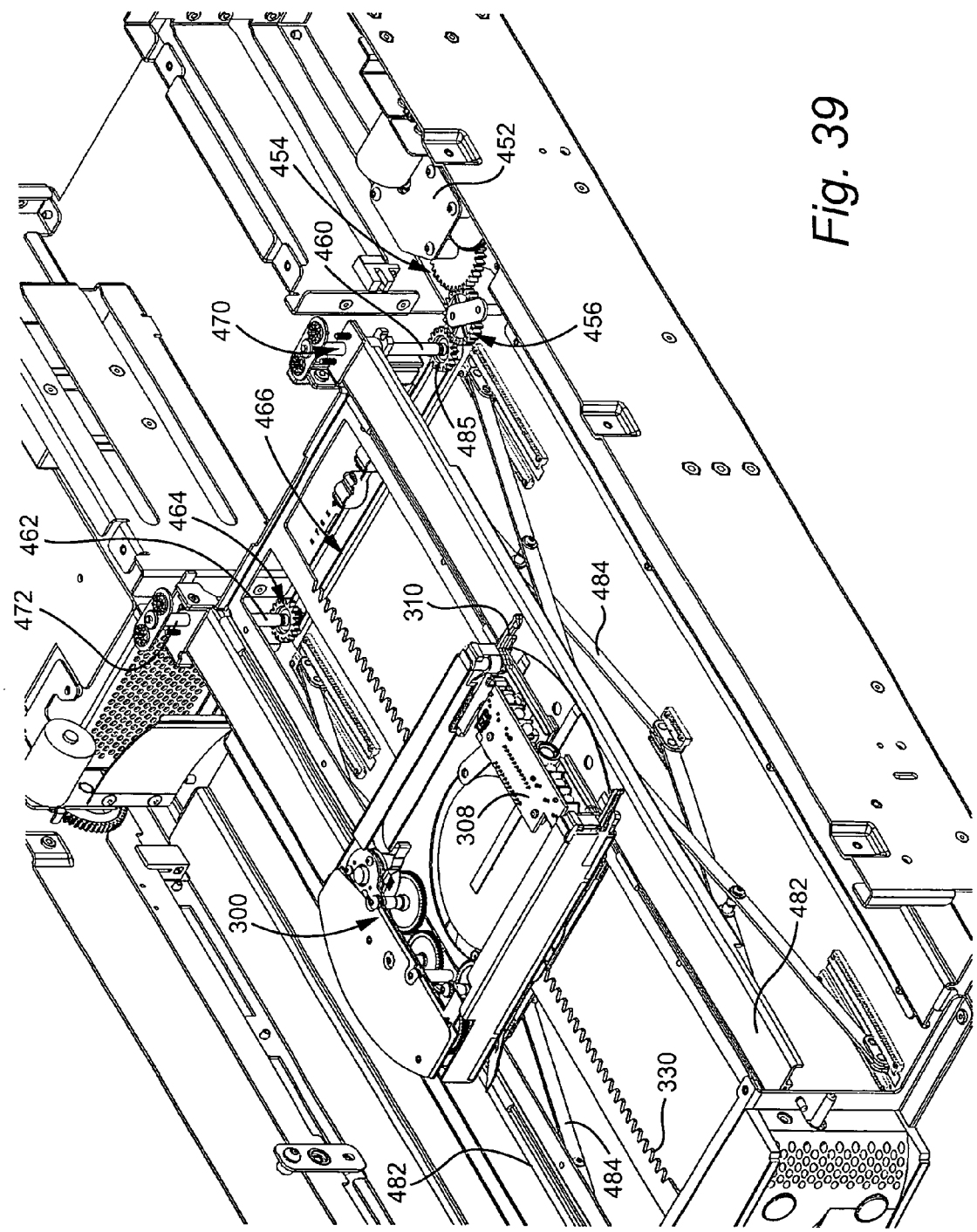
FIG. 39 is a side perspective view of portions of the library of FIG. 1 and particularly showing portions of robot third motive subsystem including an elevator.
Figure 41:
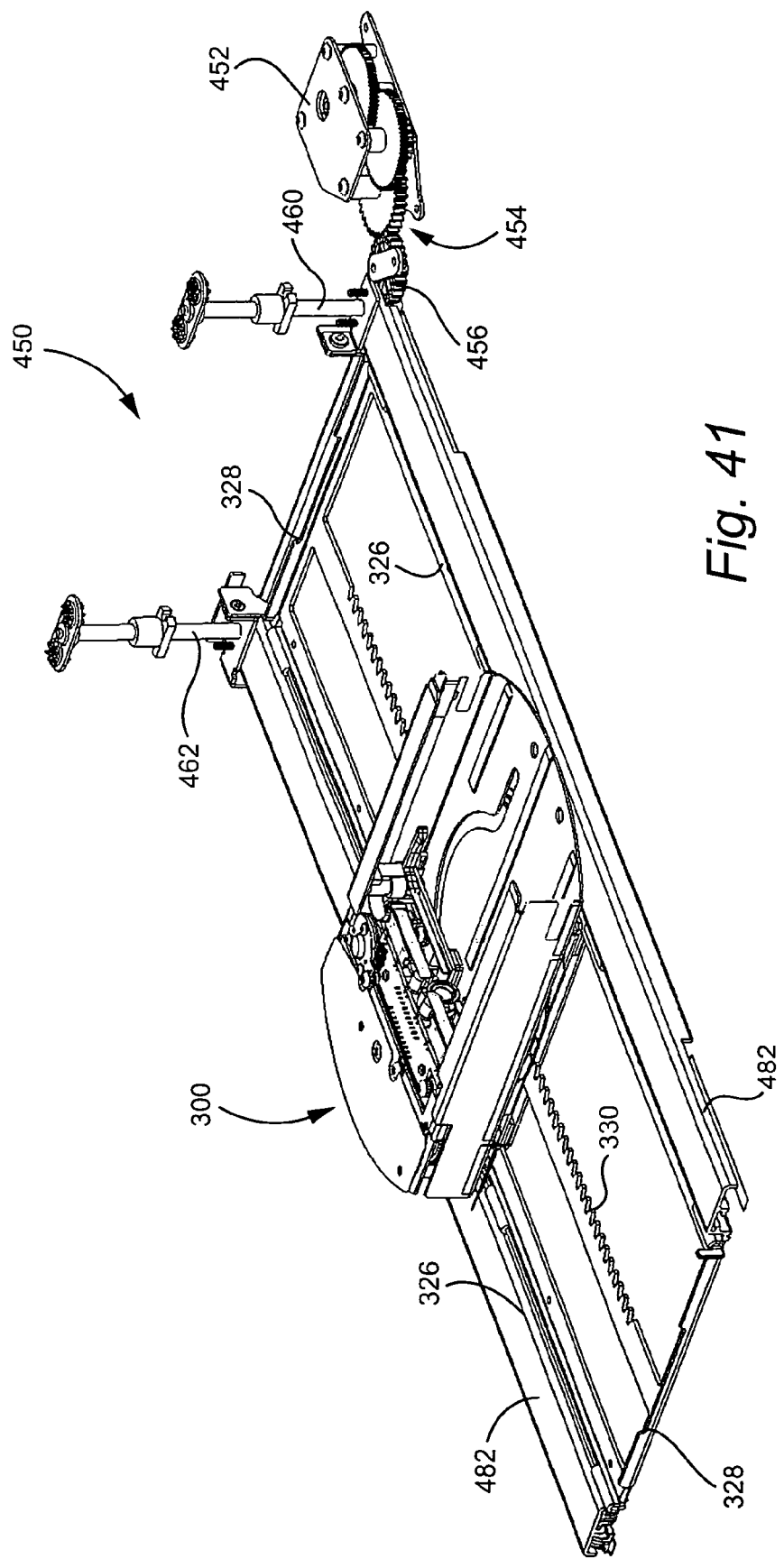
FIG. 41 is a side perspective view showing portions of a robot third motive subsystem including an elevator mechanism.

An elevator frame 480 is attached to the lead screw nuts 470, 472. As shown in FIG. 31, FIG. 39, and FIG. 41, elevator frame 480 comprises two parallel, spaced apart, rectangular, elongated elevator planks 482. The elevator planks 482 extend along the Y axis, with each of the two elevator planks 482 supporting a major frame members 326 affixed thereto (see FIG. 31 and FIG. 41). Rotation of the lead screw nuts 470, 472 causes raising or lowering of the elevator planks 482, and thus of the major frame members 326 and robot 300 traveling on rack 330.

The elevator frame 480 further comprises left and right elevator scissor assemblies 484 situated beneath elevator planks 482. The elevator scissor assemblies 484 are spring loaded and thereby tend to keeps elevator frame 480 approximately parallel with the floor of automated cartridge library 30. In the event there is any some droop at the front of the elevator (especially when robot 300 moves towards the front of the library), such droop can be calibrated out during the manufacturing of the library.

Figure 40:
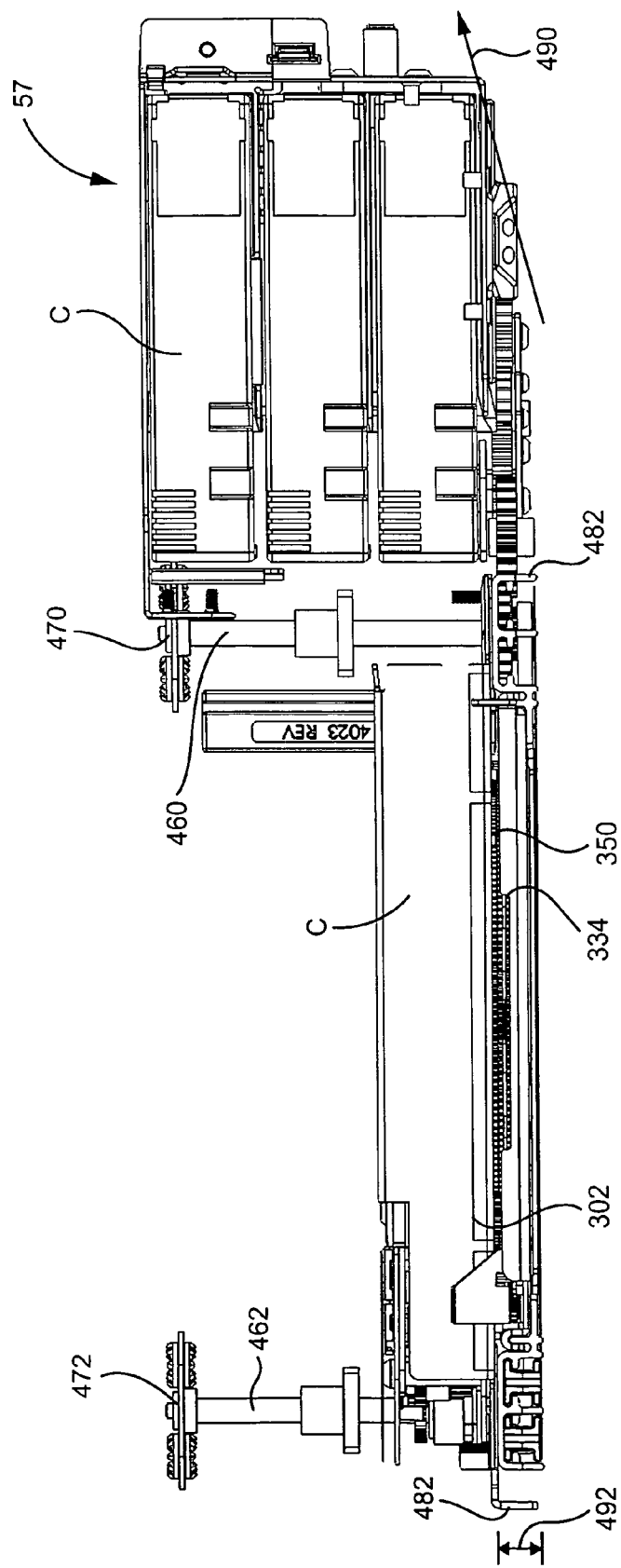
FIG. 40 is a front view showing portions of automated cartridge library, including an elevator, robot, and cartridge magazine.

Thus, as seen from the foregoing and illustrated, e.g., in FIG. 34 and FIG. 40, hardware described above which is below the robot tray robot tray 302 is nested into the elevator frame 480. Therefore, the elevator frame 480 and the hardware below the robot tray 302 share the same vertical space.

If the elevator mechanism had instead been integrated into the 300, either one of two potential problems would have occurred. Either robot 300 would have been thicker, or wider. If robot 300 were thicker, three rows of cartridges (along the Z direction as shown in FIG. 40) would not have been possible. Otherwise, the height of the automated cartridge library 30 would be undersirably extended as indicated by arrow 490 in FIG. 40. If robot 300 were wider, the library depth (along the Y axis) would have been greater. In addition, the use of UHMWPE reduces the thickness of the stack of gears (e.g., gear 334 and drive disk 350) under the robot tray 302.

Thus, the overall robot motive system comprises three robot motive subsystems and a (robot) carriage motive subsystem. The robot first motive subsystem 312 is configured to displace the robot 300 linearly in a first direction (Y direction). The robot second motive subsystem 360 is configured to rotate the robot 300 at last partially about an axis (the "theta" axis) extending in a second (Y) direction. The carriage motive system 380 is configured to displace the robot carriage 308 linearly in a third direction (X direction) toward and away from the cartridge magazine 52R or 52L. A robot third motive subsystem 450 is configured to displace the robot 300 linearly in the second direction (Z direction).

As described above, the third motive subsystem 450 comprises an elevator frame 480 having planks 482 extending in the first direction and having a plank height (indicated by arrow 492 in FIG. 40) extending in the second direction. At least one of the robot motive subsystems and the carriage motive subsystem comprise hardware situated on a second side (e.g., underside) of the robot tray 302, e.g., under robot tray floor 304. The hardware extends from the second side of the robot tray 302 in the second direction (e.g., Z direction) to an extent not substantially greater than the plank height indicated as 492. Locating the hardware of plural subsystems on the second side of the robot tray 302 and within a volume defined by the robot tray 302 and the plank height 492 facilitate not only a transport mechanism, but also a compact and efficient library. Preferably the hardware situated on the second side of the robot tray is also situated between the planks 482 with respect to the third direction.

In the example embodiment described, the hardware of at least one of the subsystems that is situated on the second side of the robot tray 302 is an ultimate gear of the subsystem. An ultimate gear of a subsystem is either the only or last acting gear in a gear chain affecting motion of the system. For example, the ultimate gear of the robot first motive subsystem is gear 334; the ultimate gear of the carriage motive subsystem is drive disk 350.

Whereas at least some of the hardware of the subsystem(s) is situated on the second side of the robot tray 302, at least one of the robot motive subsystems and the carriage motive subsystem comprise a motor situated on the first side of the robot tray. Therefore, the motor is connected (e.g., via gearing or a pinion) through the robot tray to the operative hardware on the second side of the robot tray 302.

Thus, the four motive systems as described herein maximize volumetric efficiency of automated cartridge library 30 and allow, e.g., vertical space available to be shared by two mechanisms as well as a shorter library frame (e.g., in the Y direction). By designing the elevator to comprise elevator frame 480 surrounding the three-axis robot 300, vertical space is shared between the three-axis robot and the elevator mechanism, thereby preserving the maximum cartridge capacity of automated cartridge library 30. In addition, the elevator may be driven remotely from the three-axis robot. This allows locating a large motor/gear train where space is available.

Cartridge Hooks

Figure 42:
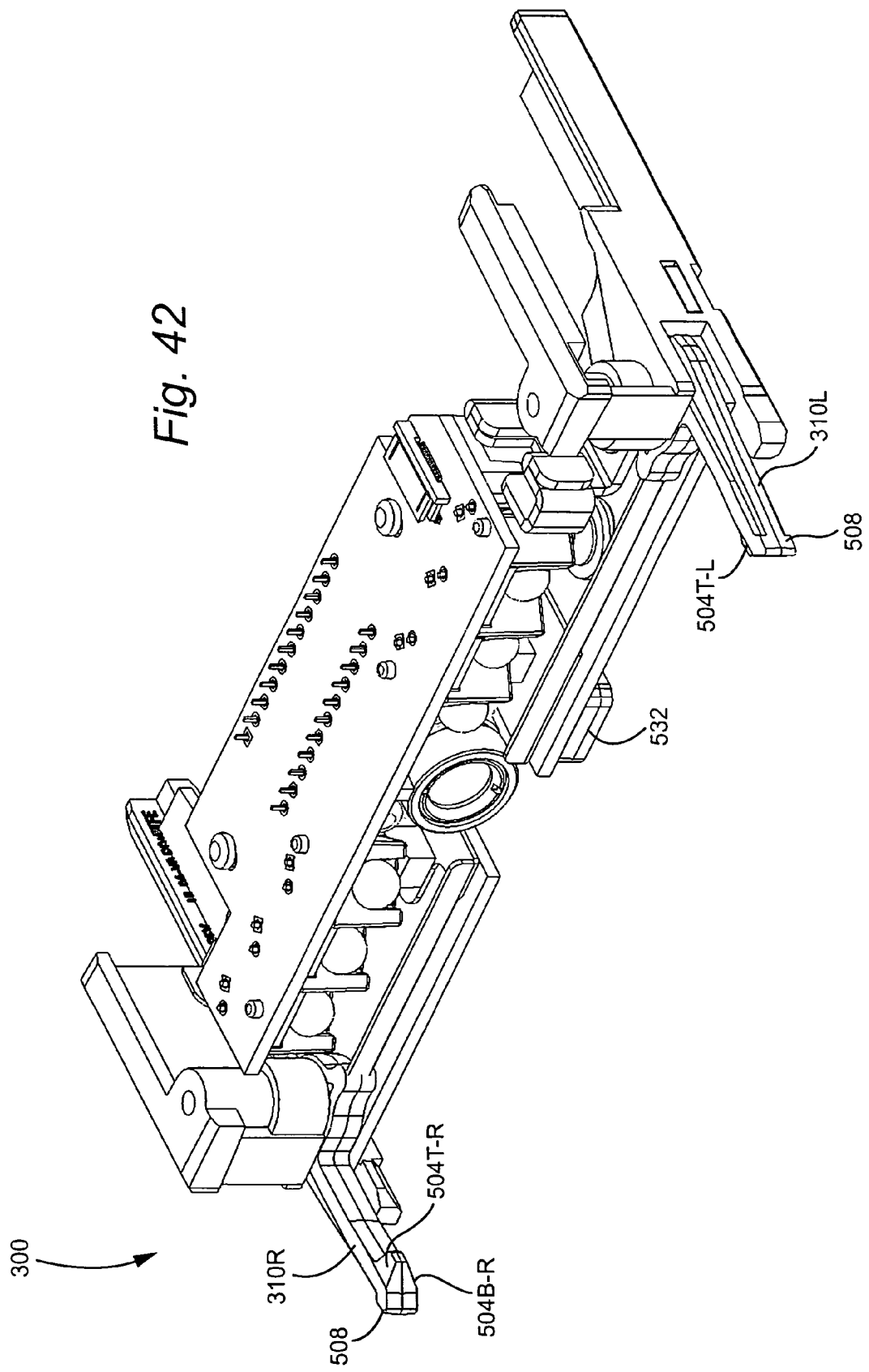
FIG. 42 is a perspective view of a portion of a robot comprising cartridge transport mechanism of the automated cartridge library of FIG. 1, showing that the robot carries two cartridge engagement hooks.

The transport mechanism 54, which comprises robot 300, is configured to transport a cartridge in a first linear direction toward and away from the cell (e.g., in the library X direction, see FIG. 1) and in a second direction orthogonal to the first direction (e.g., in the library Z direction, see FIG. 1). As shown in FIG. 42, transport mechanism 54 and robot 300 in particular comprises two cartridge engagement hooks 310, e.g., left cartridge hook 310L and right cartridge hook 310R. As shown, for example, in FIG. 43B, each hook 310 engages a recessed feature 500 of the cartridge C when the cartridge C is between the two hooks 310.

Figure 44:
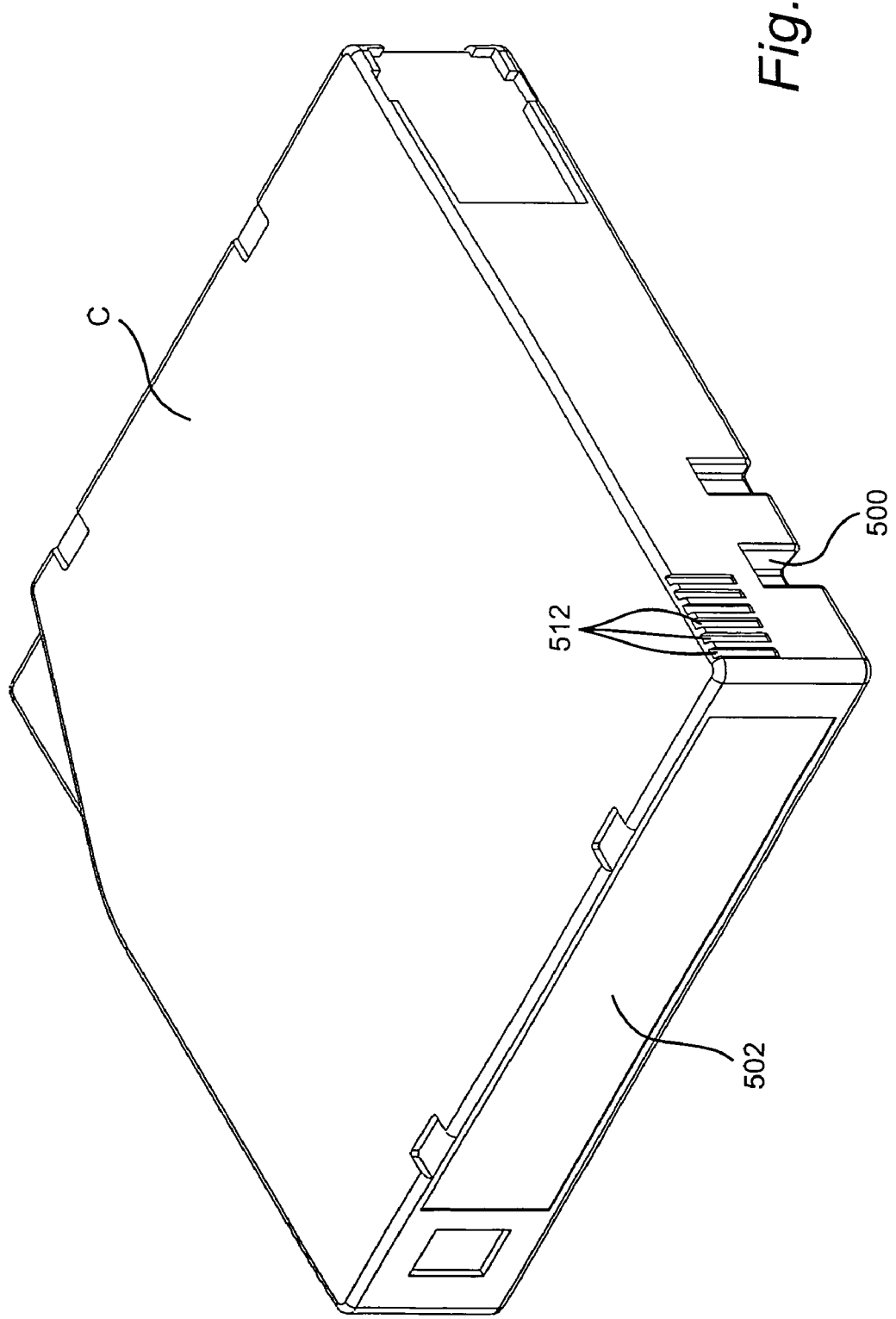
FIG. 44 is a perspective view of an example cartridge C suitable for being transported by the structure of FIG. 42.

An example cartridge C is shown in FIG. 44, which also shows an example recessed feature 500 of cartridge C. It is mentioned in passing that other features of cartridge C shown in FIG. 3 include cartridge door or lid 502 which, when the cartridge C is inserted into one of the drives 60, is opened for access to the information storage media contained therein.

A distal end 508 of each hook 310 is also configured so that the hook withdraws from the recessed feature 500 of the cartridge C when the transport mechanism travels 54 in the second direction (e.g., in the library Z direction, see FIG. 1) and the cartridge C is in the at least one cell. In particular, the distal end 508 of each hook 310 comprises a ramped hook surface 504, i.e., top and bottom ramped hook surfaces 504T-L and 504B-L on left hook 3 10L and top and bottom ramped hook surfaces 504T-R and 504B-R on right hook 310R.

Figure 45A:
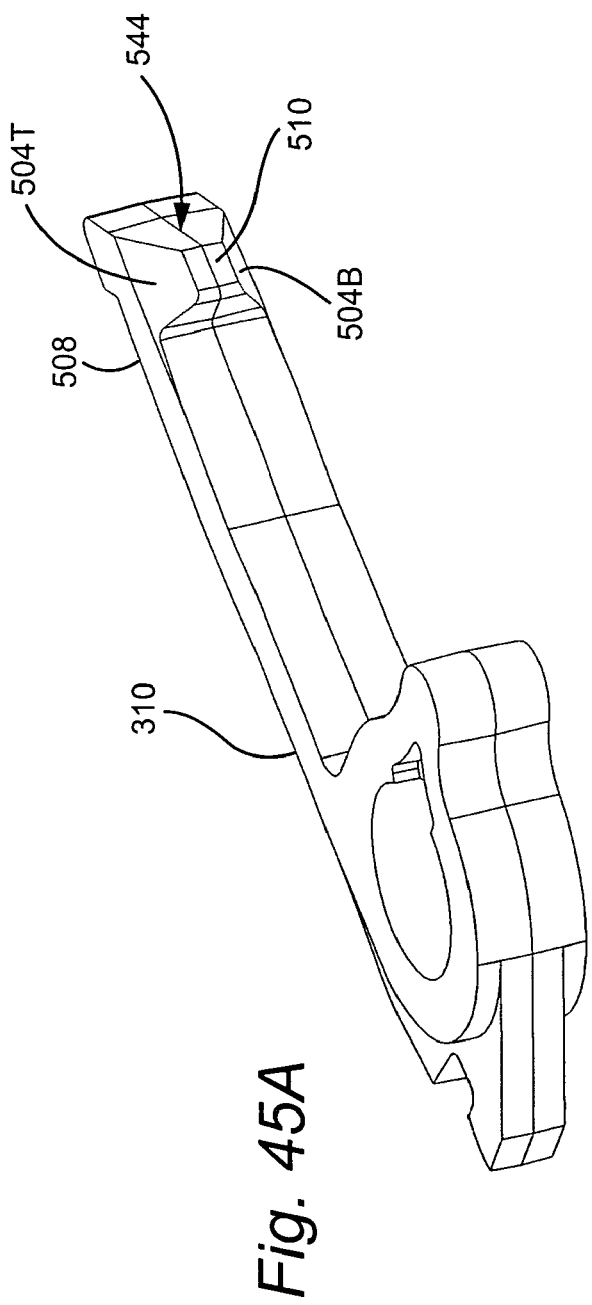
FIG. 45A is a side perspective view of a cartridge engagement hook according to an example embodiment.
Figure 45B:
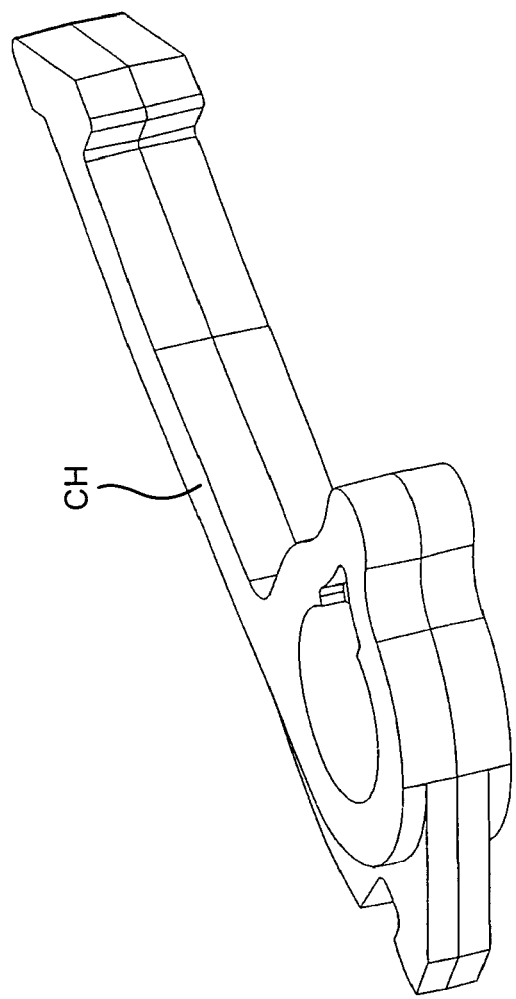
FIG. 45B is a side perspective view of a contrasting conventional cartridge engagement hook.
Figure 46B:
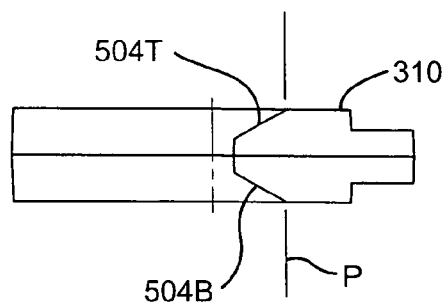
FIG. 46B is an end view of the cartridge engagement hook of FIG. 46A.
Figure 46A:
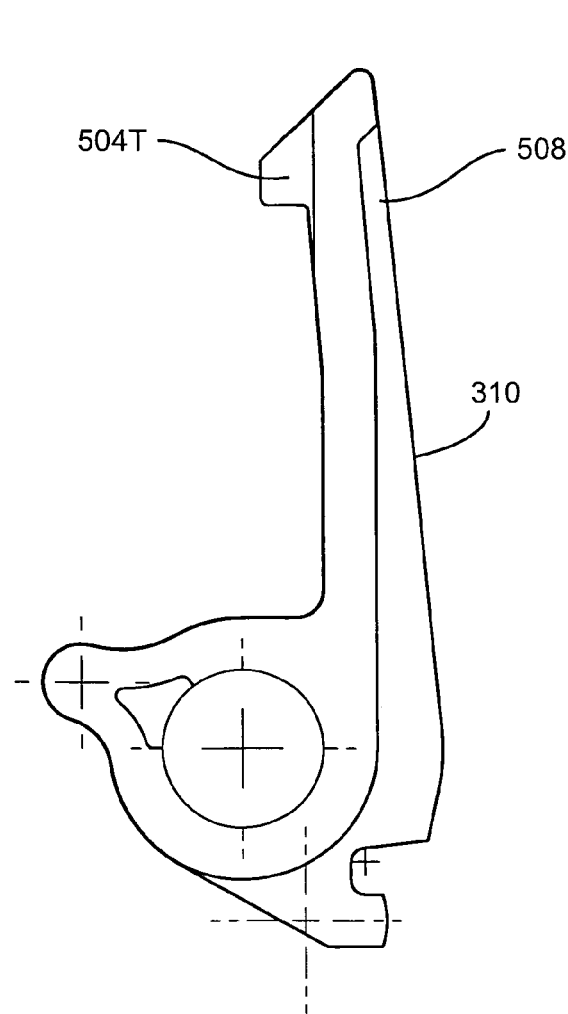
FIG. 46A is a top view of the cartridge engagement hook of FIG. 45A.
Figure 46C:
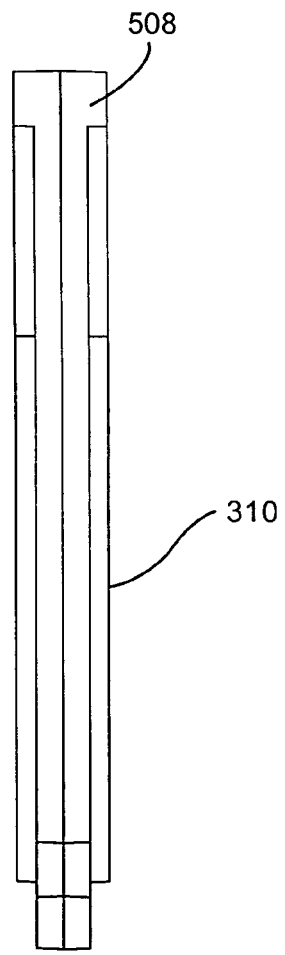
FIG. 46C is a side view of the cartridge engagement hook of FIG. 46A.

An example embodiment of a hook 310 having the ramped hook surface 504T and 504B is shown in FIG. 45A. The hook 310 of FIG. 45A having the ramped hook surface 504T and 504B is in contrast to a conventional hook CH shown in FIG. 45B which does not have a ramped hook surface. The hook 310 is also shown in FIG. 46A, FIG. 46B, and FIG. 46C.

In an example embodiment, upon engagement by the transport mechanism 54 the cartridge C lies in a cartridge engagement plane, e.g., along the X-Y plane in FIG. 1. The distal end 508 of each hook 310 comprises a ramped hook surface 504T and 504B, each of which is inclined with respect to the cartridge engagement plane. The ramped hook surface 504T and 504B is configured to contact and move the hook 310 out of the recessed feature 500 as the transport mechanism 54 travels in the second direction (e.g., in the library Z direction, see FIG. 1) when the cartridge C is in the at least one cell.

Stated differently, the two cartridge engagement hooks 310L and 310R are spaced apart in a third direction (e.g., in the library Y direction, see FIG. 1), the third direction being orthogonal to both the first direction and the second direction (e.g., the library X and Z directions, see FIG. 1). The ramped hook surface 504T and 504B of each hook 310L, 310R is inclined with respect to an imaginary plane P including the first direction and the second direction (e.g., see FIG. 46B). In an example implementation, the ramped hook surface 504T and 504B is inclined with respect to the cartridge engagement plane (and the imaginary plane P) at an angle of approximately thirty degrees (e.g., see FIG. 46B).

Figure 47:
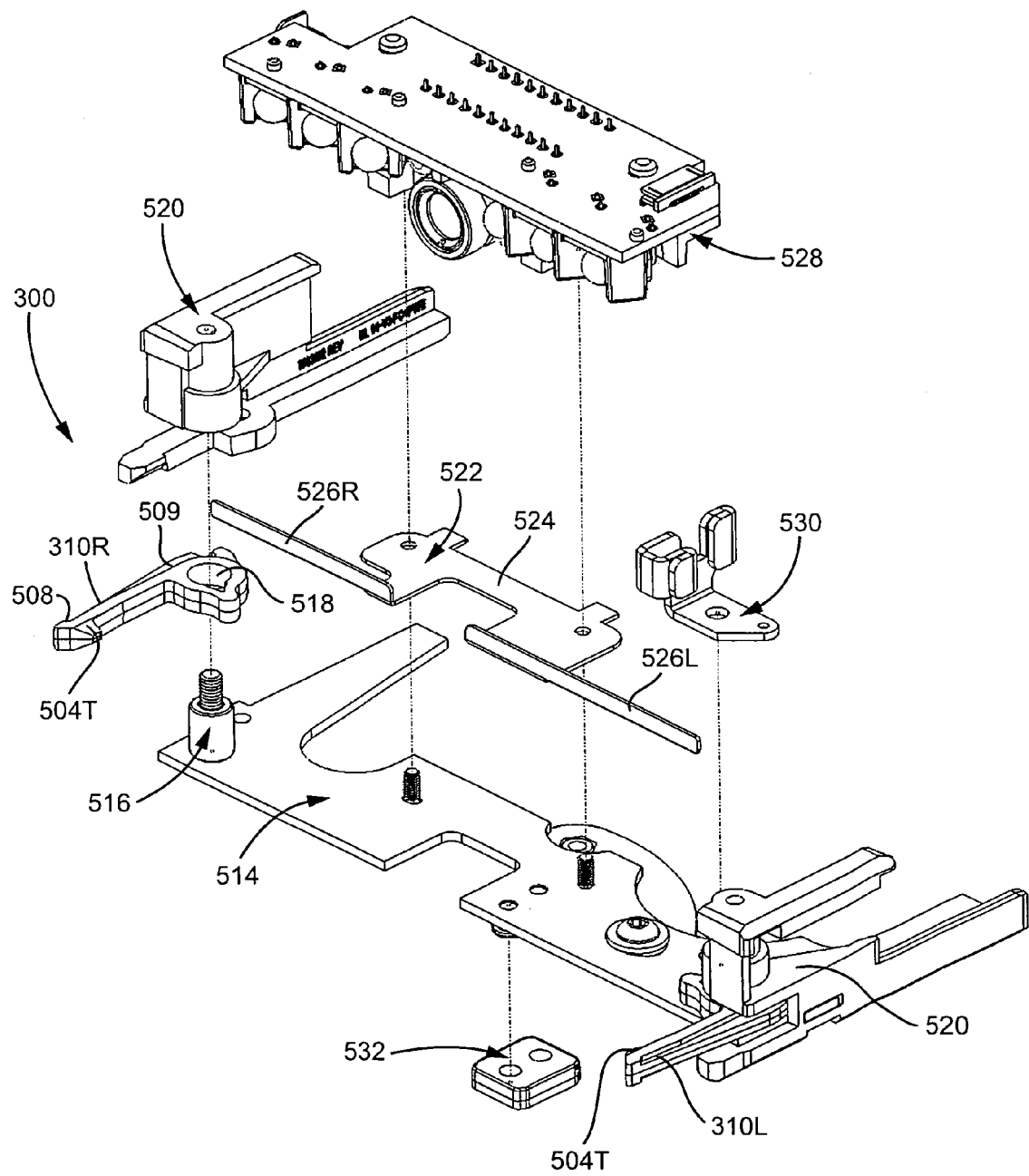
FIG. 47 is an exploded view of a portion of a robot according to an example embodiment, and showing particularly how the cartridge engagement hooks are mounted to the robot.
Figure 48:
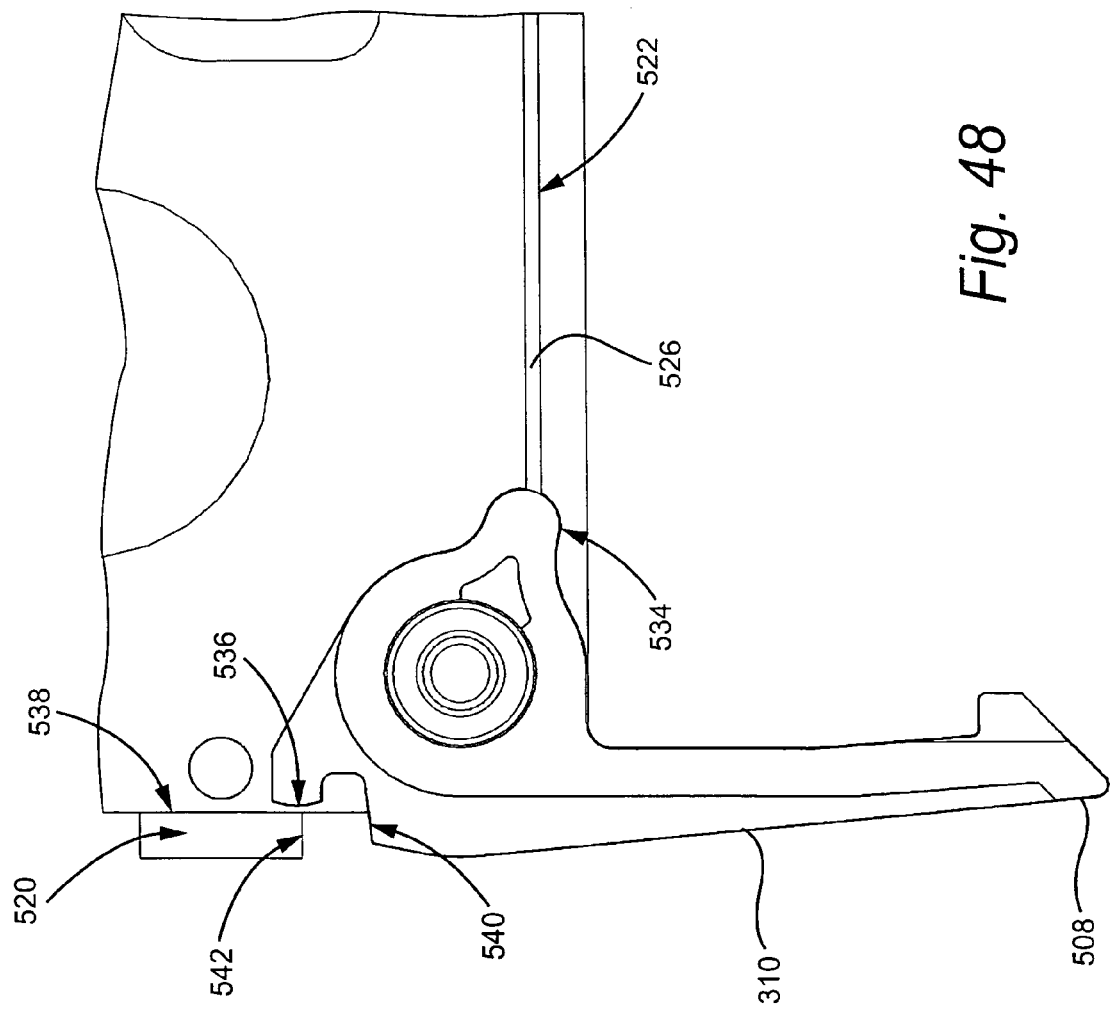
FIG. 48 is a top view showing various surfaces of a cartridge hook according to an example embodiment.

FIG. 47 is an exploded view of a portion of robot 300, showing particularly how the cartridge engagement hooks 310 are mounted to robot 300. FIG. 48 is a top view showing, e.g., various surfaces of a cartridge hook 310.

As shown in FIG. 47, the robot 300 includes a base plate 514 that provides shafts 516 for pivotally mounting respective hooks 310. As illustrated, the proximal end 509 of each hook 310 includes an opening 518 that receives the shaft 516 to allow pivotal movement of the hook 310 about the shaft 516. Glide members 520 maintain the hooks 310 on respective shafts 516. A barcode reader 528, a strain relief or barcode flex cable 530, and a guide or reach 532 are also provided to the base plate 514. In an example implementation, the guide may be comprised of a polymer bearing material.

In an example embodiment, the transport mechanism 54 further comprises means for biasing the hook 310 to engage the recessed feature 500 of the cartridge C when the cartridge C is between the two hooks 310L and 310R. In an example implementation, the biasing means is a spring 522 (e.g., see FIGS. 47 and 48). As illustrated in FIG. 47, the spring 522 includes a base 524 provided to the base plate 514 and spring members 526L and 526R adapted to engage and bias respective hooks 310L and 310R.

FIG. 48 illustrates the hook surface 534 acted on by the respective spring member 526 of spring 522. In addition, FIG. 48 illustrates hook in-stop 536 and the surface 538 provided on glide member 520 acted on by the hook in-stop 536, and hook out-stop 540 and the surface 542 provided on glide member 520 acted on by the hook out-stop 540.

By virtue of configuration of its distal end 508, e.g., the ramped hook surface 504T and 504B, each hook 310 withdraws from the recessed feature 500 of the cartridge C without employment of a hook withdrawal actuator. Stated differently, the ramped hook surface 504T and 504B allows the spring loaded hooks 310 to be removed from a cartridge C after the cartridge C is placed into a cell or drive, without the use of any additional actuators or mechanisms adapted to move the hooks against the spring bias.

Figure 43A:
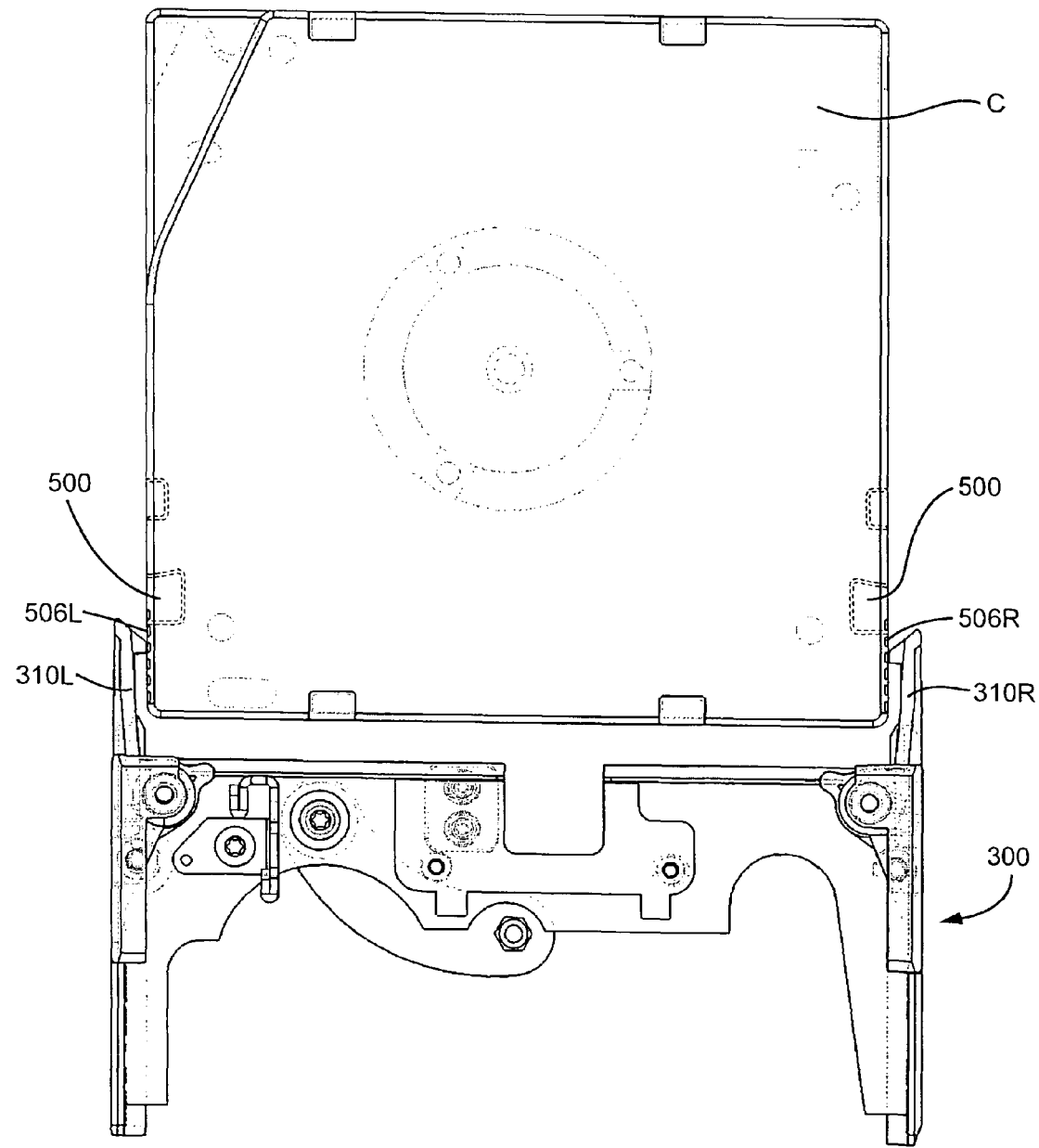
Figure 43B:
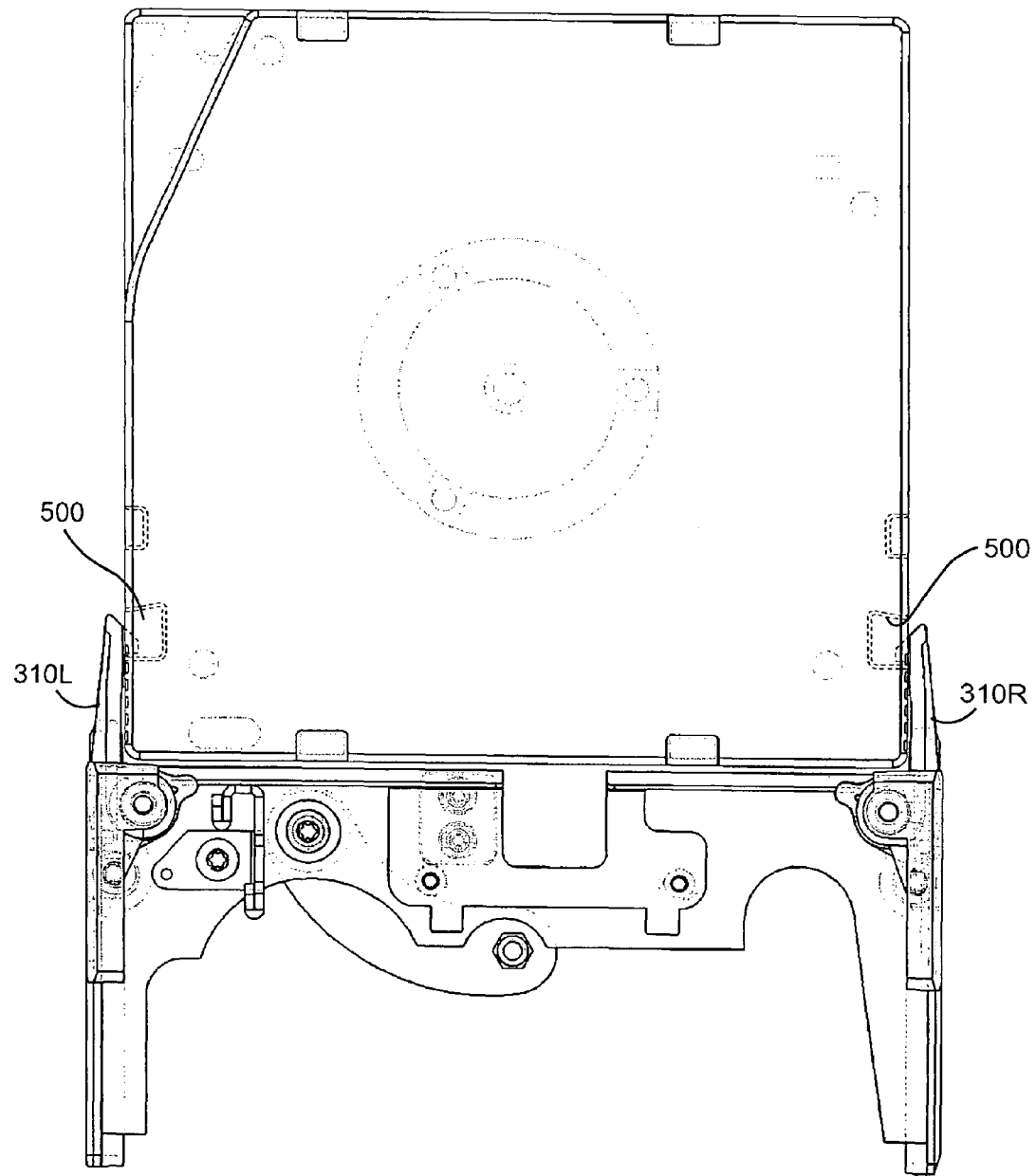

An example mode of operating robot 300, and particularly operation of cartridge hooks 310L and 310R, is now described. One aspect of the method concerns engagement of the cartridge C. This aspect of the method comprises engaging the cartridge C between the two cartridge engagement hooks 310L and 310R carried by the robot 300, each hook 310L and 310R engaging a recessed feature 500 of the cartridge C when the cartridge C is between the two hooks 310L and 310R. In this regard, FIG. 43A shows a relative position of robot 300 with its cartridge hooks 310L and 310R relative to cartridge C midway through a cartridge "pick" or engagement cycle. At the time shown in FIG. 43A, the cartridge hooks 310L and 310R are traveling along respective edges 506L and 506R of the cartridge C toward the recessed feature 500 of the cartridge C. At a subsequent time shown in FIGS. 43B and 49A, the cartridge hooks 310L and 310R have engaged the recessed features 500 of the cartridge C by protruding into the recessed features 500 of the cartridge C.

Figure 43C:
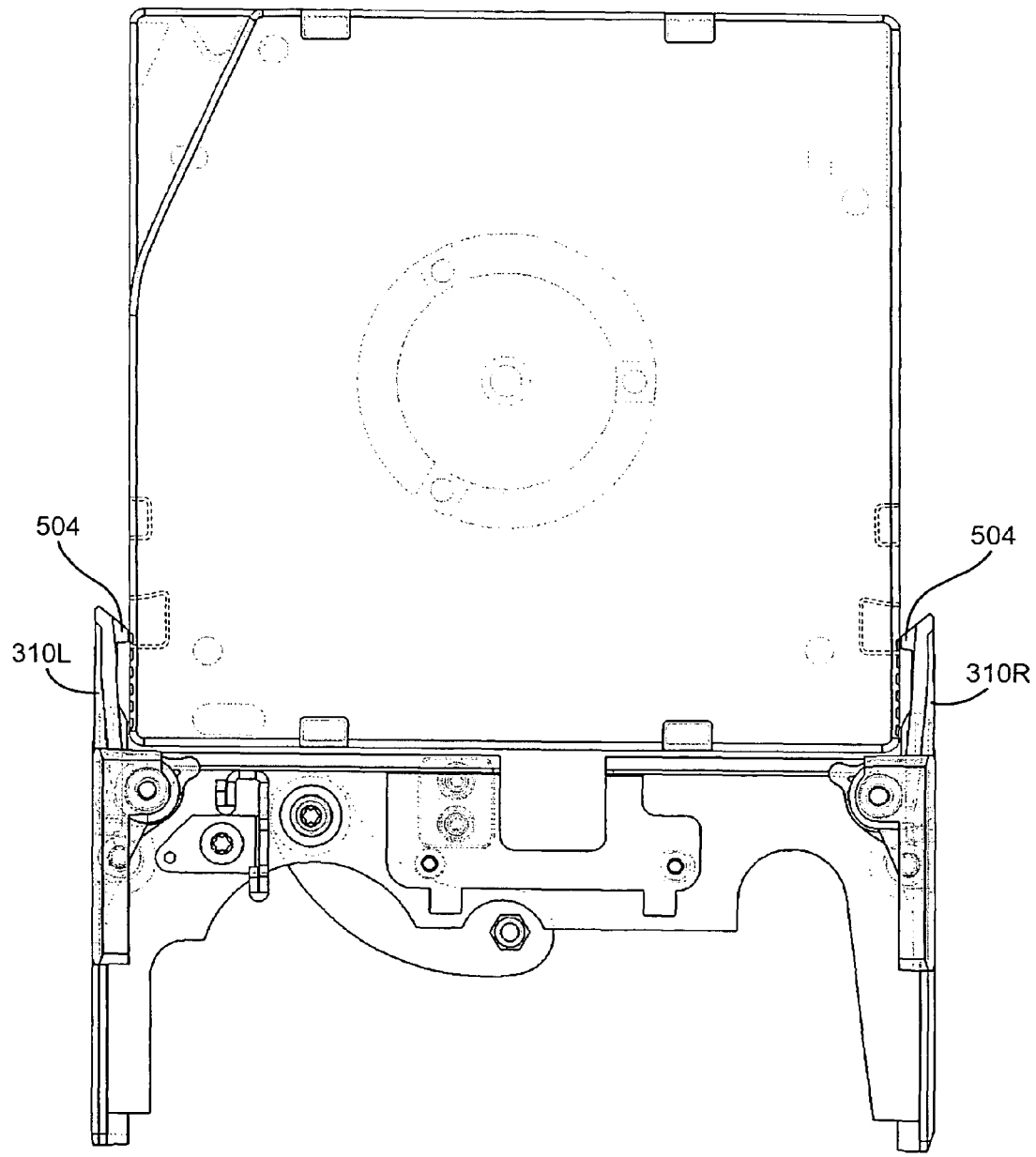
Figure 49A:
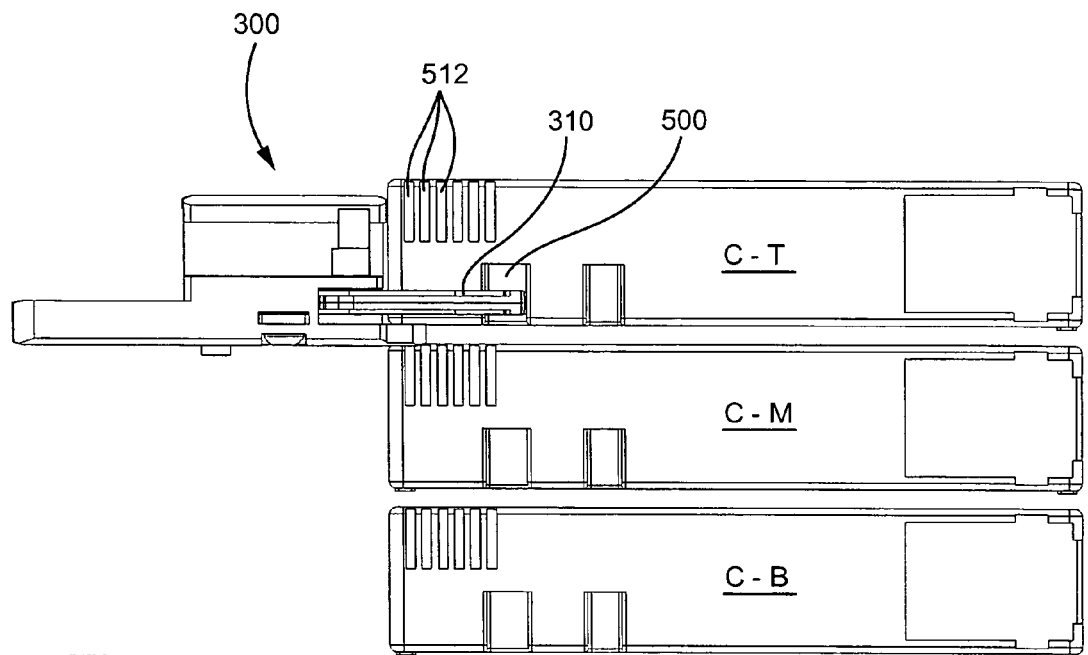
FIG. 49A and FIG. 49B are sides view of a portion of a cartridge magazine showing locations of a cartridge hook, FIG. 49A showing the cartridge hook at a full engagement of the cartridge and FIG. 49B showing the cartridge hook having withdrawn from a recessed feature of the cartridge.
Figure 49B:
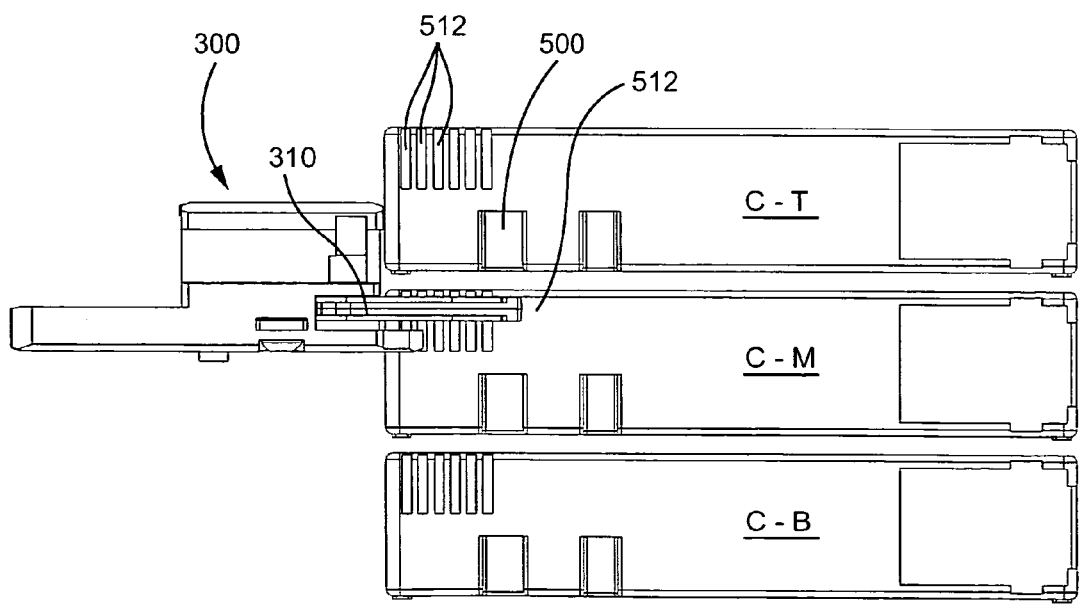
Figure 50A:
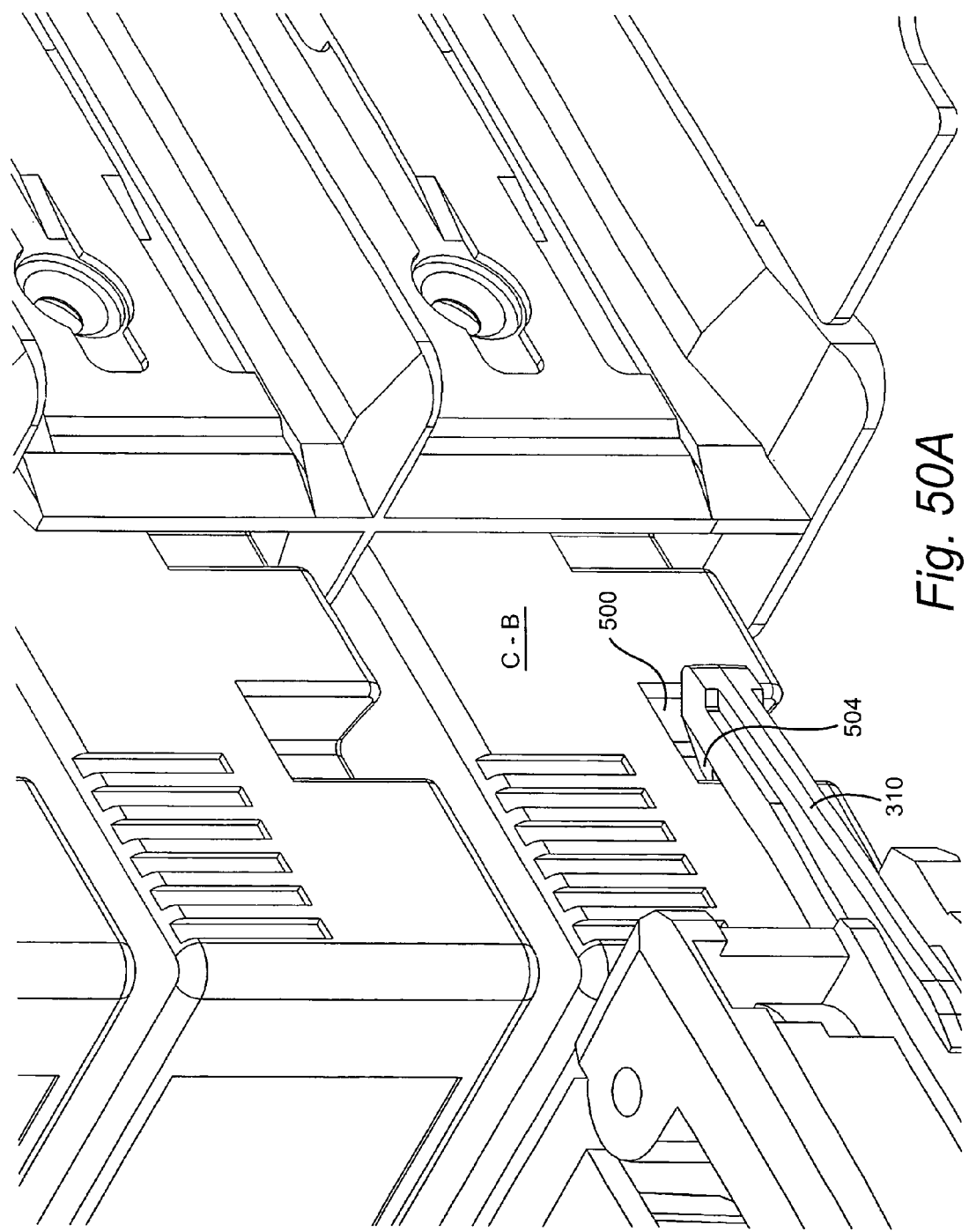
FIGS. 50A to 50H are sequential views illustrating a cartridge hook engaged with a recessed feature of a bottom cartridge and the transport mechanism being moved upwardly to release the cartridge hook from the recessed feature.
Figure 50B:
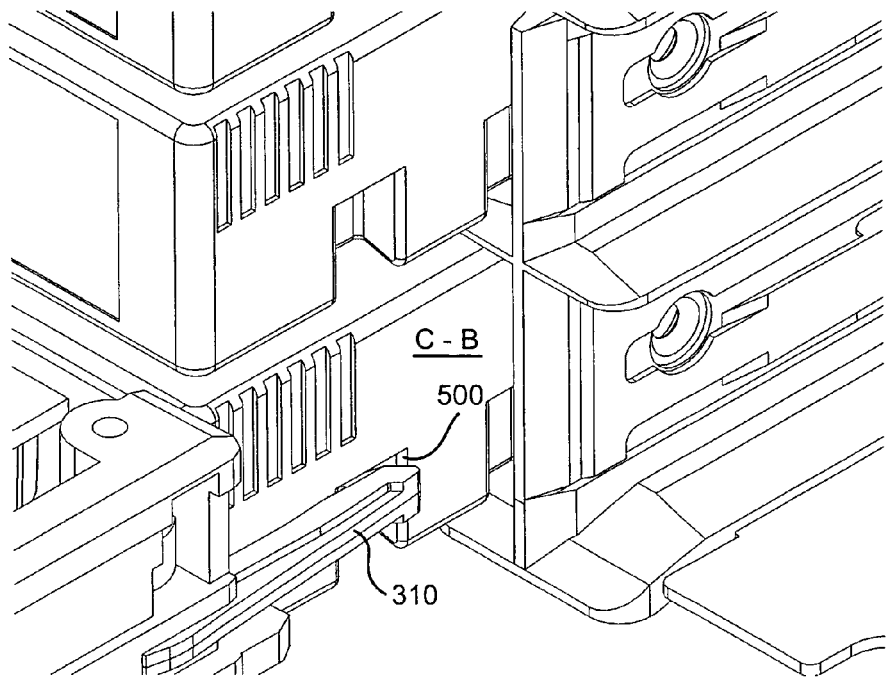
Figure 50C:
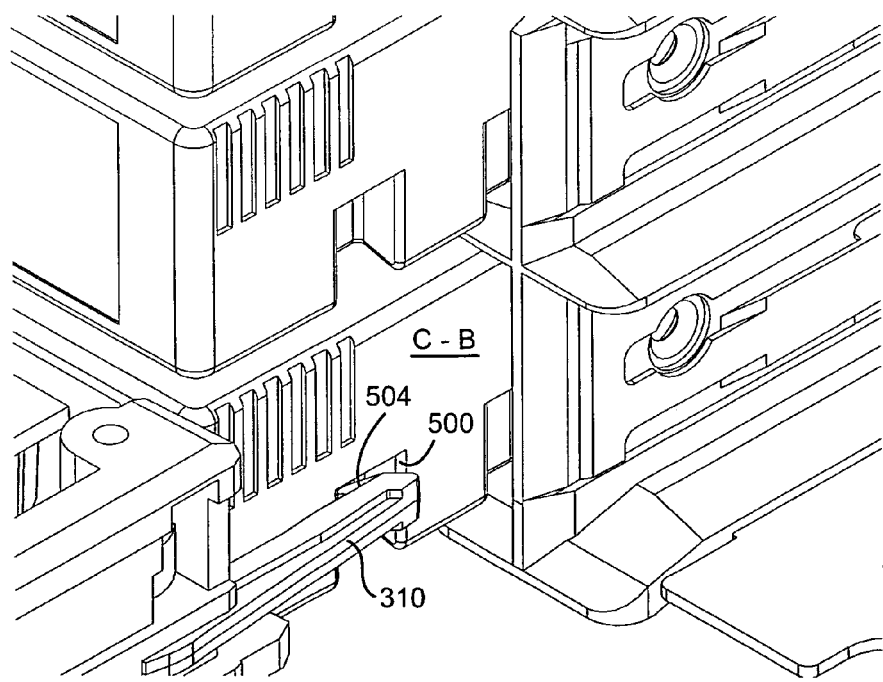
Figure 50D:
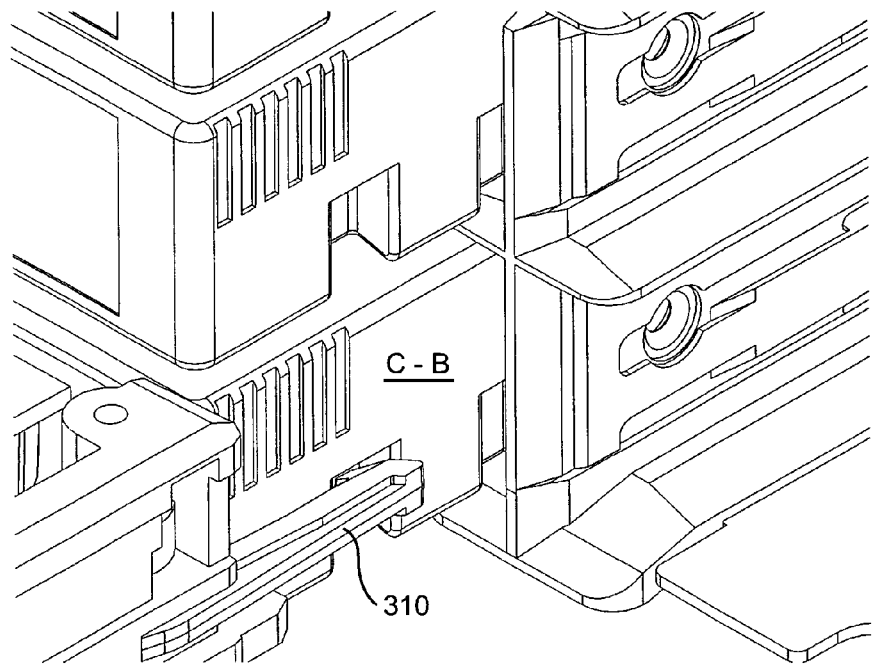
Figure 50E:
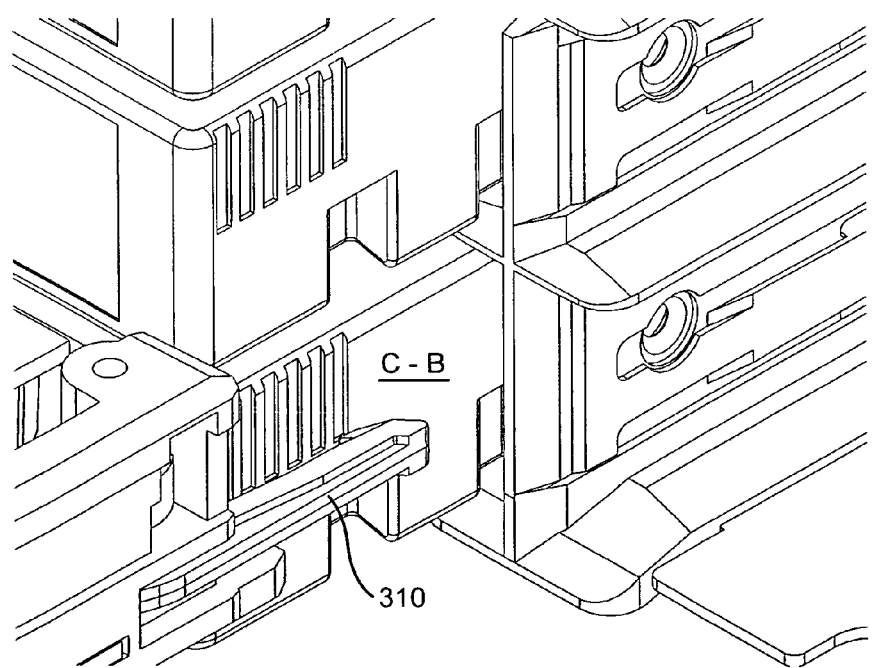
Figure 50F:
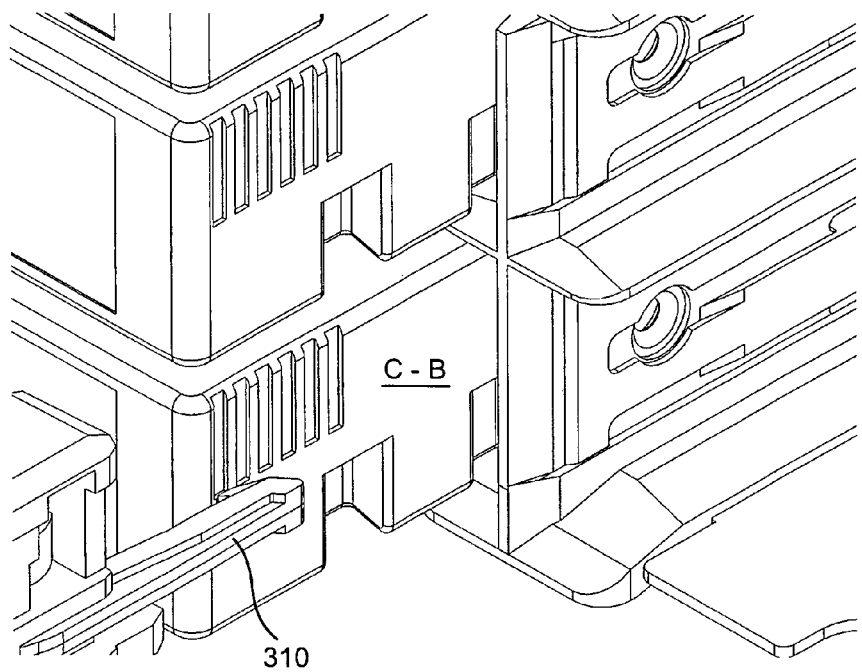
Figure 50G:
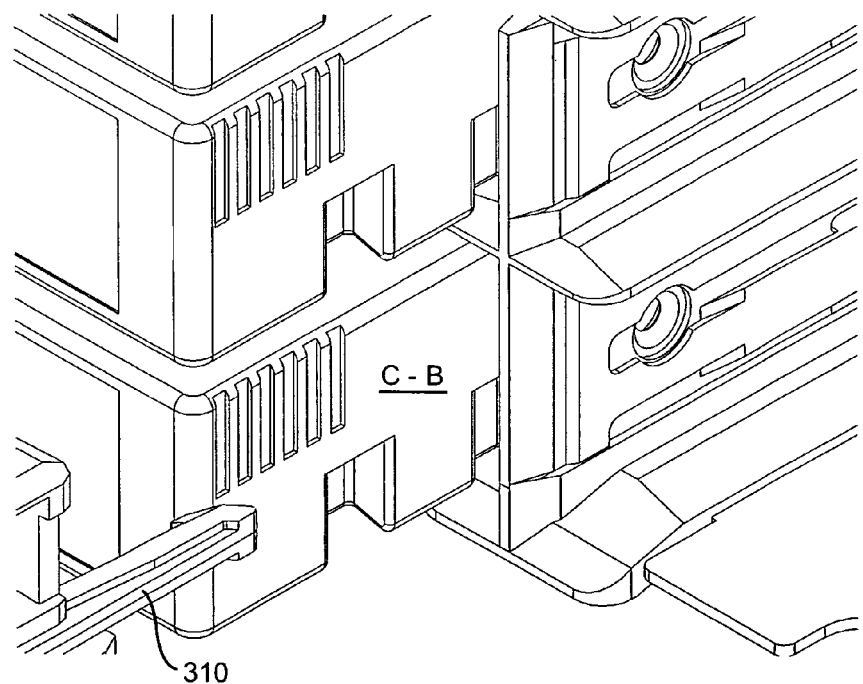
Figure 50H:
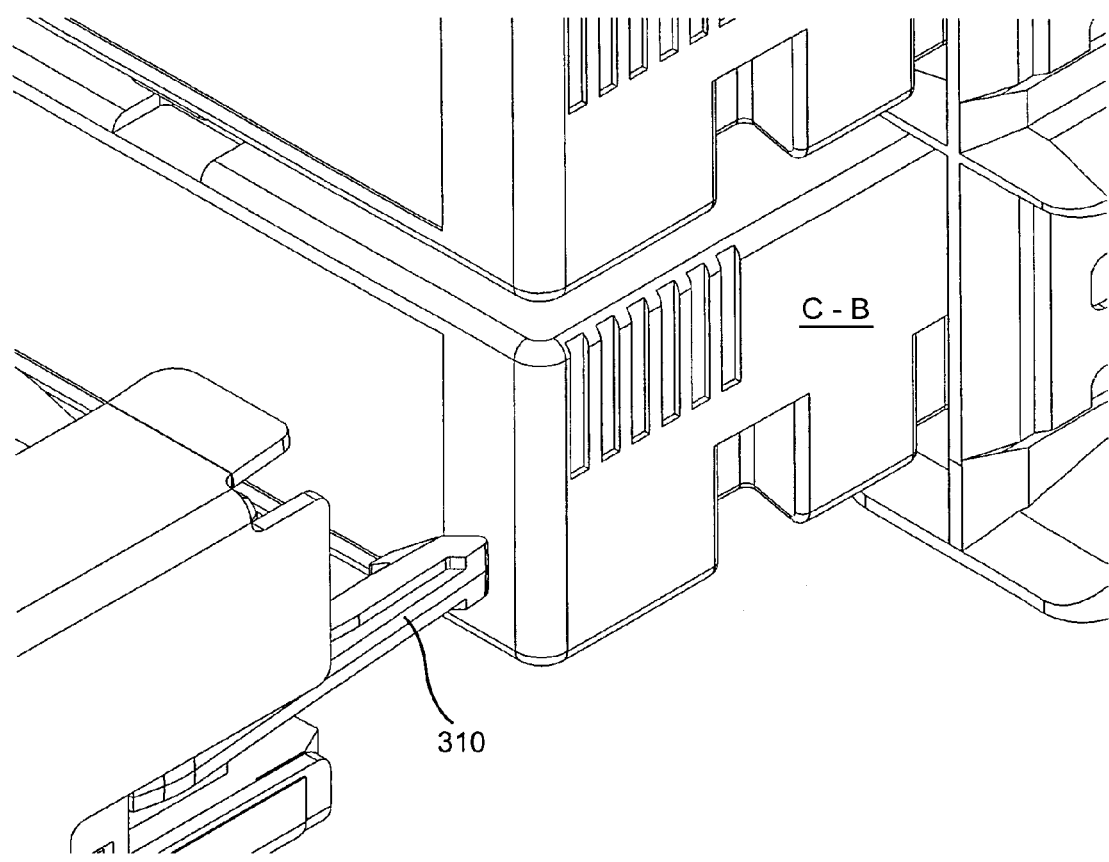
Figure 51A:
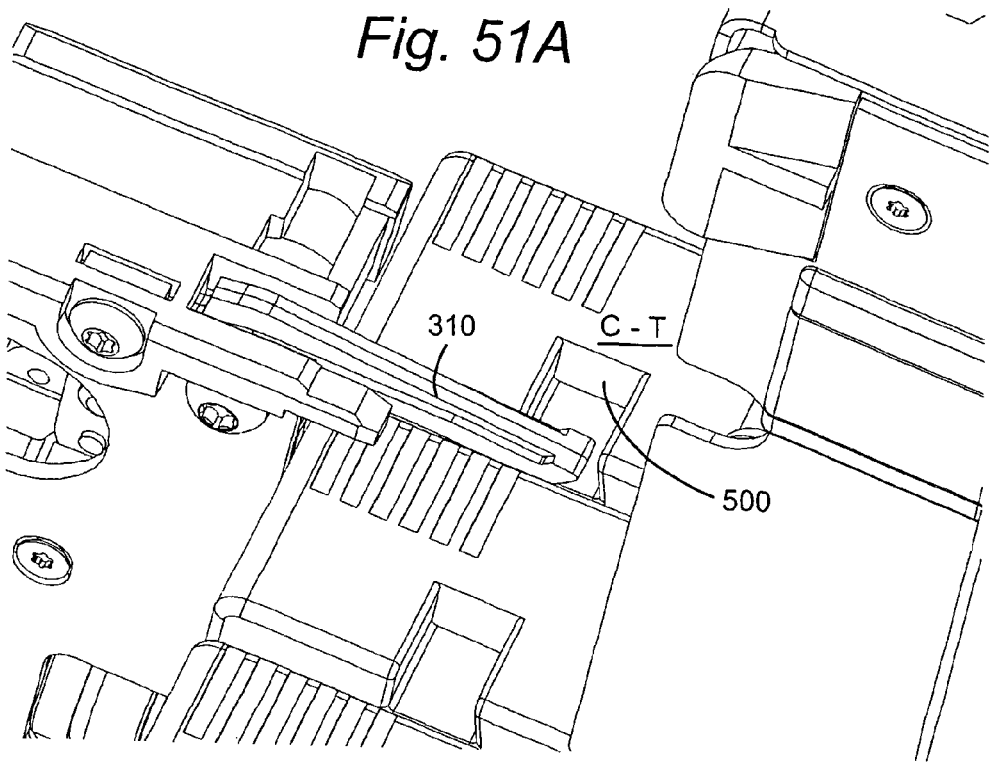
FIGS. 51A to 51F are sequential views illustrating a cartridge hook engaged with a recessed feature of a top cartridge and the transport mechanism being moved downwardly to release the cartridge hook from the recessed feature.
Figure 51B:
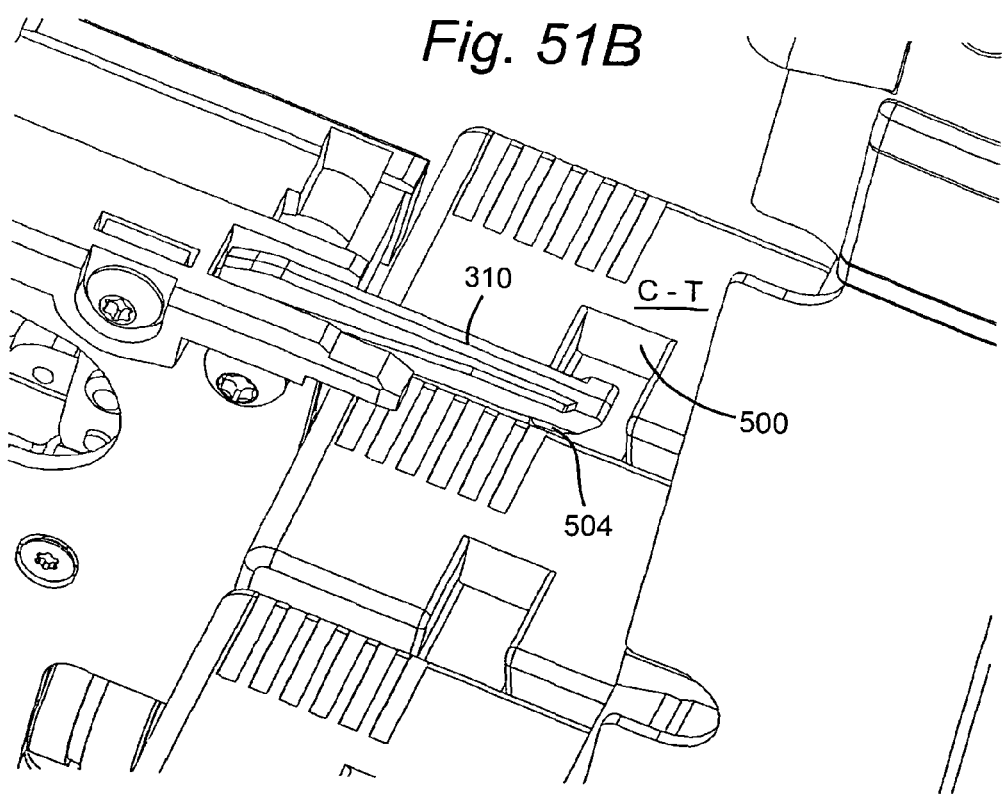
Figure 51C:
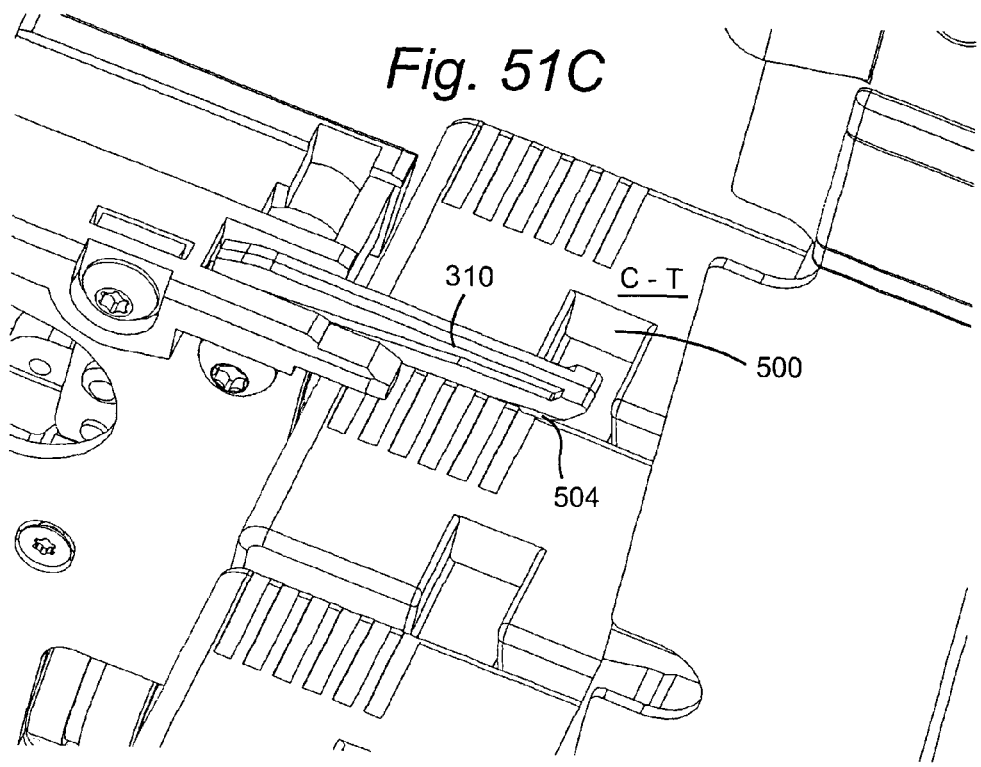
Figure 51D:
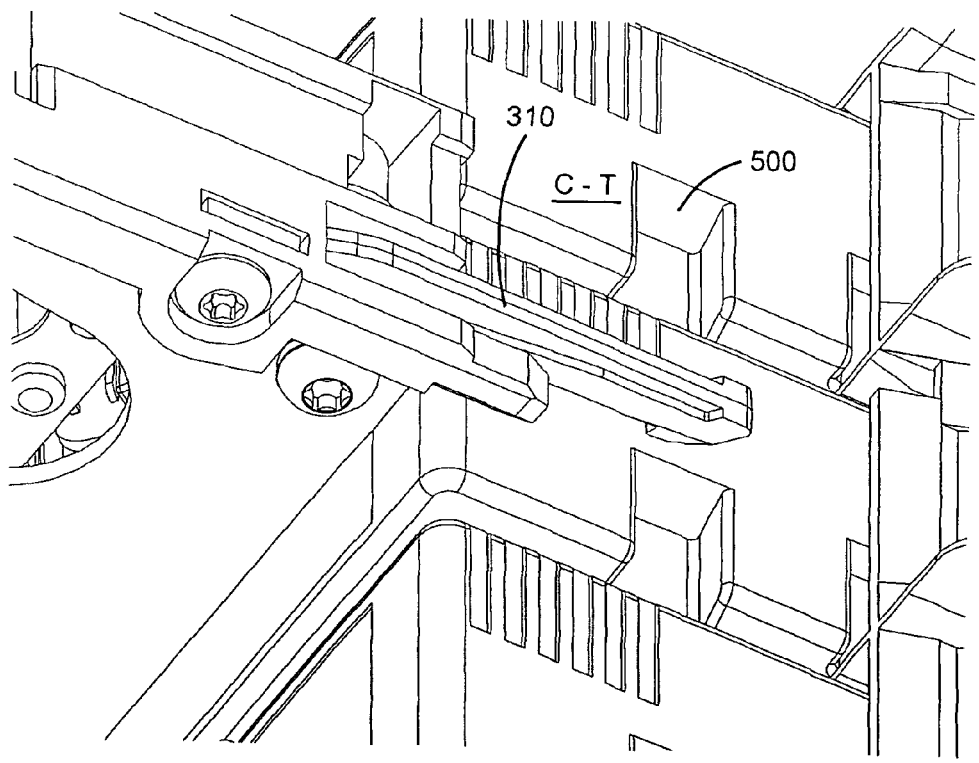
Figure 51E:
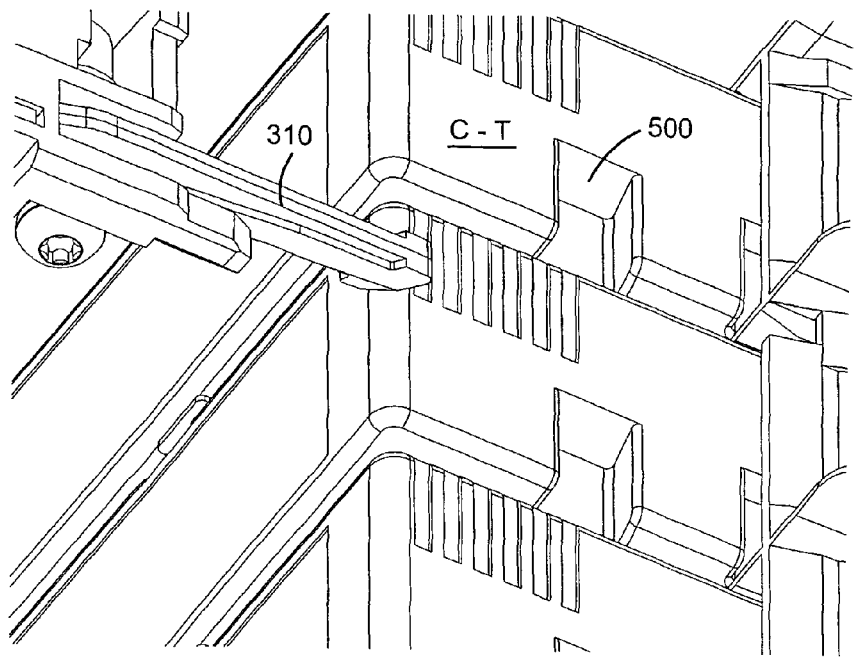
Figure 51F:
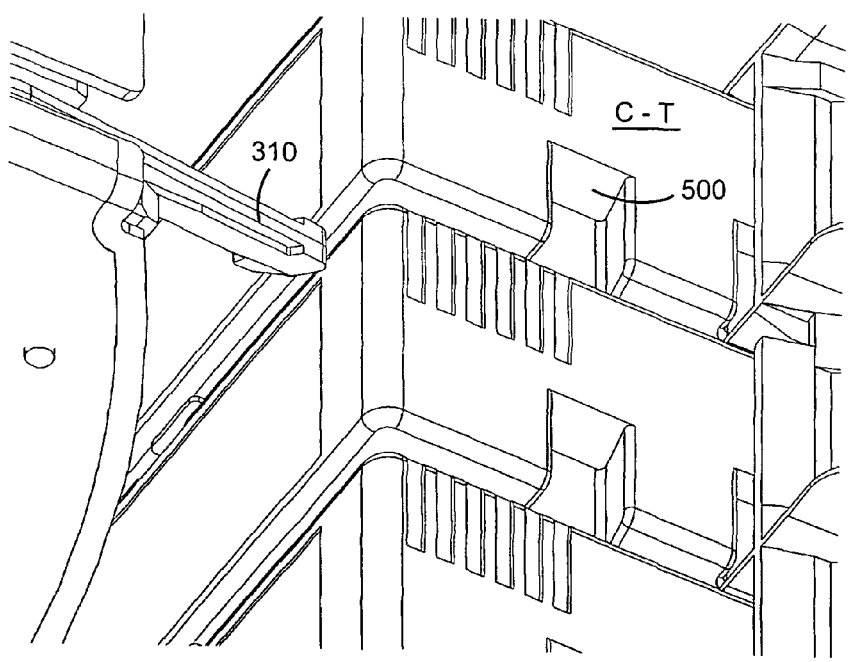

Another aspect of the method concerns release of the cartridge C from robot 300. In a basic mode, the release method comprises (1) engaging the cartridge C between the two cartridge engagement hooks 310L and 310R (e.g., in the manner above described); (2) using the transport mechanism 54 to transport the cartridge C in a first linear direction (e.g., in the library X direction, see FIG. 1) into the at least one cell (as shown in FIG. 49A); and (3) when the cartridge C is in the at least one cell, moving the transport mechanism 54 in a second direction (e.g., in the library Z direction, see FIG. 1) orthogonal to the first direction whereby, by virtue of configuration of a distal end 508 of each hook 310L and 310R, each hook 310L and 310R withdraws from the recessed feature 500 of the cartridge C. FIG. 49B and FIG. 43C particularly show that the ramped hook surfaces 504 of the cartridge hooks 310L and 310R have allowed robot 300 to move up or down by guiding the hook ramp surfaces 504 onto sides of the cartridge C above or below the area without the recessed feature 500 of the cartridge C. This allows the robot 300 to withdraw the cartridge hooks 310L and 310R without moving the cartridge C.

That is, moving the transport mechanism 54 in a second direction (e.g., in the library Z direction, see FIG. 1) causes one of the ramped hook surfaces 504T and 504B at the distal end 508 of each hook 310 to contact sides of the cartridge C above or below the recessed feature 500 and move the hook 310 out of the recessed feature 500 as the transport mechanism 54 travels in the second direction when the cartridge C is in the at least one cell.

For example, if the transport mechanism 54 is engaged with top cartridge C-T (see FIG. 8A), the transport mechanism 54 may be moved down to engage the bottom hook ramp surface 504B onto sides 512 of the middle cartridge C-M below the recessed feature 500 of top cartridge C-T (see FIG. 49B), which withdraws or releases the cartridge hooks 310 from the recessed feature 500. If the transport mechanism 54 is engaged with bottom cartridge C-B (see FIG. 8A), the transport mechanism 54 may be moved up to engage the top hook ramp surface 504T onto sides of the middle cartridge C-M above the recessed feature 500 of bottom cartridge C-B, which withdraws or releases the cartridge hooks 310 from the recessed feature 500. If the transport mechanism 54 is engaged with middle cartridge C-M (see FIG. 8A), the transport mechanism 54 may be moved up or down to engage the top or bottom hook ramp surface 504T, 504B onto sides of the top or bottom cartridge C-T, C-B above or below the middle cartridge C-M, respectively, which withdraws or releases the cartridge hooks 310 from the recessed feature 500.

FIGS. 50A to 50H are sequential views illustrating hook 310 engaged with a bottom cartridge C-B and the transport mechanism 54 being moved upwardly to release the hook 310 from the recessed feature 500. FIGS. 51A to 51F are sequential views illustrating hook 310 engaged with a top cartridge C-T and the transport mechanism 54 being moved downwardly to release the hook 310 from the recessed feature 500.

Advantageously, in an example mode, the method comprises withdrawing the hook 310 from the recessed feature 500 of the cartridge C without employment of a hook withdrawal actuator. An example mode further includes biasing each hook 310L and 310R to engage the recessed feature 500 of the cartridge C when the cartridge C is between the two hooks 310L and 310R, e.g., via spring 522.

As shown in FIG. 45A, the distal end 508 of each hook 310 includes a face surface 510 that engages the sides of the cartridge C when the hook 310 withdraws or releases from the recessed feature 500. As illustrated, the face surface 510 is longer than that provided on a conventional hook CH shown in FIG. 45B. The face surface 510 is sufficiently long so that it does not catch in the ridges 512 (e.g., see FIGS. 44, 49A, and 49B) on a right side of the cartridge C. That is, the face surface 510 is sufficiently lengthened to span the recessed areas between the ridges 512 and prevent catching. In contrast, the conventional hook CH shown in FIG. 45B includes a face surface that is short enough to catch in the ridges.

The distal end 508 of each hook 310 also includes ramp surface or pick ramp 544 (e.g., see FIG. 45A) that is adapted to engage the front edge of a cartridge as the hook 310 is moved into engagement with the cartridge C. The ramp surface 544 causes the hooks 310 to move outwardly against spring bias so that the hooks 310 can travel along respective edges 506L and 506R of the cartridge C towards the recessed feature 500.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A cartridge library comprising:

at least one drive;

a cartridge magazine comprising at least one cell configured to accommodate a cartridge of information storage media;

a transport mechanism configured to transport the cartridge between the magazine and the drive, the transport mechanism comprising:

a robot comprising:

a robot carriage comprising cartridge engagement elements configured to selectively engage and release the cartridge;

a robot tray configured to facilitate linear motion of the robot carriage, the robot carriage being situated on a first side of the robot tray;

a robot motive system comprising:

a robot first motive subsystem configured to displace the robot linearly in a first direction;

a robot second motive subsystem configured to rotate the robot at least partially about an axis extending in a second direction, the second direction being orthogonal to the first direction;

a carriage motive system configured to displace the robot carriage linearly in a third direction toward and away from the cartridge magazine, the third direction being orthogonal to the first direction and to the second direction;

a robot third motive subsystem configured to displace the robot linearly in the second direction, the third motive subsystem comprising an elevator frame having planks extending in the first direction and having a plank height in the second direction;

wherein at least one of the robot motive subsystems and the carriage motive subsystem comprise hardware situated on a second side of the robot tray, the hardware extending from the second side of the robot tray in the second direction to an extent not substantially greater than the plank height.

2. The apparatus of claim 1, wherein the hardware is situated between the planks with respect to the third direction.

3. The apparatus of claim 1, wherein the hardware is an ultimate gear of the respective subsystem.

4. The apparatus of claim 1, wherein the at least one of the robot motive subsystems and the carriage motive subsystem comprise a motor situated on the first side of the robot tray.

5. The apparatus of claim 1, wherein the robot third motive subsystem further comprises a scissors assembly configured to facilitate movement of the elevator frame in the second direction.

6. The apparatus of claim 1, wherein the robot first motive subsystem comprises a first gear situated on the second side of the robot tray and the carriage motive subsystem comprises a second gear situated on the second side of the robot tray, wherein the first gear and the second gear are stacked in concentric manner, and further comprising a friction reducing material axially positioned between the first gear and the second gear.

7. The apparatus of claim 6, wherein the friction reducing material comprises ultra high molecular weight polyethylene.

8. The apparatus of claim 1, wherein the robot first motive subsystem comprises a robot track extending in the first direction, and wherein the robot track is supported by the planks of the elevator frame.

9. The apparatus of claim 8, wherein the robot first motive subsystem comprises a pinion configured to engage the robot track, and wherein the pinion is situated on the second side of the robot tray.

* * * * *